United States Patent [19]

Okabe et al.

[11] Patent Number: 5,257,709
[45] Date of Patent: Nov. 2, 1993

[54] CONTAINER PROVIDED WITH METALLIC COVER AND METHOD AND APPARATUS FOR MANUFACTURING THE SAME

[75] Inventors: Mitsuo Okabe, Yokohama; Kimiaki Hyakutome, Kawagoe; Sadao Kuramochi, Noda; Junichi Hashikawa, Higashiyamato; Hideto Akiba, Tokorozawa, all of Japan

[73] Assignee: Dai Nippon Insatsu Kabushiki Kaisha, Japan

[21] Appl. No.: 445,677

[22] PCT Filed: Mar. 29, 1989

[86] PCT No.: PCT/JP89/00331

§ 371 Date: Nov. 29, 1989

§ 102(e) Date: Nov. 29, 1989

[30] Foreign Application Priority Data

| Mar. 29, 1988 | [JP] | Japan | 63-75137 |
| Mar. 31, 1988 | [JP] | Japan | 63-78522 |
| Apr. 4, 1988 | [JP] | Japan | 63-82635 |
| Apr. 4, 1988 | [JP] | Japan | 63-82636 |
| Apr. 6, 1988 | [JP] | Japan | 63-84823 |
| Apr. 23, 1988 | [JP] | Japan | 63-101166 |
| Apr. 28, 1988 | [JP] | Japan | 63-107266 |
| May 13, 1988 | [JP] | Japan | 63-63080[U] |
| Nov. 11, 1988 | [JP] | Japan | 63-285540 |

[51] Int. Cl.⁵ .................................. B65D 1/34
[52] U.S. Cl. .................................. 220/450
[58] Field of Search ........... 220/450, 453, 457, 458, 220/669, 675, 619

[56] References Cited

U.S. PATENT DOCUMENTS

| 3,298,559 | 1/1967 | Lurie | 220/458 X |
| 4,278,716 | 7/1981 | Buchner et al. | 220/450 X |
| 4,333,601 | 6/1982 | Grimm | 220/450 X |
| 4,401,232 | 8/1983 | Constable et al. | 220/450 |
| 4,538,758 | 9/1985 | Griffith | 220/450 X |
| 4,692,132 | 9/1987 | Ikushima | 220/450 X |
| 4,735,665 | 4/1988 | Miyauchi et al. | 220/450 X |
| 4,909,411 | 3/1990 | Uchida et al. | 220/450 |

FOREIGN PATENT DOCUMENTS

| 53-717192 | 10/1962 | Japan. |
| 42-6185 | 3/1967 | Japan. |
| 43-29159 | 11/1968 | Japan. |
| 48-23311 | 7/1973 | Japan. |
| 50-139169 | 11/1975 | Japan. |
| 52-19714 | 5/1977 | Japan. |
| 53-137259 | 11/1978 | Japan. |
| 54-6392 | 1/1979 | Japan. |
| 55-56093 | 12/1980 | Japan. |
| 58-30934 | 2/1983 | Japan. |
| 58-14017 | 3/1983 | Japan. |

(List continued on next page.)

*Primary Examiner*—Steven M. Pollard
*Attorney, Agent, or Firm*—Parkhurst, Wendel & Rossi

[57] ABSTRACT

This invention relates to a container (10) provided with a metallic cover comprising a plastic container (14) provided with a flanged portion (15) and a metallic cover (11) provided with a peripheral edge portion (12) and having an improved reservation property obtained by improving a material of the container body (14) and the shape thereof, also relates to a method for manufacturing a container provided with a metallic cover comprising the steps of mounting a container body (214) provided with a flanged portion (215) in a recess (267a) of a retainer (267), conveying the container body (214) mounted in the recess (267a) of the retainer (267) and the metallic cover (211) to a seaming device (256), seaming the peripheral portion (212) of the metallic cover (211) to the flanged portion (215) of the container body (214) by the seaming device (256), and discharging the seamed container provided with the metallic cover from the seaming device (256), and further relates to a press-cut device which includes a vertically reciprocating intermediate bed (313) and an upper stationary table (315) disposed above the intermediate bed (313) and in which a pressing device (321) and a cutting device (323) are secured to the intermediate bed (313) and the stationary table (315) and a conveyer (317) is arranged between the pressing device (321) and the cutting device (323).

15 Claims, 27 Drawing Sheets

FOREIGN PATENT DOCUMENTS

| | | |
|---|---|---|
| 58-134854 | 8/1983 | Japan . |
| 60-107337 | 6/1985 | Japan . |
| 60-131512 | 9/1985 | Japan . |
| 61-8567 | 1/1986 | Japan . |
| 61-271441 | 12/1986 | Japan . |
| 62-20341 | 2/1987 | Japan . |
| 62-25672 | 2/1987 | Japan . |
| 62-105130 | 5/1987 | Japan . |
| 62-146147 | 6/1987 | Japan . |
| 62-207524 | 9/1987 | Japan . |
| 62-208355 | 9/1987 | Japan . |
| 62-220443 | 9/1987 | Japan . |
| 62-227726 | 10/1987 | Japan . |
| 63-57538 | 4/1988 | Japan . |

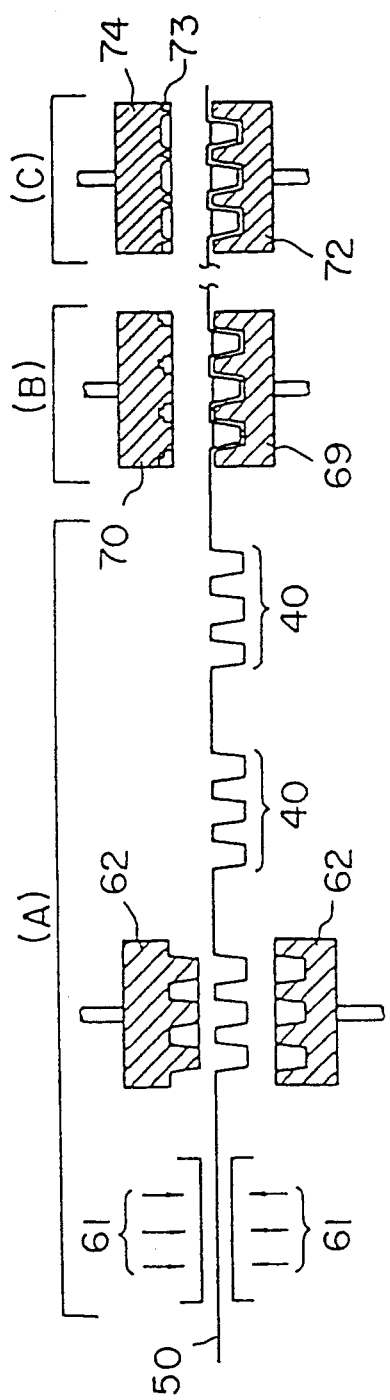
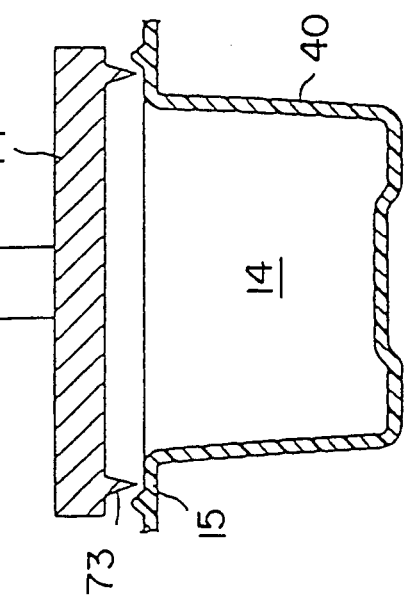
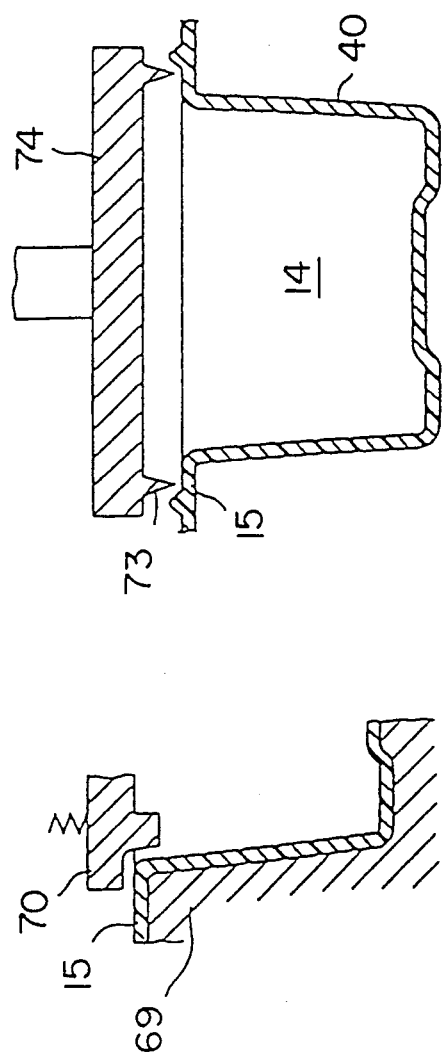
FIG. 20
FIG. 21
FIG. 22

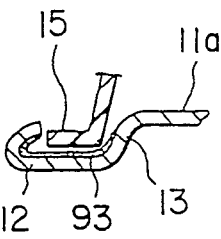 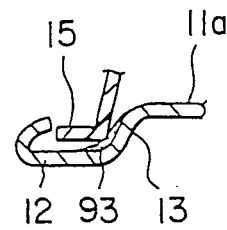
FIG. 34(a)　　　FIG. 34(b)
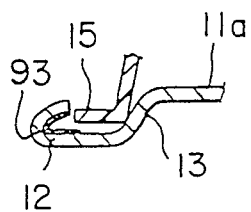 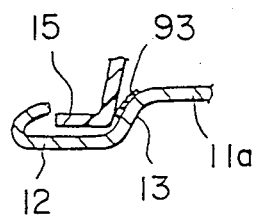 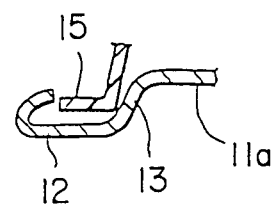
FIG. 34(c)　　FIG. 34(d)　　FIG. 34(e)
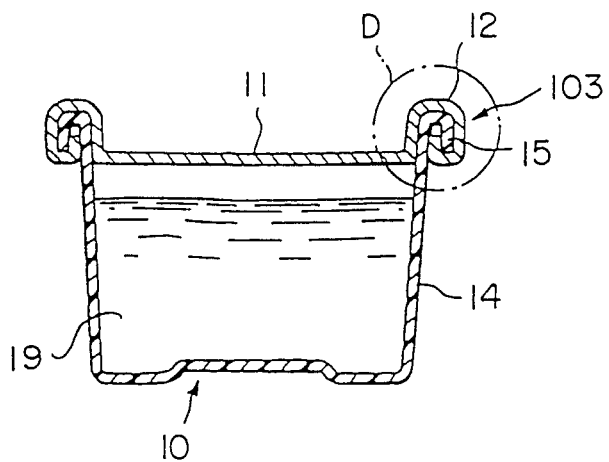
FIG. 35

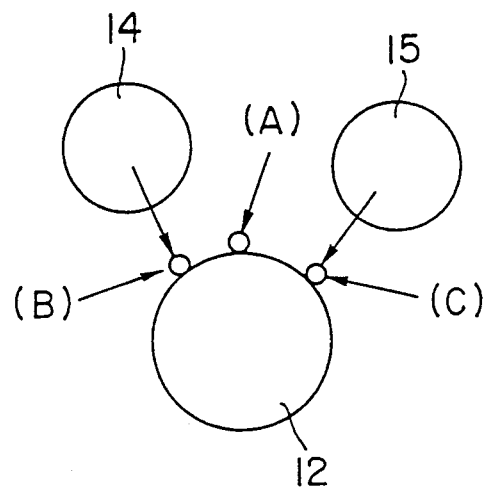
F I G. 61
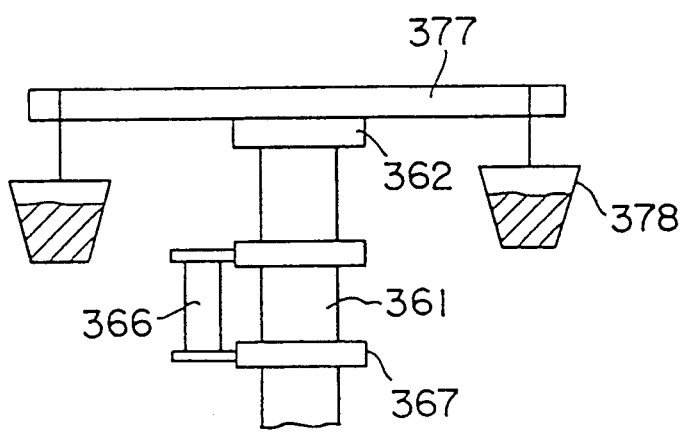
F I G. 62

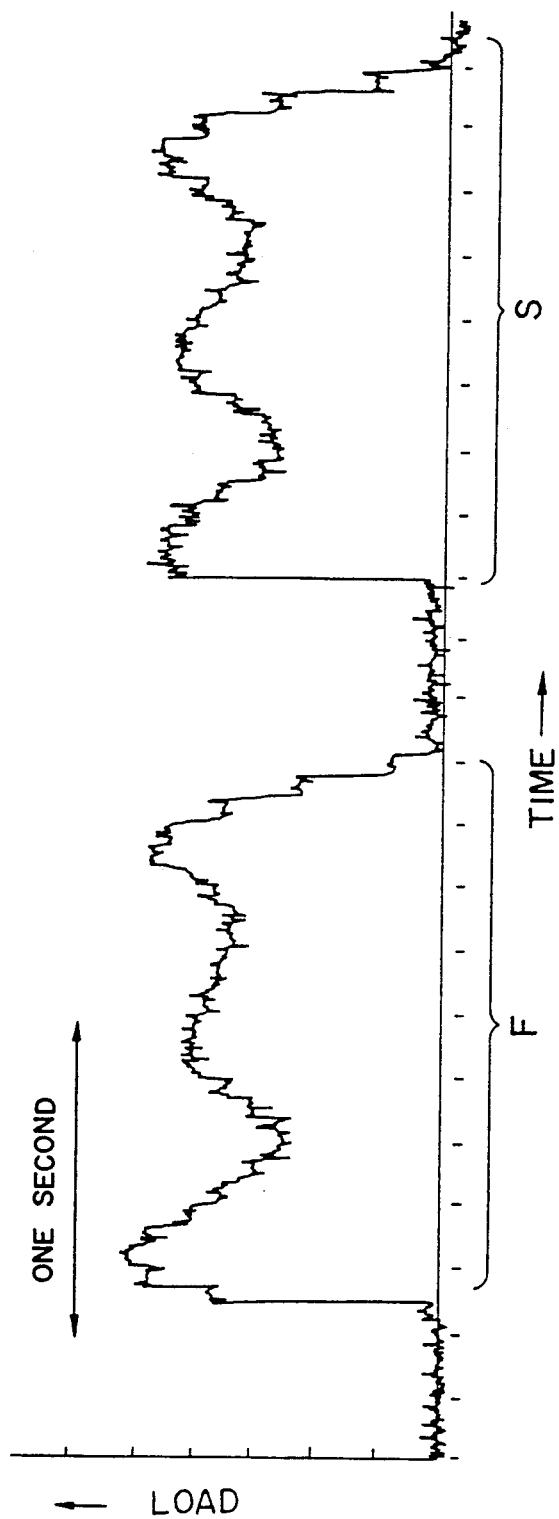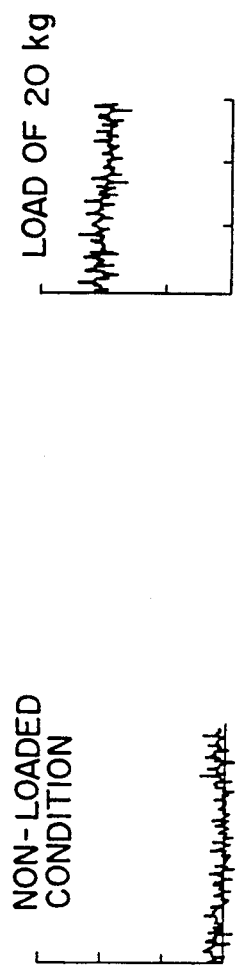

CONTAINER PROVIDED WITH METALLIC COVER AND METHOD AND APPARATUS FOR MANUFACTURING THE SAME

TECHNICAL FIELD

This invention relates to a container comprising a plastic body and a metallic cover and to a method and apparatus for manufacturing the container.

BACKGROUND OF THE INVENTION

Metallic containers, for example, metallic cans, have various shapes and can be classified into three-piece cans and two-piece cans. The three-piece can is called a tinplate-soldered can which has a structure in which a cylindrical can body, a top or cover, and an end are double seamed and sealed. The two-piece can is called a tinplate-pressed can which has a structure in which a can body and an end portion (container body) are formed integrally and a cover is double seamed around the rim of the integral container body to seal the same.

These metallic cans are used as food packaging containers for packaging various foods, juices, soft drinks, dry foods and the like are thus rigid containers of particular excellence in sealing and preservation properties. However, metallic cans have the following points to be improved.

(1) There is a limitation to making the weight light because of the nature of the metallic can;

(2) There is no self-restorative capability if the can is once crushed under an impact and the can is deformed;

(3) High energy cost is required for manufacturing the metallic can in comparison with a plastic container;

(4) The display effect of the outer appearance of the container cannot be freely changed in case the container is made of a metallic material and the display is only carried out by printing operation; and (5) It is impossible to manufacture a transparent container the contents of which can be verified without opening the container.

For solving these problems or drawbacks of the conventional metallic cans described hereinabove, a container with a metallic cover in which a metallic cover is secured to a plastic container body has been conceived.

In a case where a metallic cover is secured to the plastic container body, the peripheral edge portion of the metallic cover is seamed to a flanged portion of the container body.

As described above, the container with the metallic cover is constructed by seaming the metallic cover to the flange of the plastic container body.

In addition, it is required for the plastic container body to have a precision strength against the flange seaming force, a gas-barrier property capable of improving a content reserving function and an adequate strength of a shell portion thereof.

However, there has not been proposed any container provided with a metallic cover sufficiently attaining or achieving the above described functions, and technology for the manufacturing method and apparatus for such container have been not yet established.

SUMMARY OF THE INVENTION

An object of this invention is to provide a container provided with a metallic cover and comprising a plastic container body and a metallic cover which can be manufactured simply and air-tightly and to provide a method and apparatus for manufacturing such container provided with the metallic cover.

(1) A first feature of this invention resides in a container provided with a metallic cover comprising a plastic container body provided with an upper opening around which a flanged portion is formed and a metallic cover provided with a peripheral portion which is seamed to the flanged portion and characterized in that the container body is formed of a laminated sheet member having a gas-barrier property and an injected fusible resin.

(2) A second feature of this invention resides in a container provided with a metallic cover comprising a plastic container body provided with an upper opening around which a flanged portion is formed and a metallic cover provided with a peripheral portion which is seamed to the flanged portion and characterized in that the container body is formed by effecting a sheet forming treatment to a laminated sheet member having a gas-barrier property.

(3) A third feature of this invention resides in a container provided with a metallic cover comprising a plastic container body provided with an upper opening around which a flanged portion is formed, a metallic cover provided with a cover body for sealing the end opening and a peripheral portion connected to the cover body through a shoulder portion and adapted to seam the flanged portion, and a sealing member coated annularly on a seamed portion between the flanged portion of the container body and the peripheral portion of the metallic cover and characterized in that the sealing member is coated at least to a portion near the shoulder portion of the metallic cover.

(4) A fourth feature of this invention resides in a container provided with a metallic cover comprising a plastic container body provided with an upper opening around which a flanged portion is formed and a metallic cover provided with a peripheral portion which forms a double seamed portion in association with the flanged portion and characterized in that the seamed width of the double seamed portion is made more than 0.5 $(3M+2P)$ and less than $(3M+2P)$, where P is a thickness of the flanged portion before the seaming and M is a thickness of the peripheral portion before the seaming.

(5) A fifth feature of this invention resides in a container provided with a metallic cover comprising a plastic container body provided with an upper opening around which a flanged portion is formed and a metallic cover provided with a peripheral portion which is seamed to the flanged portion and characterized in that a deoxidizer is applied to an inner surface of the metallic cover or an inner surface of the container body.

(6) A sixth feature of this invention resides in a method comprising the steps of thermally forming a plastic container body provided with a flanged portion formed by sheet forming a laminated material having a gas-barrier property, pressing the flanged portion between a press male mold half and a press female mold half to reduce the thickness of the flanged portion, cutting the peripheral portion of the flanged portion between a cutting male mold half and a cutting female mold half to set the width of the flanged portion to a predetermined value, the method being characterized in that a guide having an outer configuration corresponding to the inner shape of the container body is inserted into the container body during at least one of the pressing and cutting steps and the pressing or cutting step is performed after the insertion of the guide into the container body.

(7) A seventh feature of this invention resides in a method of manufacturing a container provided with a metallic cover comprising the steps of mounting a plastic container body provided with a flanged portion to a recessed portion of a retainer having a shape corresponding to an outer configuration of the bottom surface of the container body, conveying the container body mounted in the recessed portion of the retainer and a metallic cover having a peripheral portion fitted in the flanged portion of the container body to a rolling and seaming unit, roll-seaming the peripheral portion of the metallic cover to the flanged portion of the container body by means of the rolling and seaming unit, and discharging the seamed container provided with the metallic container from the rolling and seaming unit.

(8) An eighth feature of this invention resides in a method of manufacturing a container provided with a metallic body comprising the steps of packaging a content into a plastic container body provided with a flanged portion, seaming a peripheral portion of the metallic cover to the flanged portion of the container body, and heating and sterilizing the seamed container body and the metallic cover so as to make constant a pressure difference between the inner pressure of the container body and the outer pressure thereof.

(9) A ninth feature of this invention resides in a press-cut apparatus comprising an intermediate bed vertically movable in a reciprocating manner and an upper stationary table disposed above the intermediate bed, a press unit for pressing a flanged portion of a plastic container body by mounting one of press male and female mold halves to the intermediate bed and mounting the other one of press male and female mold halves, a cutting unit for cutting the outer periphery of the flanged portion of the container body by mounting one of cut male and female halves to the intermediate bed and mounting the other one of cut male and female halves, and a conveying unit disposed between the press unit and the cut unit for conveying the container body from the press unit to the cut unit.

(10) A tenth feature of this invention resides in a container seaming apparatus comprising a rotary lifter which is supported on a vertically movable supporting cylinder and on which a container provided with a metallic cover is rested, a rotary chuck disposed above the rotary lifter and adapted to press hold the container provided with the metallic cover between the rotary lifter and the rotary chuck, and a plurality of seaming rolls disposed external to the rotary chuck and adapted to seam the container provided with the metallic cover, a strain gauge being further mounted on the outer surface of the supporting cylinder so that the clamping force of the seaming rolls can be detected by a signal from the strain gauge.

(11) An eleventh feature of this invention resides in a container seaming apparatus comprising a rotary lifter which is supported on a vertically movable supporting rod and on which a container provided with a metallic cover is rested, a rotary chuck disposed above the rotary lifter and adapted to press hold the container provided with the metallic cover between the rotary lifter and the rotary chuck, and a plurality of seaming rolls disposed external to the rotary chuck and respectively revolved about the container provided with the metallic cover, an annular load meter being further mounted on the outer surface of the supporting rod of the lifter so that the pressing force between the lifter and the chuck can be detected by a signal from the load meter.

BRIEF DESCRIPTION OF THE DRAWINGS

FIGS. 20 to 22 are views showing a container provided with a metallic cover having a container body formed of a laminated member including an ethylene vinyl alcohol copolymer containing a drying agent in the second embodiment of the container provided with the metallic cover according to this invention;

FIGS. 30 to 34(a-e) are views showing container provided with a metallic cover having a container body formed of a sealing member of a rubber sealing member of the third embodiment of the container provided with the metallic cover according to this invention;

FIGS. 35 and 36 are views showing a container provided with a metallic cover having a container body provided with a seaming portion having a seam width in a specific shape in the fourth embodiment of the container provided with the metallic cover according to this invention;

FIGS. 59 to 63(a–c) show a container seaming device provided with a rotary lifter and a rotary chuck of the second embodiment of an apparatus for manufacturing a container provided with a metallic cover according to this invention.

DESCRIPTION OF THE PREFERRED EMBODIMENTS

§1. First Embodiment of Container with Metallic Cover

A container having container body formed of a laminated sheet of gas-barrier property and an injected thermally fusible resin

1-1 A container provided with a metallic cover having a container body made of a blank in shape of a container

1-1-1 Basic Structure 1

FIGS. 1 to 5 represent a basic structure of a container provided with a metallic cover having a container body made of a blank in shape of a container.

Figure 4:
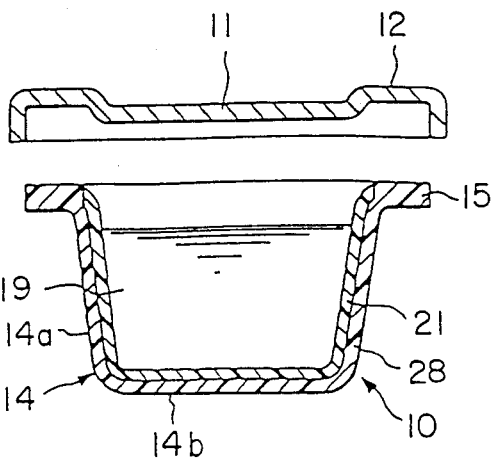

As shown in FIG. 4, a container provided with a cover is generally designated by reference numeral 10 and is constructed by roll-seaming a peripheral portion 12 of a metallic cover 11 made of an aluminum or tin-plate metal to a flanged portion 15 of a plastic container body 14.

A method of manufacturing the container 10 provided with the metallic cover will be described in detail hereunder.

Figure 1:
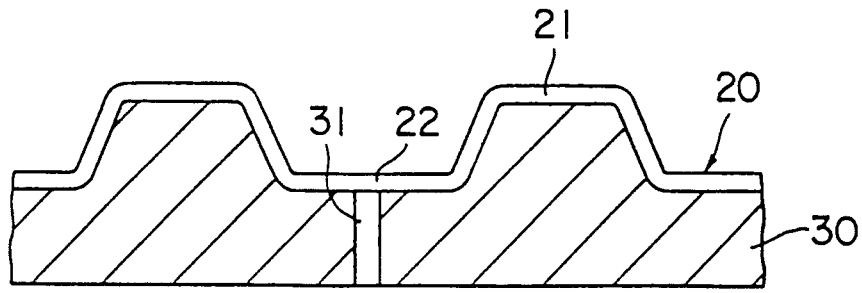
FIGS. 1 to 7 are views showing a container provided with a metallic cover having a container body made of a container blank in the first embodiment of the container provided with the metallic cover according to this invention.

First, as shown in FIG. 1, a heated laminated sheet is vacuum formed by a pair of thermoforming core provided with a plurality of continuous recesses and injection molding cavity, not shown, so as to provide a thermally formed product 20 formed of plural blanks 21 each in shape of a container and blanks 22 each in shape of a flat plate.

The product 20 may be formed by vacuum formation, pressure formation, plug assist formation method or a manner in combination of these methods.

The laminated sheet has been preliminarily heated before the insertion of the thermoforming core 30 and the vacuum formation is carried out by drawing the air through an air ventilation port 31 formed to the thermoforming core 30.

A laminated sheet material having a gas-barrier property is utilized for the described laminated sheet having, for example, a layer structure of polypropylene (PP)/bonded layer/ethylene vinyl alcohol copolymer (EVOH)/bonded layer/polypropylene (PP); polystyrene/bonded layer/ethylene vinyl alcohol copolymer/bonded layer/polystyrene; polyethylene terephthalate (PET)/polyallylate/polyethylene terephthalate; polyallylate/polyethylene terephthalate/polyallylate; or the like.

In these materials, the ethylene vinyl alcohol copolymer particularly has a superior gas-barrier property. A drying agent may be mixed with the ethylene vinyl alcohol copolymer and, in such case, a water content mixed with the ethylene vinyl alcohol copolymer is removed to thereby surely prevent the gas-barrier property from lowering.

Figure 2:
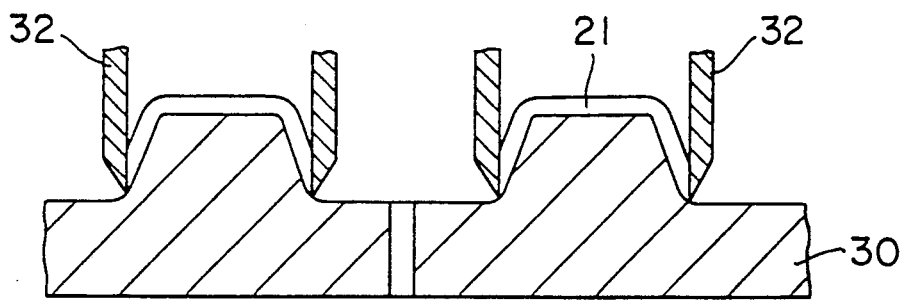

In the next step, as shown in FIG. 2, a cutter 32 is lowered from the upper portion of the product 20 on the thermoforming core 30 to thereby cut out the laminated sheet by the cutter 32 and the core 30 to form the products 20 with the container blanks 21 remaining and the plate blanks 22 removed.

Figure 3:
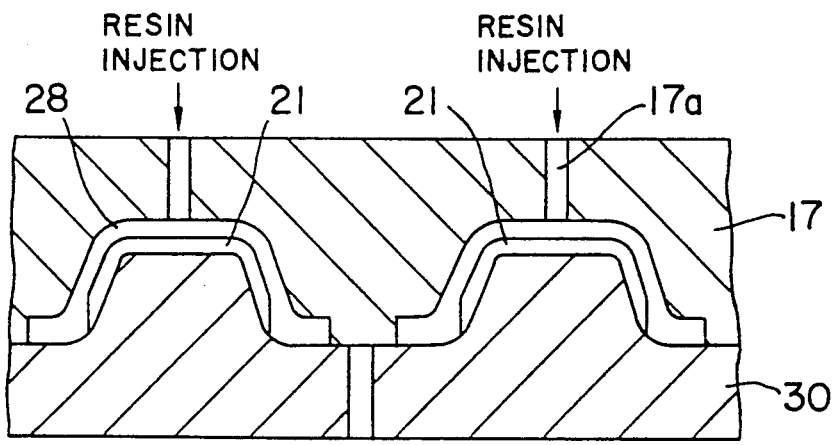

The cutter 32 is thereafter elevated upwardly and an injection molding cavity 17 is mounted from an upper portion thereof in substitution for the cutter 32 (FIG. 3).

In the succeeding step, a thermally fusible resin 28 is injected into the core 30 through an injection port 17a provided for the injection molding cavity 17. A part of the thermally fusible resin 28 injected along the peripheral edge of the container blank 21 forms a flanged portion 15 of the container body 14 and a part of the thermally fusible resin 28 injected along the surface of a shell portion of the container body forms the container body 14 including a shell portion 14a and a bottom portion 14b (FIG. 4). Portions of the thermoforming core 30 and the injection molding cavity 17 forming the flanged portion 15 are mated with each other with a gap therebetween throughout from the base end portions and the front end portions thereof to form the flanged portion 15 having substantially uniform thickness throughout from the base end portion and the front end portion thereof.

As a material for the thermally fusible resin 28 is listed up a polypropylene, polyethylene, polystyrene, polycarbonate, nylon, polyethylene terephthalate or the like, but any kind of thermoplastic resin may be generally utilized as the thermally fusible resin 28.

It is necessary for the thermally fusible resin 28 to be fused and secured to the resin forming the surface of the laminated sheet contacting the resin 28, so that the polypropylene will have to be selected when the surface of the laminated sheet is the polypropylene and, on the other hand, in a case where the polyethylene terephthalate is selected for a thermally fusible resin 28, it will be desirable to select a resin of the polyethylene terephthalate type for the surface of the laminated sheet.

The thus formed container body 14 is filled with contents 19. Then the peripheral edge portion 12 of the metallic cover 11 is seamed by double seaming fashion to the flanged portion 15 of the container body 14 to thereby form the container 10 provided with the metallic cover.

With the formation of the container 10, it is desired to preliminarily apply or coat a dust proof top coat (not shown) on the outer surface of the metallic cover 11. A coating of a resin such as epoxy resin or vinyl resin (not shown) is preliminarily applied on the inner side surface of the metallic cover 11 for preventing corrosion of the metallic cover and the deterioration of nature of the contents.

According to this embodiment, since the flanged portion 15 of the container body 14 is formed by the injection molding method, the formed flanged portion 15 has a thickness and a width of the desired accurate shapes and a predetermined strength. Accordingly, the double seaming process of peripheral portion 12 of the metallic cover 11 and the flanged portion 15 can be performed with high precision.

The shell portion 14a and the bottom portion 14b of the container body 14 are formed of the container blank 21 made of a laminated sheet having a predetermined gas-barrier property and the thermally fusible resin 28 injected on the surface of the container blank 21, so that the container body 14 formed has an improved gas-barrier property and strength. Namely, since the container blank 21 covers with substantially no space the shell portion 14a and the bottom portion 14b of the container body 14, the thus formed container body has a gas-barrier property larger than that of a container formed by assembling a plate like laminated sheet with a space into a cylindrical shape, for example.

Furthermore, the cutting out and removing operation of the plate blank 22 and the injection into the container blank 21 can be performed with a state in which the container blank 21 is mounted to the thermoforming core 30, whereby the container body 14 is smoothly and accurately formed.

Figure 5:
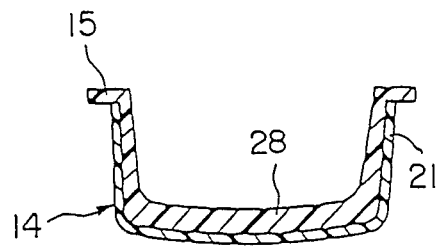

In the embodiment described above, the thermally fusible resin 28 is injected on the outer side of the container blank 21 of the laminated sheet as shown in FIG. 4, but the thermally fusible resin 28 may be injected in the inner side of the container blank 21 of the laminated sheet as shown in FIG. 5.

For example, in a case where the laminated sheet is formed of polypropylene/bonded layer/ethylene vinyl alcohol copolymer/bonded layer/polypropylene and the polypropylene is utilized as the thermally fusible resin 28, when the thermally fusible resin 28 is injected on the inner side of the container blank 21 as shown in FIG. 5, the layers of the shell portion 14a and the bottom portion 14b of the container body 14 have the layer structures, from the inner side thereof, of polypropylene injection layer/polypropylene layer/bonded layer/ethylene vinyl alcohol copolymer layer/bonded layer/polypropylene layer and, accordingly, the gas-barrier property originally endowed for the ethylene vinyl alcohol copolymer can be exhibited.

Furthermore, in the described embodiment, an example in which the flanged portion 15 has a thickness uniform from the base end portion to the front end portion thereof, but an annular recess extending in a circumferential direction may be formed to the lower surface of the base end portion of the flanged portion 15 to thereby facilitate the seam clamping working of the flanged portion.

Specific Example

A specific example of the Basic Structure 1 will be described hereunder.

A laminated sheet was cut out so as to vacuum form a container blank having an inner diameter of 6.3 mm, a thickness of 35.0 mm and the plate blank 21 was cut out. The average thickness of the cut out plate blank 21 was 0.4 mm (comparison example 1). The shell portion 14a and the bottom portion 14b of the container body 14 were further made thick by 0.9 mm by carrying out the injection molding operation. The flanged portion was formed so as to have a thickness of 0.3 mm and a width of 2.0 mm.

The following results were obtained for this specific example and the comparison example.

TABLE

| | Laminated Sheet | Injection | Deformation in Vacuum Seaming | Oxygen Permeability (cc/24 hour: one container) measured after opening after reservation for two days after retort sterilization (120° C. × 40 min.) |
|---|---|---|---|---|
| Comparison 1 | PP/EVOH/PP | No | X | 1.00 |
| Example 1 | " | PP Outward | ◯ | 1.00 |
| Example 2 | " | PP Inward | ◯ | 0.10 |
| Example 3 | PET/polyallylate/PET | PP Outward | ◯ | — |

In this Table 1, the degree of oxygen permeability is a value based on the measurement reference OXTRAN 100 (ASTM D3985).

1-1-2 Basic Structure 2

Figure 6:
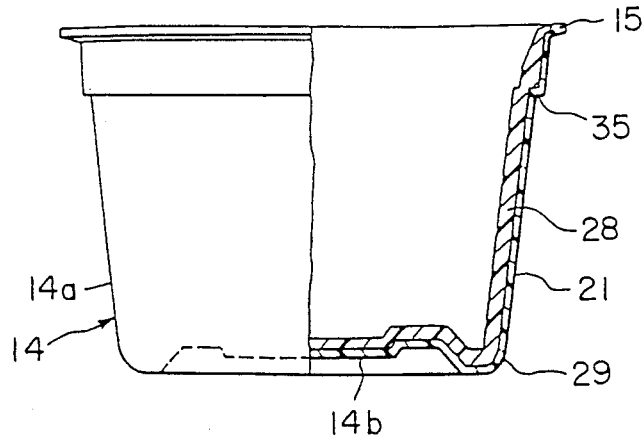
Figure 7:
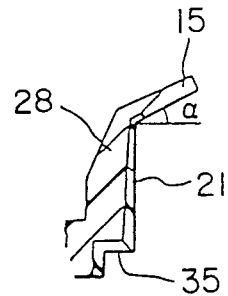

The basic structure 2 of the container provided with the metallic cover having a container body formed of a blank in shape of a container will be described hereunder with reference to FIGS. 6 and 7.

The basic structure 2 differs from the basic structure 1 merely in the shape of the container body 14 and a method of manufacturing the same. The container body 14 regarding the basic structure 2 will be described with reference to FIGS. 6 and 7.

The container body 14 is provided with a shell portion 14a and an upper stepped portion 35 from which the shell portion 14a extends upwardly obliquely so as to have an increased inner diameter. The flanged portion 15 of the container body 14 extends radially outwardly with a slight inclination (with an angle of α as shown in FIG. 7). An annular bottom edge portion 29 is formed to the peripheral edge of the bottom portion 14b of the container body so as to extend downwardly with a radius of R.

The manufacturing method of the container body 14 is described hereunder.

A heated laminated sheet is vacuum formed by the thermoforming core and the injection molding cavity in a manner described with reference to the basic structure 1 to thereby form a thermally formed product including a plurality of blanks 21 each in shape of a container and blanks each in shape of a flat plate.

In the next step, the product is taken out from the injection molding cavity and the plate blanks are cut out and removed by a cutting device equipped with a draw-out mold, not shown, having a cutter and a hydraulic shearing device, not shown, whereby only the container blanks 21 remain.

The container blanks 21 are then mounted in an injection molding core, not shown, and an injection molding cavity, not shown.

A thermally fusible resin 28 is thereafter injected along the surface and the end peripheral edge of the container blank 21 to thereby form the shell portion 14a and the bottom portion 14b together with the flanged portion 15, thus the container body 14 being formed. In the injection molding operation, when it is required to inject the thermally fusible resin 28 on the inner side of the container blank 21, the container blank 21 is mounted on the side of the injection molding cavity, whereas when it is required to inject the resin 28 on the outer side thereof, the container blank 21 is mounted on the side of the injection molding core.

According to this embodiment, the container blank 21 covers with substantially no space the shell portion 14a and the bottom portion 14b of the container body 14, so that the gas-barrier property of the container body 14 can be improved.

Concrete Example

A concrete example of the basic structure 2 will be described hereunder.

The laminated sheet for forming the heat formation product was formed of polypropylene (PP) 240μ/bonded layer 40μ/ethylene vinyl alcohol copolymer (EVOH) 40μ/bonded layer 40μ/polypropylene (PP) 240μ. As the polypropylene XF 1973 GRADE of CHISSO PETROCHEMICAL CORPORATION was utilized, as the ethylene vinyl alcohol copolymer EVAL T-102 GRADE of KURARAY CO. LTD. was utilized, and as the bonded layer ADOMER -QF-500 GRADE (MITSUI PETROCHEMICAL INDUSTRIES, LTD.) was utilized.

The heat formation of the laminated sheet was performed by the plug assist pressure vacuum method with the following formation conditions.

| | |
|---|---|
| Temperature of Cavity | 17° C. |
| Pre-heating | 150 to 180° C. |
| Mold Clamping Force | 200 kg/cm² |
| Air Pressure | 2 kg/cm² |
| Vacuum Pressure | 760 mmHg |

The injection molding operation for the surface and the end peripheral edge of the container blank 21 was performed with the following conditions.

| | |
|---|---|
| Injected Resin | Polypropylene of XK 6449 GRADE (MFR 7.0) |
| Cylinder Temperature | HN 240° C., H1 230° C., H2 220° C., H3 200° C. |
| Mold Temperature | 70° C. (constant) |
| Screen Revolution Speed | 70 rpm |
| Primary Pressure | 70 kgf/cm² |
| Secondary Pressure | 60 kgf/cm² |
| Injection Time | 6 sec. |
| Injection Molding Machine | TOSHIBA IS-80EPN |
| Mold | One-off Gate-type pin gate |

The respective portions of the container body 14 were as follows. The upper end opening of the shell portion 14a of the container body 14 had an inner diameter of 65.3 mm. The inner diameter of the bottom portion 14b of the container body 14 was 59.0 mm. The height between the bottom portion 14b and the lower end of the flanged portion 15 was 55.0 mm. The average thickness of the container blank 21 was 0.2 mm and the thickness and the width of the shell portion 14a and the bottom portion 14b after the injection molding were both 1.1 mm.

Furthermore, the flanged portion had a thickness of 0.4 mm and a width of 1.9 mm. The upper inclination of the flanged portion 15 was 15° (angle α in FIG. 7).

The container 10 provided with the metallic cover formed according to this embodiment provided a good deformation condition in case of seaming the container body and the metallic cover and an improved gas-barrier property.

1-1-3 Effects

According to this invention, since the flanged portion of the container body 14 can be formed with a predetermined shape, the double-seaming operation between the flanged portion 15 and the periphery 12 of the metallic cover 11 can be accurately performed to thereby obtain a container 10 provided with a metallic cover having an improved air-tight property. In addition, it is possible to improve the gas-barrier property and the strength of the container body, so that the container 10 provided with the metallic cover manufactured can provide a superior reservation characteristic for the content 19 and an improved rigidity.

1.2 Container provided with a metallic cover having a container body with four pillars

1-2-1 Basic Structure

FIGS. 8 to 12 represent a container provided with a metallic cover having a container body having four pillars.

Figure 8:
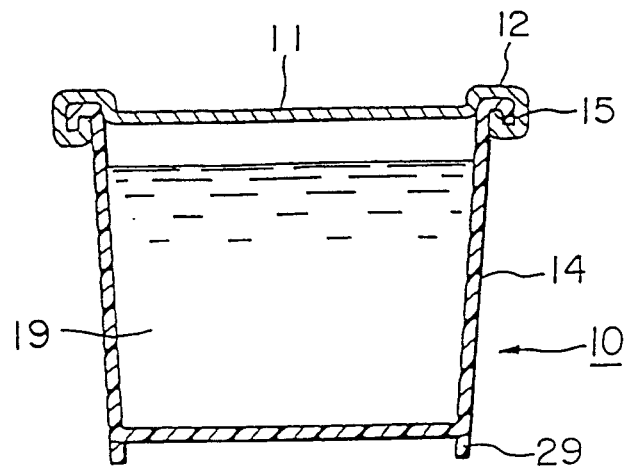
FIGS. 8 to 12 are views showing a container provided with a metallic cover having a container body provided with four pillars in the first embodiment of the container provided with the metallic cover according to this invention.
Figure 9:
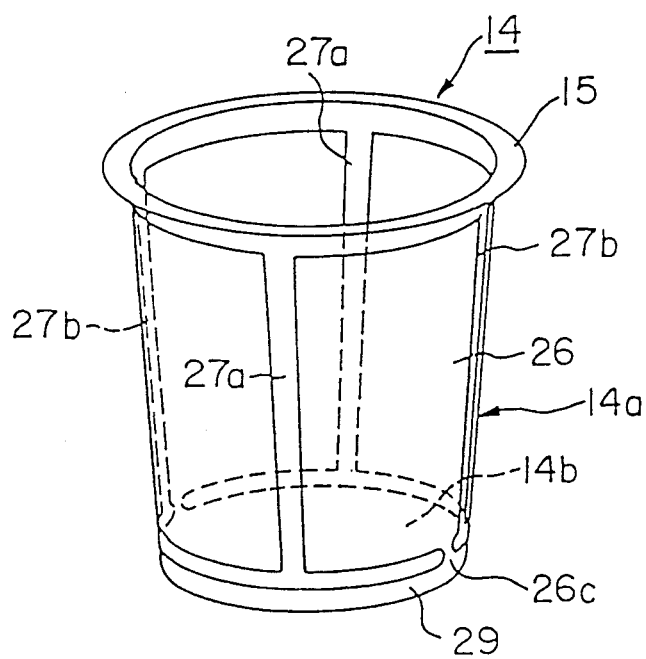

Referring to FIG. 8, a container 10 provided with a metallic cover is formed by roll-seaming the peripheral edge 12 of a metallic cover 11 to a flanged portion 15 formed around an upper end opening of a plastic container body 14.

The metallic cover is made of an aluminum metal or tinplate metal and the inner surface of the metallic cover 11 is preliminarily coated with an epoxy resin.

The container body 14 of the container provided with the metallic cover according to this invention will be described hereunder in conjunction with FIGS. 9 to 12.

The container body 14 comprises a shell portion 14a, a bottom portion 14b and a flanged portion 15. The shell portion 14a and the bottom portion 14b are formed of a sheet blank 26 having a gas-barrier property and a thermoplastic resin 28 injected on the surface of the sheet blank 26.

The shell portion 14a is provided with four pillars (columnar thickened portions) 27 and the bottom portion 14b is also provided with a peripheral edge 29 made of a thermoplastic resin 28 and extending downwardly.

Each of the pillars 27 protrudes inwardly from the inner surface of the shell portion 14a and has a wall thickness greater than that of the other portion of the shell 14a. The pillar 27 is composed of a portion 27a formed by embedding gaps between respective sheet blanks 26a, described later, for the shell portion 14a with the thermally fusible resin 28 and a portion 27b, in FIG. 7, formed by the thermally fusible resin 28 applied on the surface of the sheet blank 26. Both the portions 27a and 27b have wall thicknesses greater than those of the other portions of the shell 14a to increase the buckling strength of the container body 14. The portions 27a and 27b of the four pillars 27 are arranged with equal spaces in the circumferential direction, but the portions 27b are arranged at portions apart from a foldable portion 26c of the sheet blank 26 as described hereinafter.

Any type of sheet blanks may be utilized for the sheet blank 26 for forming the container body 14 according to this embodiment as far as the blank sheet is of a gas-barrier construction including a thermoplastic resin coat. However, it is necessary to use the same resin material for the thermoplastic resin 28 forming an injection molding product and the thermoplastic resin 28 forming the sheet blank 26 or to use a resin material which is thermally fusible. The sheet blank has the basic structure formed by a laminated sheet of the thermoplastic resin composed of layers of, from the outer surface to the inner surface of the container body 14, polyethylene terephthalate/aluminum foil polypropylene (CPP), (Dry Laminate); Composed paper (PP)/aluminum foil/polypropylene . (CPP), (Dry Laminate); Polyethylene terephthalate/vinylidene chloride copolymer/polypropylene (CPP), (Dry Laminate); Polyethylene terephthalate/ethylene vinyl alcohol copolymer/polypropylene (CPP), (Dry Laminate); Polypropylene (OPP)/polyethylene extrusion coating paper/aluminum foil/polypropylene (CPP), (Dry Laminate); Polypropylene (OPP)/polypropylene (CPP)/co-extrusion sheet of polypropylene ethylene vinyl alcohol copolymer and polypropylene, (Dry Laminate and Heat Laminate)

The sheet blank 26 of the type described above may be formed so as to have a thickness of the range between 100μ to 800μ. A drying agent may be mixed with the ethylene vinyl alcohol copolymer of the sheet layer structures described above. The drying agent acts to remove the water content contained in the ethylene vinyl alcohol copolymer to thereby prevent the lowering of the gas-barrier property thereof.

Figure 10:
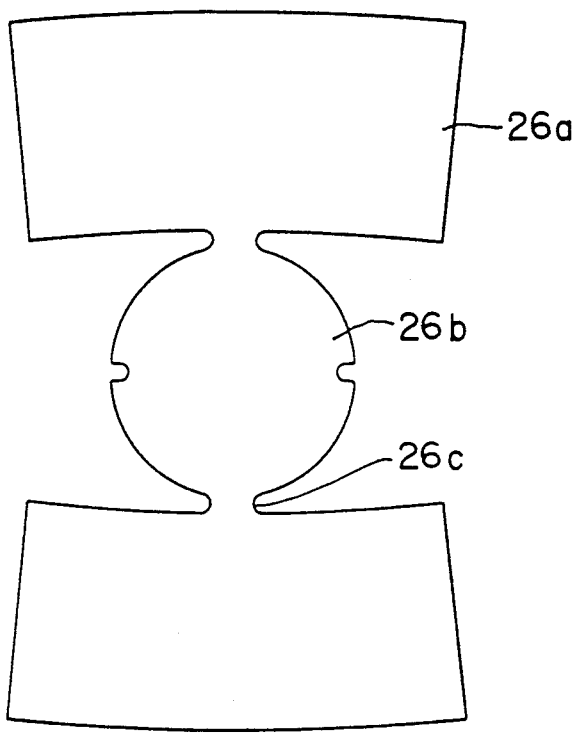
Figure 11:
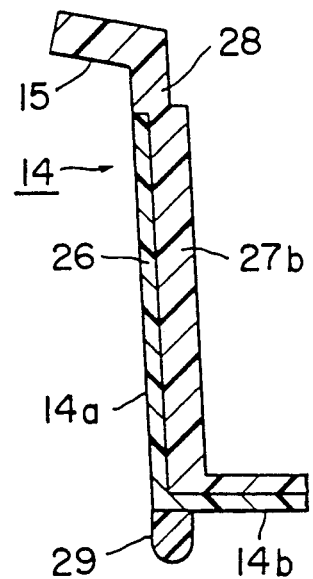

The sheet blank 26 to be utilized for this embodiment has a plate like shape as shown in FIG. 10 formed by punching out the laminated sheet of the type described above.

Namely, the sheet blank 26 is composed of a bottom sheet blank 26b corresponding to the bottom portion 14b of the container body 14 and a shell sheet blank 26a connected to the bottom sheet blank 26b and corresponding to the shell portion 14a of the container body 14.

The bottom sheet blank 26b and the shell sheet blank 26a are connected through a connecting foldable blank 26c and the sheet blank 26 is inserted into the mold after folded at the connecting foldable blank 26c.

As the thermally fusible resin 28 utilized for the injection molding, polypropylene, polyethylene, polystyrene, polycarbonate, nylon, polyethylene terephthalate, or the like may be listed up, but any kind of thermoplastic resin may be generally utilized. In the injection molding operation, when it is required to inject the thermally fusible resin 28 on the inner side of the sheet blank 26, the thermally fusible resin 28 for the injection molding operation must be selected from resins which are fusible to the resin forming the inner surface of the sheet blank 26. Accordingly, the inner surface of the sheet blank 26 is formed of the polypropylene, the polypropylene is selected for the thermally fusible resin 28, whereas when the polyethylene terephthalate is selected for the thermally fusible resin 28, it is desired to form the inner surface of the sheet blank 26 with the resin of polyethylene terephthalate type.

1-2-2 Manufacturing Method

The manufacturing method of the container 10 provided with the metallic cover will be described hereunder.

The manufacturing method of the container body 14 will be mentioned first.

Figure 12:
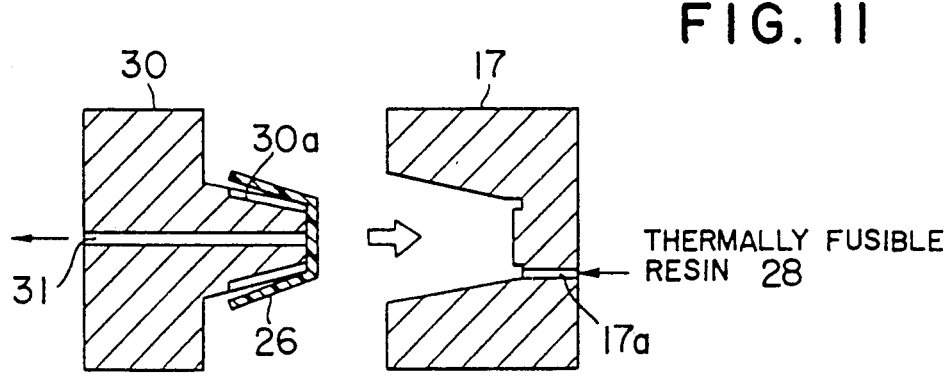

The sheet blank 26 is first set to the core 30 by being attracted by a vacuum hole 31 under the vacuuming condition as shown in FIG. 12. The core 30 is preliminarily provided with four vertical grooves 39a for forming four pillars 27.

According to this operation, the plate like sheet blank 26 is assembled into a cubic form with two spaces between the shell sheet blank 26a corresponding to the sheet portion 14a of the container body 14.

The sheet blank 26 mounted on the core 30 as shown in FIG. 12 is inserted into the cavity 17 as it is and the thermally fusible resin 28 is introduced into the cavity 17 through a gate 17a. The thermally fusible resin 28 is injected on the inner surface of the sheet blank 26 to thereby form the shell portion 14a, the bottom portion 14b, the flanged portion 15 and the bottom edge portion 29. At the same time, the thermally fusible resin 28 is introduced into the vertical grooves 30a of the core 30 to thereby form the pillars 27. Namely, the pillars 27a are formed at portions corresponding to the two gaps formed in the shell sheet blank 26a by the vertical grooves 30a of the core 30 and the pillars 27b are formed in the shell sheet blank 26a. In this case, a portion which forms the flanged portion of either one of the core 30 or the cavity 17 is provided with a gap having a uniform width throughout the base end portion and the front end portion, so that the formed flanged portion has the uniform thickness throughout the base end portion and the front end portion thereof.

A content 19 is then accommodated in the container body 14 and the peripheral portion 12 of the metallic cover 11 is thereafter seamed to the flanged portion of the container body 14.

According to this embodiment, the four pillars 27 each having the thickness larger than that of the other portions of the container body 14 are formed to the inner surface of the shell portion 14a so as to project inwardly, so that the buckling strength of the container body itself can be improved.

In the foregoing embodiment, there is shown an example in which the thermally fusible resin 28 is injected on the inner surface of the blank 26 for forming the container body, but the thermally fusible resin 28 may be injected on the outer surface of the blank 26, and in which the vertical grooves 30a are formed in the core 30 to form the pillars 27 protruding inwardly from the shell portion 14a, but the vertical grooves may be formed in the cavity to form the pillars 27 protruding outwardly from the shell portion 14a. Moreover, the number of the pillars are not limited to four and more than four pillars 27 may be formed. In the example, the thickness of the flanged portion is formed to be substantially uniform between the base end portion and the front end portion thereof, but an annular recess extending in the circumferential direction may be formed to the lower surface of the base end portion of the flanged portion 15 to thereby facilitate the easiness of the roll-seaming operation.

1-2-3 Concrete Example

A concrete example according to an embodiment of this invention will be described hereunder.

Experimental results with respect to the buckling strength in comparison of the container body 14 provided with four pillar portions and that provided with two pillar portions are shown in the following table.

| Filling Temperature | Buckling Strength (kg) | |
|---|---|---|
| | Two Pillars | Four Pillars |
| 20° C. | 80 | 100 |
| 60° C. | 50 | 100 |

As can be seen from this table, an improved buckling strength can be achieved according to this invention (in which four pillars are formed).

1-2-4 Effects

According to this invention, at least four pillar portions 27 each having a thickness larger than that of the other portions of the container body 14 are formed to the shell portion 14a of the container body 14, so that the buckling strength of the container body 14 can be improved and, hence, a container 10 provided with a metallic cover less damaged or broken even if dropped can be forwarded.

1.3 Containers provided with metallic covers each having a container body formed of a thermally fusible resin with specific feature

1-3-1 Basic Structure

Figure 13:
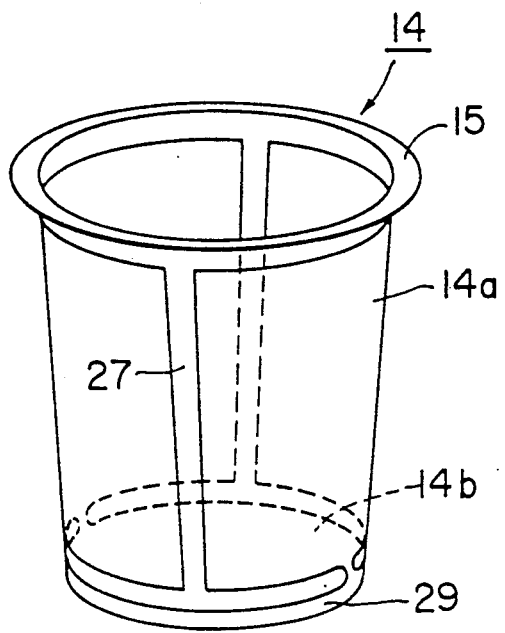
FIGS. 13 to 15 are views showing a container provided with a metallic cover having a container body made of a specific thermally fusible resin in the first embodiment of the container provided with the metallic cover according to this invention.
Figure 14:
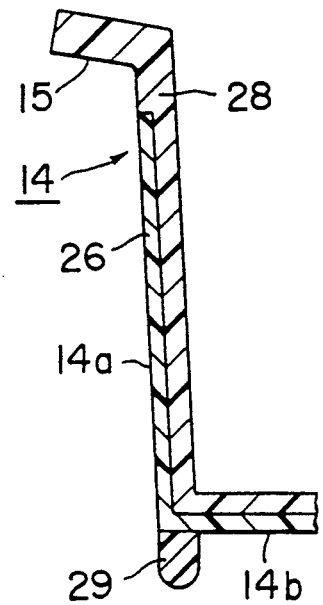
Figure 15:
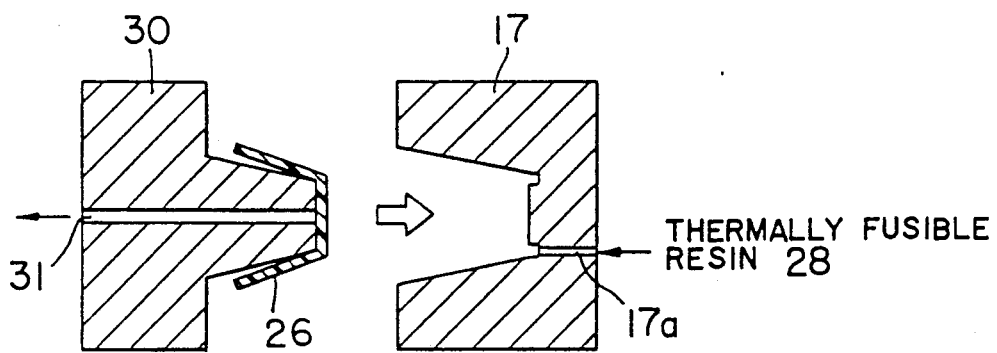

FIGS. 13 to 15 shows a container provided with a metallic cover having a container body formed of a thermally fusible resin having a specific feature.

The container 10 provided with the metallic cover is formed, as described with respect to the container body provided with four pillar portions in 1.2 described above (FIG. 8), by roll-seaming the peripheral edge 12 of the metallic cover 11 to the flanged portion 15 formed at the upper end opening of the plastic container body 14.

The metallic cover 11 is formed of a plastic or tinplate material and an epoxy resin is preliminarily coated on the inner surface of the metallic cover 11.

The container body 14 of the container 10 provided with the metallic cover according to this invention is shown in FIGS. 13 to 15.

The container body 14 is composed of a flanged portion 15, a shell portion 14a provided with pillar portions 27 and a bottom portion 14b provided with a bottom edge portion 29.

The flanged portion 15, the pillar portions 27 and the bottom edge portion 29 are formed of an injected thermally fusible resin 28. The shell portion 14a and the bottom portion 14b are formed of a sheet blank 26 having a gas-barrier property and the thermally fusible resin 28. The pillar portions 27 are formed, as described hereinafter, by filling gaps formed in a shell sheet blank 26a with the thermally fusible resin 28. The bottom edge portion 29 has an annular shape protruding downwardly and is adapted to support the container body 14.

Any type or kind of material including a thermoplastic resin coat as far as having the gas-barrier property, may be utilized for forming the sheet blank 26 to be used for forming the container body 14 according to this embodiment. However, the thermoplastic resin 28 forming an injection molding product and a resin forming the inner surface of the sheet blank 26 should be formed of the same resin or a thermally fusible resin. The basic structure of the sheet blank 26 may be formed by a laminated sheet of thermoplastic resins layered in the following order from the outer surface of the container body 14 towards the inner surface thereof.

Polypropylene (OPP)/polyethylene extrusion coating paper/aluminum foil/polypropylene (CPP), (Dry Laminate); and polypropylene (OPP)/polypropylene (CPP)/polypropylene ethylene vinyl alcohol copolymer-polypropylene co-extrusion sheet, (Dry Laminate and Heat Laminate)

The sheet blank 26 of the above described structure having a thickness of $100\mu$ to $800\mu$ may be utilized for the container body 14 according to this embodiment.

The sheet blank 26 of this embodiment has a flat plate shape formed by punching out the laminated sheet into the shape shown in FIG. 10 as described with respect to the container body 14 provided with the four pillar portions of 1.2 described hereinbefore.

Namely, the sheet blank 26 is composed of a bottom sheet blank 26b corresponding to the bottom portion 14b of the container body 14 and a shell sheet blank 26a corresponding to the shell portion 14a of the container body 14, the shell sheet blank 26a being connected to the bottom sheet blank 26b.

The shell sheet blank 26a and the bottom sheet blank 26b are connected through a foldable portion 26c and the sheet blank 26 is folded at this foldable portion 26c so as to be inserted into a mold.

A polypropylene (PP) type resin may be utilized as a thermally fusible resin 28 which is utilized for the injection molding and, among the polypropylene type resins, a resin, as the thermally fusible resin 28, only by which the flanged portion 15 and the bottom edge portion 29 of the container body 14 having an improved strength can be formed.

1-3-2 Manufacturing Method

A manufacturing method of the container 10 provided with the metallic cover will be described hereunder.

A manufacturing method of the container body 14 is first described.

The sheet blank 26 is first set to the core 30 by sucking the same through a vacuuming hole 31 of the core 30 as shown in FIG. 12.

The sheet blank 26 set to the core 30 is thereafter inserted as it is into the cavity 17 and the thermally fusible resin 28 is then introduced therein through the gate 17a of the cavity 17. The thermally fusible resin 28 is not only injected to form the flanged portion 15, the pillar portions 27 and the bottom edge portion 29 of the container body 14, but also injected on the surface of the sheet blank 26 inserted into the cavity 17 to thereby form the container body 14.

With the container body 14 thus formed, the flanged portion 15, the pillar portions 27 and the bottom edge portion 29 are formed of the thermally fusible resin 28 and the shell portion 14a and the bottom portion 14b are formed of the outside gas-barrier sheet blank 26 and the inside thermally fusible resin 28.

A content is packaged in the container body 14 and the peripheral edge 12 of the metallic cover 11 is thereafter seamed to the flanged portion 15 of the container body 14.

1-3-3 Specific Example

Specific experimental examples for determining the characteristics of the thermally fusible resin 28 to suitable values are shown hereunder.

Some kinds of polypropylene resins having physical properties different from each other as the thermally fusible resins were utilized for manufacturing containers provided with metallic covers, respectively. Thereafter, drop tests were performed with respect to these containers with metallic covers. The results of the tests are shown in the following table.

TABLE

| Item | Testing Method | Unit | Polypropylene A | Polypropylene B | Polypropylene C | Polypropylene D | Polypropylene E | Polypropylene F |
|---|---|---|---|---|---|---|---|---|
| Characteristics | | | | | | | | |
| MFR | JISK6758 | g/10 min. | 10.1 | 12.3 | 16.6 | 24.4 | 8.0 | 12.0 |
| Bending Elasticity | JISK7203 | kg/cm$^2$ | 15000 | 15000 | 19000 | 18000 | 19000 | 12000 |
| Bending Strength | JISK7203 | kg/cm$^2$ | 410 | 460 | 520 | 500 | — | 410 |
| Izod (23° C.) | JISK7110 | kg-cm/cm | 5.1 | 4.3 | 3.0 | 4.0 | 2.2 | 4.5 |
| Thermo-deforming Temperature | JISK7207 | °C. | 114 | 114 | 126 | 125 | 125 | 114 |
| Drop Test | | | | | | | | |
| Sample Numbers | | | 10 | 10 | 10 | 10 | 10 | 10 |
| Contents Leaked Numbers | | | 0 | 2 | 7 | 2 | 3 | 0 |
| Good Product | | | 10 | 8 | 3 | 8 | 7 | 10 |
| Result | | | ⊚ | △ | X | △ | △ | ⊚ | where MFR: Melt Flow Rate

The respective containers 10 provided with metallic covers utilized for these tests each provided with a bottom edge portion having a diameter of 61 mm, a height of 54 mm and an inner volume of 150 ml.

As is clear from the table, good results of the dropping down tests could be obtained with respect to the polypropylenes of the types A and F and no content leaked. On the other hand, with respect to the polypropylenes of the types B, C, D and E, the bottom edge portions 29 of some of containers 10 with the metallic covers were damaged and parts of the contents leaked.

From the above, it was found that, containers formed of some of the polypropylenes of the types A to F, which have MFR values less than 12 g/10 min., bending elasticity ratio more than 12,000 kg/cm$^2$ and Izod impact value more than 4.5 kg-cm/cm were not damaged at the bottom edge portions 29 and the contents did not leak.

Although the dropping tests were performed for the containers formed of the polypropylenes, it will be foreseen that substantially the same results will be obtained even in a case where the drop tests be carried out to the containers formed of another thermally fusible resin which has substantially the same physical property as that described above.

1-3-4 Effects

According to this invention, the strength of the bottom edge portion of the container body 14 can be improved and the bottom edge portion 29 of the containers can be prevented from being damaged when dropped. For this reason, a container provided with a metallic cover which is free from contents leakage can be obtained.

§2. Second Embodiment of Container provided with Metallic Cover

Container having a container body formed of a laminated layer subjected to sheet forming treatment

2-1-1 Basic Structure

FIGS. 16 to 19 show a container provided with a metallic cover having a flanged portion having a substantially entirely uniform thickness.

Figure 16:
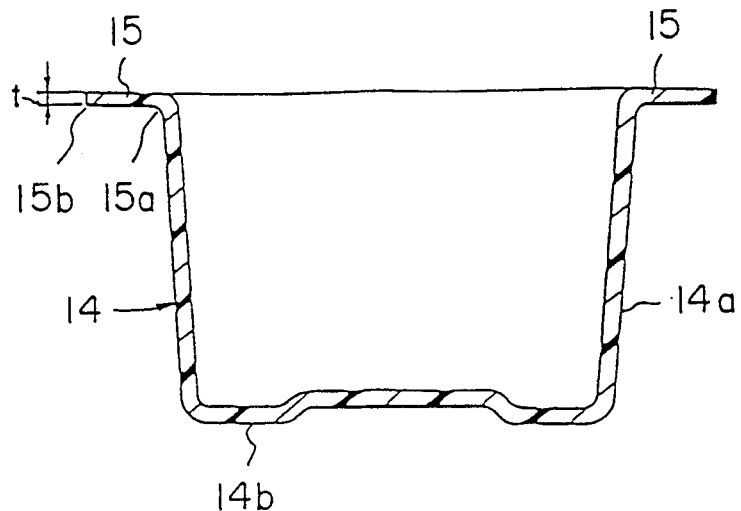
FIGS. 16 to 19 are views showing a container provided with a metallic cover having a container body provided with a flanged portion having a substantially uniform thickness in the second embodiment of the container provided with the metallic cover according to this invention.

A container body of the container provided with the metallic cover according to this invention will be first described hereunder with reference to FIG. 16. Referring to FIG. 16, the container body 14 is entirely formed of a plastic material and comprises a shell portion 14a provided with an upper end opened, a bottom portion 14b and a flanged portion 15 disposed at the peripheral edge of the opening of the shell portion 14a and extends radially outward therefrom.

The flanged portion 15 of the container body 14 has substantially the same thickness t from the base end 15a to the front end 15b.

The container body 14 of the character described above is filled with a content 19 of high temperature and the peripheral edge portion 12 of the metallic cover 11 is roll-seamed to the flanged portion to thereby form a container 10 provided with a metallic cover (refer to FIG. 8).

2-1-2 Manufacturing Method

A manufacturing method for the container provided with the metallic cover of the type described above will be described hereunder.

Figure 19:
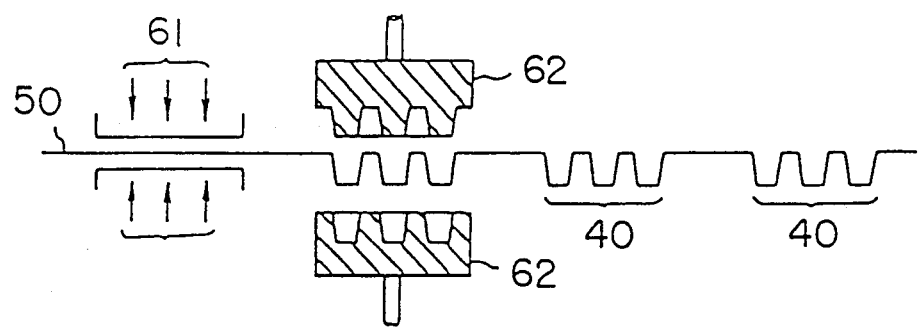

Reference should be first made to FIG. 19, through which thermoforming processes due to a general sheet forming process for manufacturing a product of a container body are explained.

A plastic sheet 50 having a thickness adequate for forming a container is first heated by a heating device 61 and a product 40 including a plurality of container bodies 14 is molded by a usually known molding method by means of a mold 62. A pressure forming or vacuum forming, or a combination thereof may be utilized for this molding method.

Each of the container bodies 14 of the mold product 40 is provided with a shell portion 14a has a thickness and strength sufficient for withstanding the pressure applied thereto during the double seaming process. However, the flanged portion 15 thus formed has a large thickness which is not applicable for the double seaming process, and accordingly, a further pressing process is required for the formation of the flanged portion 15.

It is desired for the plastic sheet 50 for forming the container body 14 to be formed of a plastic laminated material having a less permeability with respect to an oxygen gas and water vapor in order to preserve food in the container. It is therefore desired for food preserving containers that the oxygen gas barrier property be less than 0.8 cc/one article; 24 hrs. atm. (20° C., 90%RH) and the H₂O gas barrier property is less than 0.2 g/one article; 24 hrs. atm. (40° C., 90%RH).

In the subsequent steps, a plurality of container bodies 14 constituting the mold product 40 are separated respectively. The thickness of the flanged portion 15 is reduced by the pressing process and the width of the flanged portion 15 is cut so as to have a predetermined width by a cutting process to thereby obtain a container body 14 such as shown in FIG. 16.

The pressing and cutting processes of the flanged portion 15 will be described hereunder with reference to FIGS. 17 and 18.

Figure 17:
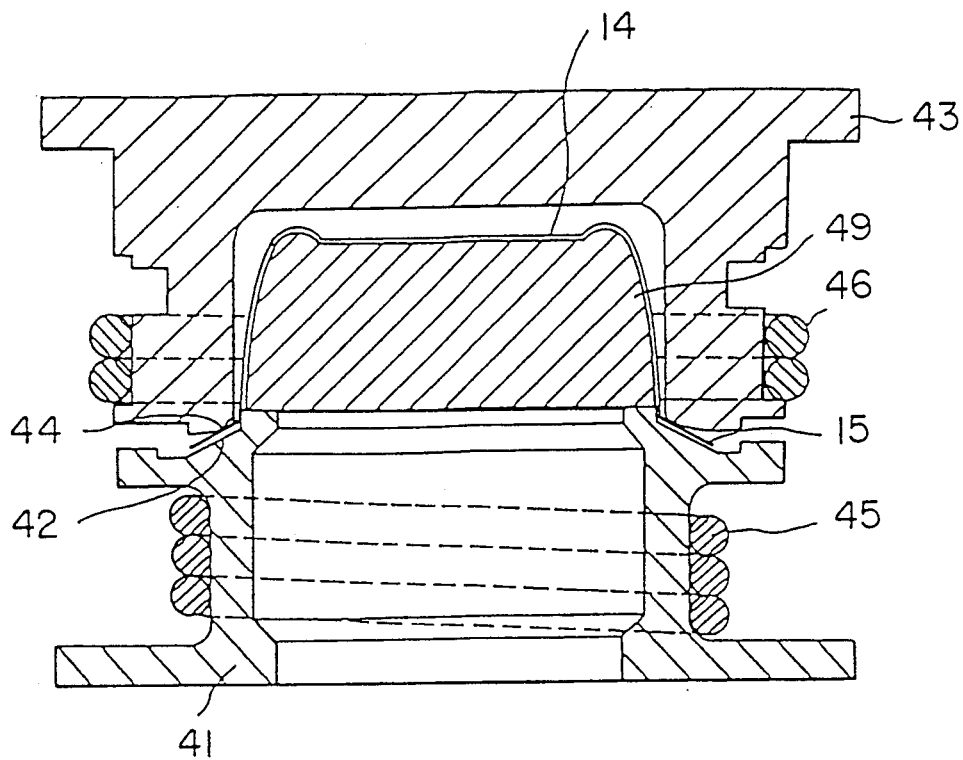

Referring to FIG. 17, a pressing device for carrying out the pressing process comprises a press male mold half 41 in which the plastic container body 14 is mounted in an inversed state and a press female mold half 43 arranged above the press male mold half 41 to be vertically movable.

The press male mold half 41 is provided with an abutting surface 42 which abuts against the upper surface of the flanged portion 15 of the container body 14 and the press female mold half 43 is also provided with an abutting surface which abuts against the lower surface of the flanged portion 15. A heating heater 45 is wound around the outer periphery of the press male mold half 41 to heat the same and a heating heater 46 is likely wound around the outer periphery of the press female mold half 43 to heat the same.

The gap between the abutting surfaces 42 and 44 of the male and female mold halves 41 and 43 has a width substantially equal to the distance between the base end 15a and the front end 15b of the flanged portion 15.

The pressing process is carried out as follows.

A guide member 49 having an outer shape corresponding to the inner shape of the container body 14 separated from the mold product 40 is inserted into the container body 14 and then mounted on the press male mold half 41 with the flanged portion 15 downward. The press female mold half 43 is then lowered so as to snap and press, while heating, the flanged portion 15 between the abutting surfaces 42 and 44 of the mold halves 41 and 43 to thereby form the flanged portion 15 having a predetermined thickness. The press female mold half 43 may be actuated by hydraulic or pneumatic assembly.

When the thickness of the flanged portion has reached to the predetermined value, the press female mold half 43 is elevated, whereby the pressing process for forming the flanged portion 15 having a reduced thickness has been completed.

In accordance with this pressing process, the thickness of the flanged portion 15 is reduced to the predetermined value t substantially uniformly from the base end 15a to the front end 15b thereof. It may be desired for the flanged portion 15 to have a thickness t of 0.25 to 0.9 mm. It is also desired that the thickness t of the flanged portion 15 is within the range of $0.9 t_0 \geq t_1 \geq 0.4 t_0$ and, preferably, $0.9 t_0 \geq t_1 \geq 0.6 t_0$, where $t_0$ is an original thickness of the flanged portion 15 and $t_1$ is a thickness after pressed. Namely, in the range of $t_1 \geq 0.9 t_0$, the thickness of the flanged portion 15 is too large to sufficiently compensate for the unevenness of the thickness and to carry out a desired double seaming process.

In the range of $t_1 \leq 0.4 t_0$, the flanged portion 15 is excessively crushed, so that a relatively large volume of plastic material for forming the flanged portion 15 will be extruded. For this reason, a series of lumps may be formed around the pressed portion or the flanged portion 15 may be thermally deformed and, hence, the flanged portion 15 having a uniform thickness will not be formed.

Since the guide member 49 is inserted into the container body 14 during the pressing process, the stable positioning of the container body 14 will be achieved and the pressing process can thus be performed with high accuracy. The formation of a series of lumps in the container body 14 can be prevented, so that the shape of the flanged portion is not deformed.

Figure 18:
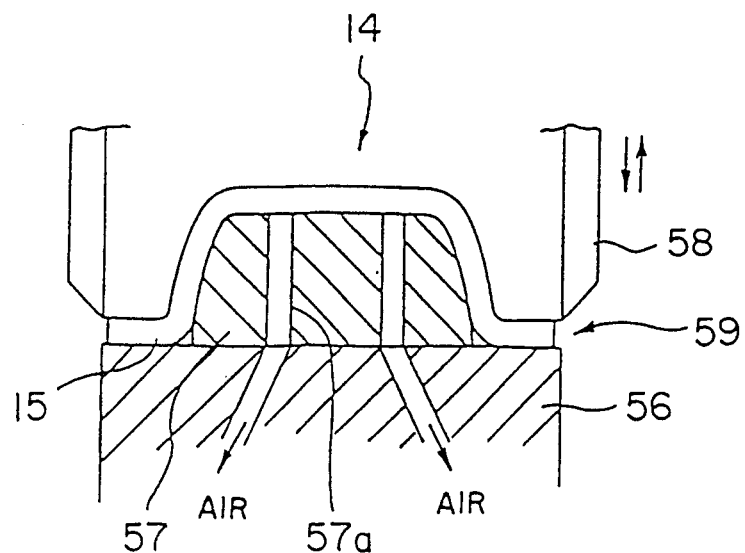

The container body 14 is thereafter cooled for the predetermined time and the flanged portion 15 is cut by means of the cutting device as shown in FIG. 18 so as to have a predetermined width.

The cutting device comprises a cut male half 56 and a cylindrical cut female half 58 disposed above the cut male half 56 to be vertically movable.

A guide member 57 having an outer shape corresponding to an inner shape of the container body 14 is inserted into the container body 14 and the container body 14 is arranged on the cut male half 56 with the flanged portion downward. During this process, the container body 14 is vacuum secured to the guide member 57 by means of a vacuuming passage 57a formed in the guide member 57a.

The cut female half 58 is thereafter lowered to punch out the flanged portion 15 in engagement with the peripheral portion of the cut male half 56 to form the flanged portion 15 having a predetermined width.

Since the guide member 57 is inserted during the cutting process, the container body 14 is stably positioned on the cut male half 56 and the flanged portion 15 is therefore cut with high accuracy.

Highly heated contents 19 be accommodated in the thus formed container body 14. The peripheral portion 12 of the metallic cover 11 is roll seamed to the flanged portion 15 of the container body, thus forming the container 10 provided with the metallic cover (FIG. 8).

When the flanged portion 15 is roll seamed with the peripheral edge 12 of the metallic cover 11, since the thickness t of the flanged portion 15 is made substantially uniform from the base end 15a to the front end 15b, the softening of the base end 15a of the flanged portion 15 due to the highly heated content 19 is minimized in comparison with the flanged portion having a thickness less than t. Therefore, the seaming process can be effectively performed with a uniform and sufficient seaming strength entirely throughout the base end 15a and the front end 15b.

2-1-3 Effects

According to this invention, the peripheral edge 12 of the metallic cover 11 can be seamed to the flanged portion 15 of the container body 14 in a uniformly and safely sealed manner throughout the base end 15a and the front end 15b of the flanged portion 15 even if the container is filled with highly heated contents. Accordingly, a container provided with a metallic cover which is free from the leakage of the contents can be provided.

2.2 Container provided with a metallic cover having a container body formed by a laminated material including ethylene vinyl alcohol copolymer containing a drying agent

2-2-1 Basic Structure

FIGS. 20 to 22 show a container provided with a metallic cover having a container body formed by a laminated material including ethylene vinyl alcohol copolymer containing a drying agent.

The container 10 provided with the metallic cover is formed by roll seaming the peripheral portion 12 of the metallic cover 11 made of such as aluminum or tin plate metal to the flanged portion 15 of the plastic container body 14 (see FIG. 8).

2-2-2 Manufacturing Method

The manufacturing method of the plastic container body 14 will be described hereunder with reference to FIGS. 20 to 22.

A laminated material 50 of plastics having a thickness necessary for the formation of the container due to a general thermoforming method is heated by means of a heating device 61 and a mold product 60 is molded by a generally known forming method by means of a mold 62. A pressure forming method or a vacuum forming method, or a combination method thereof may be utilized for the forming method (process A).

The plastic laminated material 50 for forming the container body 14 has a less permeability to the oxygen gas and the water vapor when the container is manufactured for the preservation of foods.

The followings may be listed up as a layer structure for the laminated material 50.

Polypropylene/bonded layer/ethylene vinyl alcohol copolymer (EVOH)/bonded layer/polypropylene; and Polystyrene/bonded layer/ethylene vinyl alcohol copolymer (EVOH)/bonded layer/polystyrene.

A drying agent such as $CaCl_2$, $CaO$, $NaCl$, or $Na_4PO_4$ is preliminarily mixed in the EVOH layer of the lamination structure described above. Namely, the drying agent may be mixed in a time when the laminated material 50 is formed during the co-extrusion process.

The product 40 formed by the process A is not adopted as a mold product because of the flanged portion having a large thickness is not suitable for the double seaming process. For this reason, the flanged portion 15 is subjected to the heat pressing process to reduce the thickness thereof for improving the molding process.

Namely, the molded container body 14 is inserted into the cavity 69 as shown in FIG. 21, which is heated and the surface of which is processed by the surface treatment by utilizing such as Teflon for improving the mold removability. A heated plug means 70 is then lowered from the upper portion to crush the flanged portion 15 (FIG. 21). The plug means 70 may be actuated by hydraulic means or pneumatic means. When the thickness of the flanged portion 15 has reached to the predetermined value, the plug means 70 is elevated and the flange crushing process has thus been completed (process B).

The product 40 provided with the flanged portion having the predetermined thickness through the process B is then punched out by means of a plug 74 provided with a cutter 73 so that the flanged portion 15 has a predetermined width (process C).

The container body 14 is manufactured in accordance with the processes described above. The container body 14 is then filled with a content 19 and the peripheral portion 12 of the metallic cover 11 is roll seamed to the flanged portion 15 of the container body 14 to thereby produce a container provided with a metallic cover (see FIG. 8).

According to this embodiment, since the drying agent is preliminarily mixed in the EVOH layer of the lamination structure of the laminated material 50 forming the container body 14, the water content mixed in the EVOH layer can be surely removed, whereby the lowering of the gas-barrier property of the EVOH layer due to the presence of the water content can be effectively prevented.

2-2-3 Effects

According to this invention, since the drying agent is preliminarily mixed in the ethylene vinyl alcohol copolymer layer of the lamination structure forming the plastic container body 14, the lowering of the gas-barrier property of the ethylene vinyl alcohol copolymer layer can be surely prevented and, therefore, the reservation and maintenance abilities of the container 10 provided with the metallic cover can be remarkably improved.

2.3 Container provided with a metallic cover having a container body provided with a flanged portion having a lower base end in which an annular recess is formed

2-3-1 Basic Structure

Figure 23:
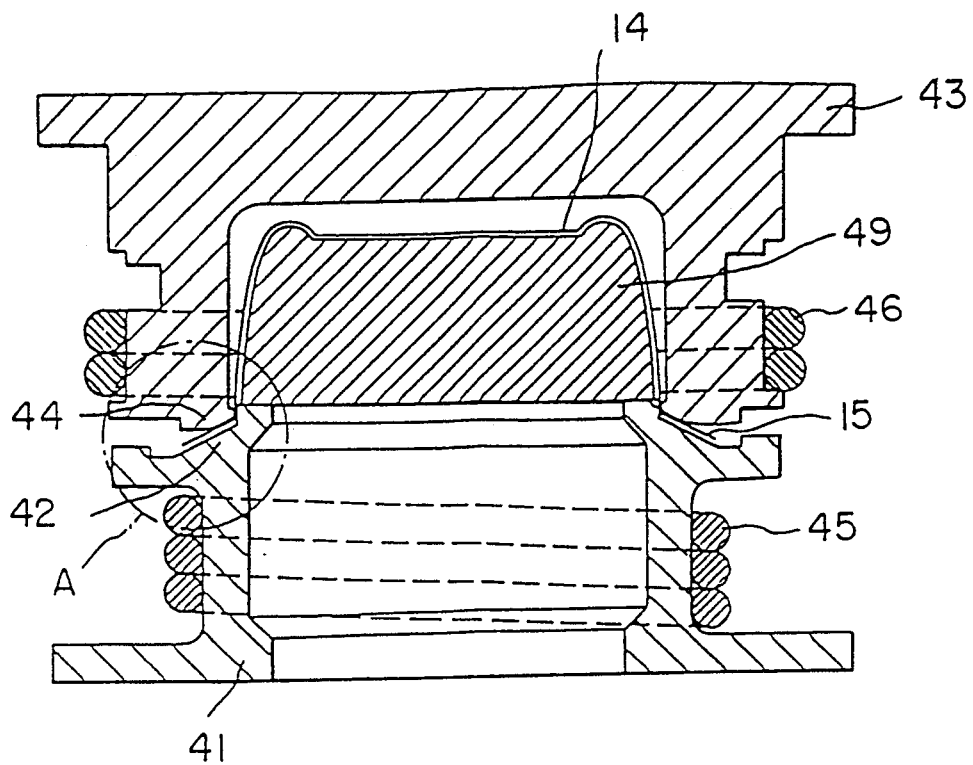
FIGS. 23 to 26 are views showing a container provided with a metallic cover having a container body provided with a flanged portion having a base end on the surface of which an annular recess is formed in the second embodiment of the container provided with the metallic cover according to this invention.
Figure 24:
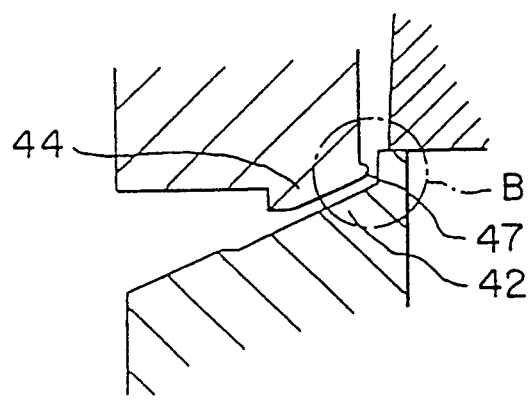
Figure 25:
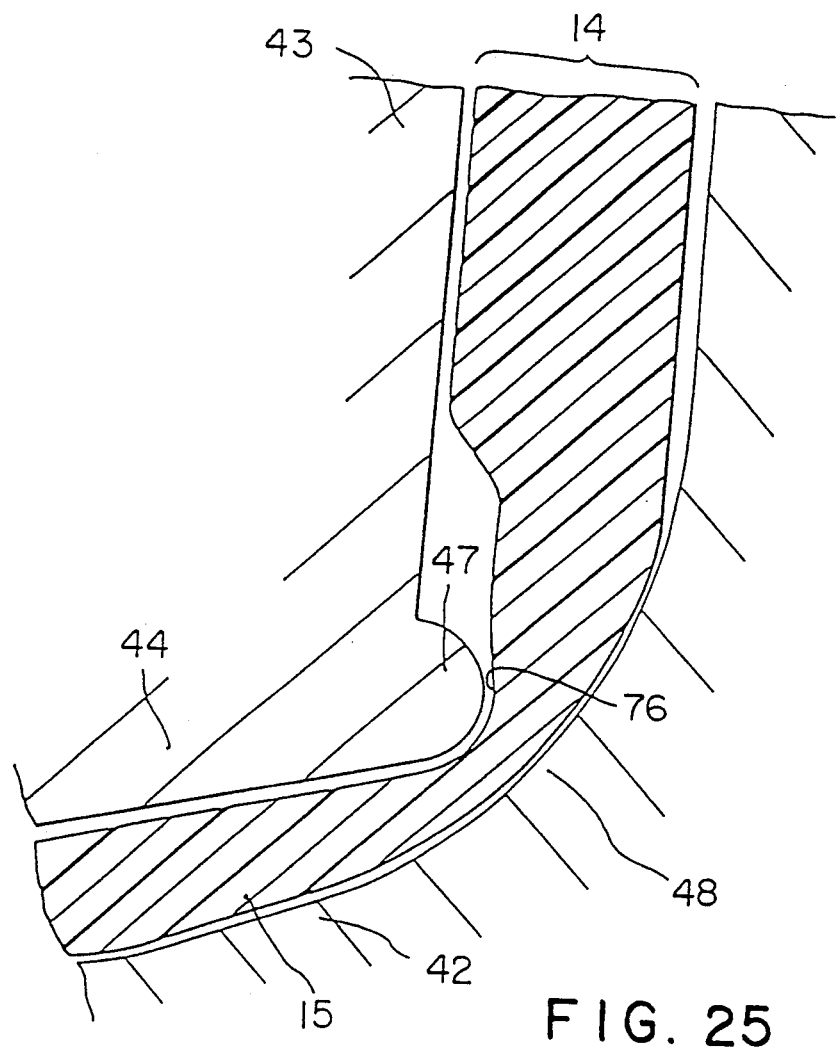

FIGS. 23 to 26 show a container provided with a metallic cover having a container body provided with a flanged portion having a lower base end in which an annular recess is formed and FIG. 24 is an enlarged view of the portion A shown in FIG. 23 and FIG. 25 is also an enlarged view of the portion B shown in FIG. 24.

Figure 26:
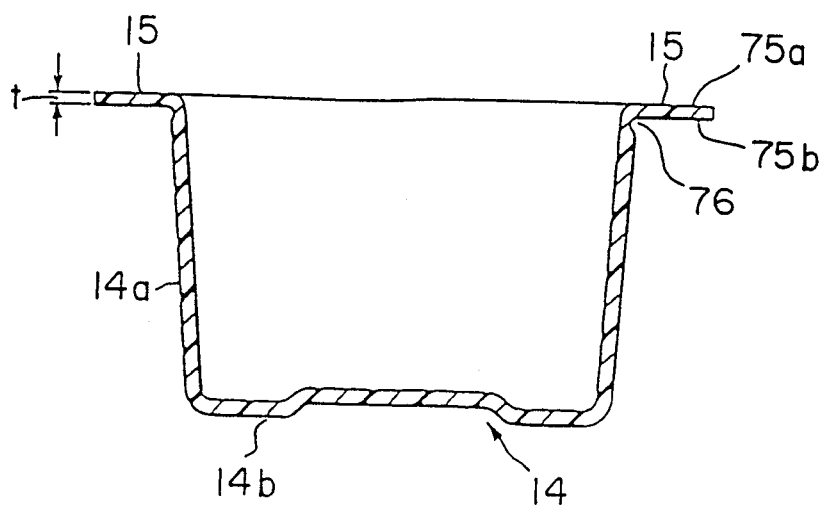

A container body according to this invention will first be explained with reference to FIG. 26. Referring to FIG. 26, the container body 14 is composed of a shell portion 14a provided with an upper end opened, a bottom portion 14b, and a flanged portion 15 formed at the upper end opening of the shell portion 14a and extending radially outwardly therefrom. The container body 14 is entirely made of a plastic material.

The flanged portion 15 is provided with an upper surface 75a and a lower surface 75b, which has a base end in which an annular recess 76 extending in a circumferential direction is formed.

A container 10 provided with a metallic cover is formed by roll seaming the peripheral portion 12 of the metallic cover 11 to the flanged portion 15 of the container body 14 of the construction described above (see FIG. 8).

With the container of this character, since the annular recess 76 is formed in the base end of the lower surface 75b of the flanged portion 15 so as to extend in the circumferential direction, the flanged portion 15 is pliably bent at this annular recess 76, whereby the peripheral portion 12 of the metallic cover 11 can be more easily roll seamed to the flanged portion 15 of the container body 14.

2-3-2 Manufacturing Method

The manufacturing method of the plastic container body of the structure described above will be explained hereunder.

As shown in FIG. 22 with respect to the container provided with the metallic cover described in section 2.2, processes for manufacturing a mold product of the container body by a thermoforming treatment due to a general sheet forming process will be described hereunder.

A plastic sheet 50 having a thickness adequate for forming a container is first heated by a heating device 61 and a product 40 including a plurality of container bodies 14 is molded by a usually known molding method by means of a mold 62. A pressure forming or vacuum forming, or a combination thereof may be utilized for this molding method.

Each of the container bodies 14 of the mold product 40 is provided with a shell portion 14a has a thickness and strength sufficient for withstanding the pressure applied thereto at the double seaming process. However, a flanged portion 15 thus formed has a large thickness which is not applicable for the double seaming process, and accordingly, a further pressing process is required for the formation of the flanged portion 15.

It is desired for the plastic sheet 50 for forming the container body 14 to be formed of a plastic laminated material having a lower permeability with respect to an oxygen gas and water vapor in order to preserve food in the container. It is therefore desired for food preserving containers that the oxygen gas barrier property of the container be less than 0.8 cc/100 cc; 24 hrs. atm. (20° C., 90%RH) and the H$_2$O gas barrier property is less than 0.2 g/100 cc; 24 hrs. atm. (40° C., 90%RH).

In the subsequent steps, a plurality of container bodies 14 constituting the mold product 40 are separated respectively. The thickness of the flanged portion 15 is reduced by the pressing process and the width of the flanged portion 15 is cut so as to have a predetermined width by a cutting process to thereby obtain a container body 14 such as shown in FIG. 26.

The pressing and cutting processes of the flanged portion 15 will be described hereunder with reference to FIGS. 23 and 25.

Referring to FIGS. 23 to 25, a pressing device for carrying out the pressing process comprises a press male mold half 41 in which the plastic container body 14 is mounted in an inversed state and a press female mold half 43 arranged above the press male mold half 41 to be vertically movable.

The press male mold half 41 is provided with an abutting surface 42 which abuts against the upper surface 75a of the flanged portion 15 of the container body 14 and the press female mold half 43 is also provided with an abutting surface 44 which abuts against the lower surface 75b of the flanged portion 15. A heating heater 45 is wound around the outer periphery of the press male mold half 41 to heat the same and a heating heater 46 is likely wound around the outer periphery of the press female mold half 43 to heat the same.

An annular projection 47 extending in the circumferential direction is formed inside the abutting surface 44 of the press female mold half 43.

The annular projection 47 will be described in detail in conjunction with FIG. 25.

The annular projection 47 has a semicircular cross section. A curved surface 48 is formed on the abutting surface 42 of the press male mold half 41 to correspond to the shape of the annular projection 47. The curved surface 48 has a radius seven or eight times the radius of the annular projection 47.

The annular recess 76 is formed at the base end of the lower surface 75b of the flanged portion of the container body so as to extend in the circumferential direction thereof in combination of the annular projection 47 and the curved surface 48.

The distance between the abutting surface 42 and the abutting surface 44 is widened outwardly (leftwardly as viewed in FIG. 25). For this reason, an extra portion of the flange forming portion is extruded outwardly during the pressing process, whereby a series of lumps is never formed and the pressing process can be performed with an improved accuracy.

The pressing process is carried out as follows.

A guide member 49 having an outer shape corresponding to the inner shape of the container body 14 separated from the mold product 40 is inserted into the container body 14 and then mounted on the press male mold half 41 with the flanged portion 15 downward. The press female mold half 43 is then lowered so as to snap and press, while heating, the flanged portion 15 between the abutting surfaces 42 and 44 of the mold halves 41 and 43 to thereby form the flanged portion 15 having a predetermined thickness. The press female mold half 43 may be actuated by hydraulic or pneumatic means.

When the thickness of the flanged portion has reached to the predetermined value, the press female mold half 43 is elevated, whereby the crushing process for forming the flanged portion 15 has been completed.

In accordance with this pressing process, the thickness of the flanged portion 15 is reduced to the predetermined value and the annular recess 76 extending in the circumferential direction is formed in the base end of the lower surface 75a of the flanged portion 15. It may be desired for the flanged portion 15 to have a thickness t of 0.25 to 0.9 mm. It is also desired that the thickness t of the flanged portion 15 is within the range of 0.9 $t_0 \geq t_1 \geq 0.4\ t_0$ and, preferably, 0.9 $t_0 \geq t_1 \geq 0.6\ t_0$, where $t_0$ is an original thickness of the flanged portion and $t_1$ is a thickness after the pressing. Namely, in the range of $t_1 \geq 0.9\ t_0$, the thickness of the flanged portion 15 is too large to sufficiently compensate for the unevenness of the thickness and to carry out a desired double seaming process.

In the range of $t_1 \leq 0.4\ t_0$, the flanged portion 15 is excessively crushed, so that a relatively large volume of plastic material for forming the flanged portion 15 will be extruded. For this reason, a series of lumps may be formed around the pressed portion or the flanged portion 15 may be thermally deformed and, hence, the flanged portion 15 having a uniform thickness will not be formed.

Since the guide member 49 is inserted into the container body 14 during the pressing process, the stable positioning of the container body 14 will be achieved and the pressing process can thus be performed with high accuracy. The formation of a series of lumps in the container body 14 can be prevented, so that the shape of the flanged portion never be deformed.

The container body 14 is thereafter cooled for the predetermined time and, thereafter, the flanged portion 15 is cut by means of the cutting device as shown in FIG. 18 and described with respect to the container provided with the metallic cover of 2.1 so as to have a predetermined width.

As shown in FIG. 18, the cutting device comprises a cut male half 56 and a cylindrical cut female half 58 disposed above the cut male half 56 to be vertically movable.

A guide member 57 having an outer shape corresponding to an inner shape of the container body 14 is inserted into the container body 14 and the container body 14 is arranged on the cut male half 56 with the flanged portion downward. During this process, the container body 14 is vacuum secured to the guide member 57 by means of a vacuuming passage 57*a* formed in the guide member 57.

The cut female half 58 is thereafter lowered to punch out the flanged portion 15 in engagement with the peripheral portion of the cut male half 56 to form the flanged portion 15 having a predetermined width. It is desired for the flanged portion 15 to have a width having a thickness of about 1.0 to 2.5 mm.

Since the guide member 57 is inserted during the cutting process, the container body 14 is stably positioned on the cut male half 56 and the flanged portion 15 is therefore cut with high accuracy.

With the embodiment described above, it may be possible to arrange a cooling pipe inside the guide member 49 of the pressing device and the guide member 57 of the cutting device to cool the guide members. In such case, the transferring of the heat to the container body 14 during the pressing and cutting processes can be effectively prevented, whereby the deformation of the container body 14 can also be surely prevented.

2-3-3 Effects

According to this invention, since the circumferentially extending annular recess 76 is formed in the base end of the lower surface 75*b* of the flanged portion 15, the flanged portion 15 is liably easily bent at this recessed portion 76, whereby the peripheral portion 12 of the metallic cover 11 can be easily seamed to the flanged portion of the container body 14. In addition, since the circumferentially extending annular projection 47 is formed inside the abutting surface 44 of the press female mold half 43 of the pressing device, the annular recess 76 can be easily formed to the base end of the lower surface of the flanged portion 15 during the pressing process.

§3. Third Embodiment of Container provided with Metallic Cover

Container provided with a sealing member disposed at a seaming portion

3.1 Container provided with a metallic cover having a heat sealing member as a sealing member

3-1-1 Basic Structure

Figure 27:
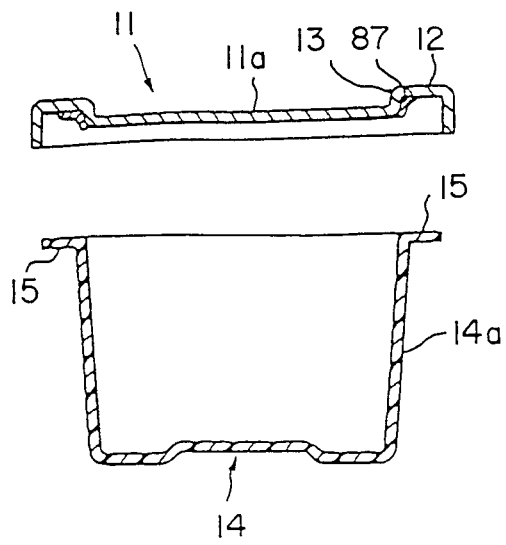
FIGS. 27 to 29 are views showing a container provided with a metallic cover having a container body formed of a sealing member of a heat sealing member in the third embodiment of the container provided with the metallic cover according to this invention.
Figure 28:
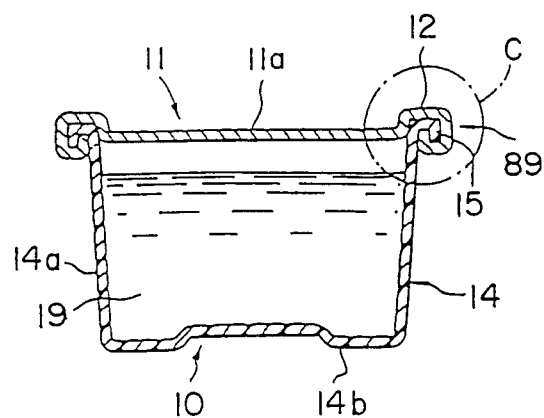
Figure 29:
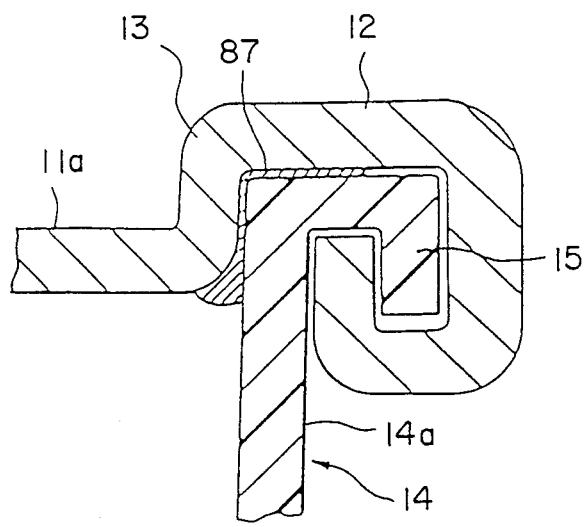

FIGS. 27 to 29 show a container provided with a metallic cover having a heat sealing member as a sealing member for the container, wherein FIG. 27 shows a container before seaming, FIG. 28 shows the container after the seaming and FIG. 29 is an enlarged view of a portion C in FIG. 28.

The container 10 provided with the metallic cover is composed of a plastic container body 14 having a flanged portion 15 formed around the upper end opening of a shell portion 14*a* and a metallic cover 11 having a peripheral edge 12 which is roll seamed to the flanged portion 15. The metallic cover 11 is composed of a cover body 11*a* for sealing the opening of the container body 14 and a shoulder portion 13 formed between the cover body and the peripheral edge 12.

A heat sealing member 87 is disposed near the shoulder portion 13 and is positioned between the peripheral edge 12 of the metallic cover 11 and the flanged portion 15 of the container body 15 when the cover is sealed.

The metallic cover 11 according to this embodiment is made of a tinplate metal or aluminum metal.

The plastic container body 14 is not limited in the material and may be formed of a material having a hardness and strength sufficient for withstanding the roll seaming force and a laminated material mainly composed of olefine type resin and polypropylene will be preferably utilized. The flanged portion 15 of the container body 14 has a thickness of 0.2 to 1.0 mm and a width of 1.0 to 2.5 mm.

The heat sealing member 87 disposed between the flanged portion 15 and the peripheral edge 12 of the cover 11 is mainly composed of a denatured polyolefine resin, ionomer resin, ethylene-acrylic acid copolymer, or the like and, particularly, a denatured polyolefine resin may be preferred.

As the polyolefine, is used a sole polymer of $\alpha$-olefin such as ethylene or propylene, or a copolymer with another olefine such as crystallistic copolymer of $\alpha$-olefin such as ethylene-propylene random copolymer, ethylene-butene-1 copolymer, ethylene-propylene-butene-1 copolymer, or the combination of these polymers. The denaturing of the polyolefine will be performed by effecting the graft polymerization of an unsaturated carboxylic acid or anhydride to the polyolefine of the type described above. Acrylic acid, maleic acid, fumaric acid, itaconic acid, crotonic acid, citraconic acid, or sorbic acid may be utilized as the unsaturated carboxylic acid and an anhydride of these acids may be utilized as the anhydride. Particularly, acrylic acid or anhydride maleic acid may be preferred.

The ratio of a reformed monomer in the denatured polyolefine with respect to the denatured polyolefine will be preferred in a range of 0.01 to 1 wt. % with respect to the contained olefine amount (undenatured polyolefine + deformed polyolefine).

These denatured polyolefine are materials easily fusible and thermally fused to the plastic container 14 (olefine type resin) and, in addition, provide a good bonded condition to the metallic cover 11.

3-1-2 Manufacturing Method

The manufacturing method of the container 10 provided with the metallic cover of the structure described above will be explained hereunder.

The heat sealing member 87 such as a denatured polyolefine is first coated on the inner surface of the peripheral edge 12 of the metallic cover 11 at a radially inward portion thereof (near the shoulder portion 13) and, in other words, at a portion near the shell portion 14*a* of the container body 14 when the peripheral edge 12 of the metallic cover 11 is seamed to the flanged portion 15 of the container body 14.

The denatured polyolefine is dissolved and sprayed to coat the same and is formed to a colloide under the presence of water or solvent in form of a dispersion and then coated. The amount of the coating is about 3 to 4 mg/cm$^2$.

A content 19 is packaged in the container body 14 and the peripheral portion 12 of the metallic cover 11 is roll seamed to the flanged portion 15 of the container body 14. This roll seaming operation can be done by pressing the container 10 provided with the metallic cover 11 and the container body 14 upwardly and downwardly in the vertical direction and pressing the required portion by a seaming roll.

When the container body 14 and the metallic cover 11 are pressed vertically, since the denatured polyolefine is coated radially inwardly of the peripheral edge 12, the flanged portion 15 can be easily secured to the peripheral portion 12 of the metallic cover 11 in comparison with a case where the denatured polyolefine is coated radilly outwardly.

In the next step, the thus seamed portion 89 is heated by means of a high-frequency welder, not shown, to thereby surely fuse the peripheral edge 12 of the metallic cover 11 to the flanged portion 15 of the container body 14 in the presence of the denatured polyolefine formed as the heat sealing member 87.

According to this embodiment, the heat sealing member 87 is disposed at a portion near the shell portion 14a of the container body 14, so that the sealing performance of the seamed portion 89 of the container body 14 can be remarkably improved. Namely, in a case where the flanged portion 15 and the peripheral portion 12 of the metallic cover 11 are seamed by applying the pressing force in a direction outward to the portion to be seamed, both the portions are tightly contacted to each other at the outer side of the portion to be seamed, but a gap is liably formed at the inner side thereof. The smaller the roll seaming force, the wider the gap. For this reason, the sealing performance of the seamed portion 89 can he improved by disposing the heat sealing member 87 at a portion near the shell portion 14a of the container body 14, i.e. the shoulder portion 13 of the metallic cover 11.

Although, in the described embodiment, the denatured polyolefine is used as the heat sealing member, a conventional rubber type heat sealing member may be also utilized for this invention.

3-1-3 Effects

According to this invention, a portion to be seamed as the seamed portion 89 near the shell portion 14a can be sealed by the heat sealing member 87, so that the packaged contents 19 never leak from the container.

3.2 Container provided with a metallic cover having a rubber type sealing member as a sealing member

3-2-1 Basic Structure

FIGS. 30 to 34 show a container provided with a metallic cover having a sealing member formed of a rubber type sealing member.

Figure 31:
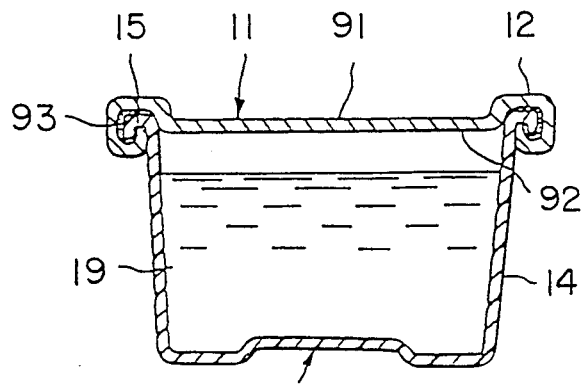

Referring to FIG. 31, a container 10 provided with a metallic cover is constructed by seaming a peripheral portion 12 of the metallic cover 11 having front and rear surfaces 91 and 92 coated to a flanged portion of a plastic container body 14 in which a content 19 is packaged. A sealing compound 93 is annularly coated to the portion to be seamed between the peripheral portion 12 of the metallic cover 11 and the flanged portion 15 of the container body 14 to effect the sealing of that portion.

The container 10 provided with the metallic cover according to this embodiment will be described in detail hereunder with reference to FIG. 30 which shows the container body 14 and the metallic cover 11 before the roll seaming operation.

The container body 14 is provided with the flanged portion 15 made of a plastic material and formed around the upper opening thereof. The material constituting the container body 14 is not limited to the plastic material and other material having a hardness and strength sufficient for withstanding the roll seaming force such as a laminated material mainly composed of an olefine type resin or polypropylene may be utilized.

The metallic cover 11 comprises a cover body 11a and the peripheral portion 12 connected to the cover body 11a through a shoulder portion 13 and the peripheral edge 12 is roll seamed to the flanged portion 15 of the container body 14.

Figure 32:
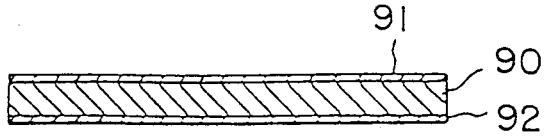
Figure 33:
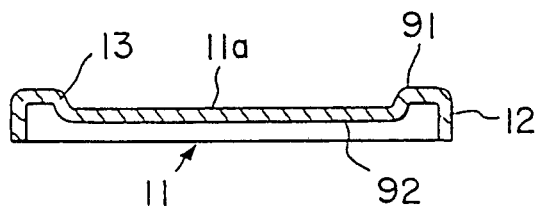

The metallic cover 11 is prepared, as shown in FIG. 32, by coating the front and rear surfaces of the aluminum metallic sheet 90 (having a thickness of 0.30 mm) as a front coat 91 and a rear coat 92 and press-forming the thus coated metallic sheet 90, thus forming the metallic cover 11 of the shape shown in FIG. 33.

An epoxy acrylate having a thickness of 0.03 mm, for example, is utilized for the front coat 91 and an epoxy phenol having a thickness of 0.05 mm, for example, is utilized for the rear coat 92. Namely, the metallic cover 11 is of the layer structure of epoxy acrylate (0.03 mm)/aluminum sheet (0.25 mm)/epoxy phenol (0.005 mm).

The epoxy acrylate layer is formed for improving the outer brilliance and corrosion proof property of the metallic cover 11.

Figure 30:
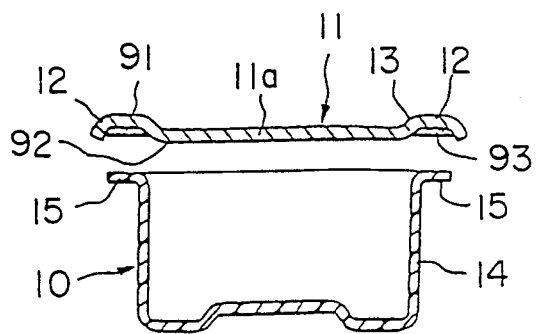

The sealing compound 93 is coated, as shown in FIG. 30, before the seaming operation, on substantially the entire inner surface area (substantially entire area directed from the radially inside to the outside) of the peripheral portion 12 of the metallic cover 11.

The sealing compound 93 is formed of a rubber type material and compressed at the seaming of the peripheral portion 12 of the metallic cover 11 to the flanged portion 15, whereby the sealing compound 93 buries the portion to be seamed between the peripheral portion 12 of the metallic cover 11 and the flanged portion 15 to effect the seal.

According to the described embodiment, since substantially the entire inner surface of the peripheral portion 12 of the metallic cover 11 is coated with the sealing compound 93, the seamed portion between the peripheral portion 12 of the metallic cover 11 and the flanged portion 15 of the container body 14 can be surely sealed.

3-2-2 Concrete Example

As shown in FIGS. 34(a) to 34(e), tests for the reservation performance were performed by variously changing coating conditions of the sealing compound 93.

| Details of The Sealing Compound Used | | |
|---|---|---|
| i. | Name: | Dalex, Can, Sealing Compound SLC-235 (Grace Japan KABUSHIKI KAISHA) |
| ii. | Material: | Mainly Composed of Butyl Rubber and Containing Hexan Solution |
| iii. | Standard: | Solid Component 42.0 ± 2% |
| | | Dry Density 1.23 ± 0.03 |
| | | Viscosity BH Viscosity 4000 ± 1000 Cps (20° C., Rotor 4, 20 rpm) |

Reservation Test Carried out

A suspected content filled in the container 10 provided with a metallic cover and was treated in a retort (120° C.; 30 min.). Thereafter, the container 10 was kept for two weeks in a constant temperature room (37° C.) and the swelling condition of the container 10 and the leakage of the content 19 has been observed for these two weeks.

The results of these reservation tests are summarized in the following Table.

TABLE

| Example | Corresponding FIG. | Coated Position | Coating Amount (mg) | Test Result (Faulty Product) |
|---|---|---|---|---|
| A | FIG. 34(a) | Entire Area of Peripheral Edge | 60 | 0/200 |
| B | FIG. 34(b) | Near Shoulder Portion of Peripheral Edge | 60 | 0/200 |
| C | FIG. 34(c) | Near Front End of Peripheral Edge | 60 | 6/200 |
| D | FIG. 34(d) | Shoulder Portion | 62 | 9/200 |
| E | FIG. 34(e) | No coating Entire Area of Peripheral Edge | 0 | 2/200 |
| F | FIG. 34(a) | No coating Entire Area of Peripheral Edge | 40 | 1/200 |
| G | FIG. 34(a) | No coating Entire Area of Peripheral Edge | 50 | 0/200 |
| H | FIG. 34(a) | No coating Entire Area of Peripheral Edge | 100 | 0/200 |
| I | FIG. 34(a) | No coating Entire Area of Peripheral Edge | 120 | 4/200 |

As is clear from the above Table, with the examples A and B in which the sealing compound 93 of 60 mg was coated to substantially the entire area in the peripheral portion 12 of the metallic cover 11 from the radially inside portion to the outside portion and a portion near the shoulder portion 13, the reservation test showed good results. These results are considered good for the reason that, in the seamed portion between the peripheral portion 12 of the metallic cover 11 and the flanged portion 15 of the container body 14, a gap is liably formed radially inside, i.e. shoulder portion side, and the gap is buried by the sealing compound 93 by coating the compound at least to a portion near the shoulder portion 13 of the inner surface of the peripheral edge portion 12.

Accordingly, with the example C in which the sealing compound 93 is coated at a portion near the front end of the peripheral portion 12 of the metallic cover 11, the reservation test showed no good result. With the example D in which the sealing compound 93 is coated only to the shoulder portion 13 which is not directly concerned with the seaming operation, the reservation test showed also no good result.

With the examples A, F, G, H and I in which, as shown in FIG. 34(a), the sealing compound 93 was coated to substantially entire area of the peripheral portion 12 of the metallic cover 11 and the coating amount was changed, the reservation tests showed good results in a case where the coating amount is more than 50 mg and less than 100 mg. In case of less than 50 mg, the amount of the sealing compound is too small to achieve the desired seaming effect and in case of more than 100 mg, the amount of the sealing compound is too large to attain the desired seaming function.

3-2-3 Effects

According to this invention, the sealing compound 93 is coated to at least a portion near the shoulder portion 13 in the portion to be seamed between the peripheral edge portion 12 of the metallic cover 11 and the flanged portion 15 of the container body 14, so that the seamed portion can be surely sealed. Accordingly, a container provided with a metallic cover superior in the reservation performance of the content can be obtained.

§4. Fourth Embodiment of Container Provided with Metallic Cover

4.1 Container provided with a metallic cover having a portion to be seamed having a seaming width of a specific shape

4-1-1 Basic Structure

Figure 36:
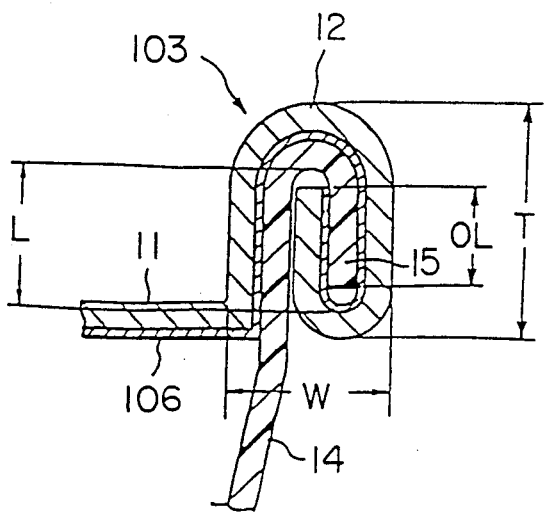

FIGS. 35 and 36 show a container provided with a metallic cover having a seamed portion having a seaming width of a specific shape and FIG. 36 is an enlarged view of a portion D in FIG. 35.

Referring to FIG. 35, the container 10 provided with the metallic cover comprises a plastic container body 14 provided with a flanged portion 15 and a metallic cover 11 provided with a peripheral edge portion 12 which is double seamed to the flanged portion.

As shown in FIG. 36, the entire inner surface of the metallic cover 11 is preliminarily coated with a laminated material 106 of an epoxy type resin and a denatured polyolefine. The laminated material 106 serves to bury the gap between the peripheral portion 12 of the metallic cover 11 and the flanged portion 15 of the container body 14 by effecting a heat treatment to the seamed portion 103 after the seaming operation.

The plastic container body 14 utilized in this embodiment is not limited in the material and may be formed of a material having a hardness and strength sufficient for withstanding the roll seaming force and a laminated material mainly composed of olefine type resin and polypropylene will be preferably utilized. It is preferred that the flanged portion 15 of the container body 14 has a thickness of 0.2 to 1.0 mm and a width of 1.0 to 2.5 mm.

The details of the seamed portion 13 of the peripheral portion 12 of the metallic cover 11 and the flanged portion 15 of the container body 14 will be described hereunder with reference to FIG. 36.

The seamed width W of the seamed portion 103 is ranged as follows.

$$0.5(3M+2P) \leq W < 3M+2P \ldots \quad (1)$$

In the equation (1), M designates a thickness of the peripheral portion 12 of the metallic cover 11 before the seaming and P is a thickness of the flanged portion 15 of the container body 14 before the seaming.

The overlapped length OL in a height direction of the seamed portion 103 between the end of the flanged portion 15 and the end of the peripheral portion 12 is represented as follows.

$$OL \geq 0.05L \ldots \quad (2)$$

where L designates an inner height of the seamed portion 103 and a letter T in FIG. 36 designates an outer height of the seamed portion 103.

4-1-2 Manufacturing Method

A manufacturing method of a container provided with a metallic cover of the structure described above will be briefly described hereunder.

A content 19 is first packaged in the container body 14 and the metallic cover 11 is loosely applied to the container body 14 under a state that the peripheral portion 12 of the metallic cover 11 is overlapped with the flanged portion 15 of the container body 14 and the peripheral portion 12 is thereafter double seamed to the flanged portion 15. This double seaming operation is performed by vertically pressing the container 10 provided with the metallic cover with the peripheral portion 12 and the flanged portion 15 loosely engaged and pressing from the outer side the overlapped portion of the peripheral portion 12 and the flanged portion 15 by means of a seaming roll, not shown. The flanged portion 15 and the peripheral portion 12 are tightly double seamed by this seaming operation.

The seamed portion 103 formed by the double seaming operation described has a suitable shape based on the former equations (1) and (2).

Namely, in a case where the seamed width W of the seamed portion 103 is over $(3M+2P)$, it is difficult to keep an adequate sealing function and in a case where the width W is below $0.5 \times (3M+2P)$, the peripheral portion 12 and the flanged portion 15 may be largely pressed and, in an adverse case, the flanged portion 15 may be damaged.

Generally, it is said for the seaming operation of the metallic cover and the container body that it is needed for the seamed portion to have an overlapped length more than (seamed height)$\times 0.4$. However, according to this invention, as shown in the equation (2), the overlapped length OL of the seamed portion 103 is more than (inner height of the seamed portion 103)$\times 0.05$ (5%). This is because of the container body 14 being formed of the plastic material which is flexible and superior in the sealing frunction. For this reason, the width of the peripheral portion 12 and the width of the flanged portion to be double seamed are made short in comparison with a case where a metallic cover is seamed to a metallic container body.

The peripheral portion 12 after seamed is heat treated by a high frequency welder, for example, not shown, to fuse the laminated material 106 to thereby bury the gap between the peripheral portion 12 and the flanged portion 15.

According to this embodiment, a container 10 provided with a metallic cover having an improved sealing function can be obtained by performing a double seaming operation.

In the foregoing embodiment, the laminated material 106 may be eliminated as occasion demands.

4-1-3 Specific Example

Specific examples according to this embodiment will be described hereunder.

A container body 14 was formed by vacuum forming a laminated material of the structure having polyethylene/ethylene vinyl alcohol copolymer/polyethylene (diameter of opening: 65.3 mm; depth: 35 mm; thickness of a flanged portion: 0.3 mm). Water was filled in the thus formed container body 14 and an aluminum metallic cover 11 (thickness: 0.27 mm) was seamed to the container body 14 by means of a semitron seamer. Leakage tests were carried out for the containers thus formed having various seamed widths and overlapped lengths and the results of the tests are shown in the following Table.

TABLE

| | Container Body | Metallic Cover | OL/L | W | Leaked Numbers/1000 |
|---|---|---|---|---|---|
| Comparison Example 1 | Aluminum | Aluminum | 0.8 | 1.0y | 0 |
| Comparison Example 2 | Aluminum | " | 0.3 | 1.0y | 2 |
| Concrete Example 1 | Plastic | " | 0.3 | 0.8y | 0 |
| Concrete Example 2 | Plastic | " | 0.05 | 0.8y | 0 |
| Reference Example 1 | Plastic | " | 0.02 | 0.8y | 1 |
| Reference Example 2 | Plastic | " | 0.3 | 0.5y | 0 |
| Reference Example 3 | Plastic | " | 0.3 | 0.4y | 25 |
| Reference Example 4 | Plastic | " | 0.3 | 0.1y | 30 | where $y = 3M + 2P$

It was found from the Table that fewer containers were free from leakage in cases where the width W of the seamed portion 103 ranged from 0.5y to 1.0y.

4-1-4 Effects

According to this invention, a container provided with a metallic cover having an improved sealing function and having a flanged portion that is hardly damaged can be obtained by forming the seamed portion so as to have a specific shape by the suitable double seaming operation of this invention.

4.2 Container provided with a metallic cover having a seamed portion having specific seamed width and seamed height

4-2-1 Basic Structure

FIGS. 37 to 40 show a container provided with a metallic cover having a seamed portion having specific seamed width and seamed height.

Figure 37:
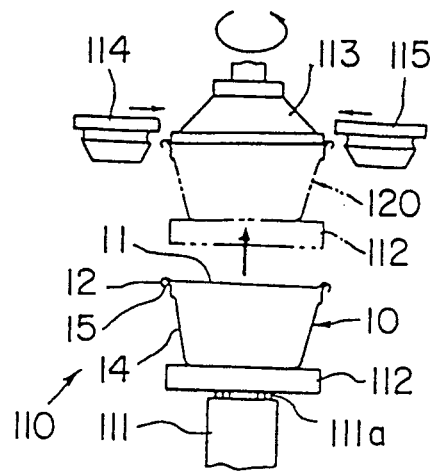
FIGS. 37 to 41 are views showing a container provided with a metallic cover having a container body provided with a seaming portion having seam width and height of the specific lengths in the fourth embodiment of the container provided with the metallic cover according to this invention.
Figure 38:
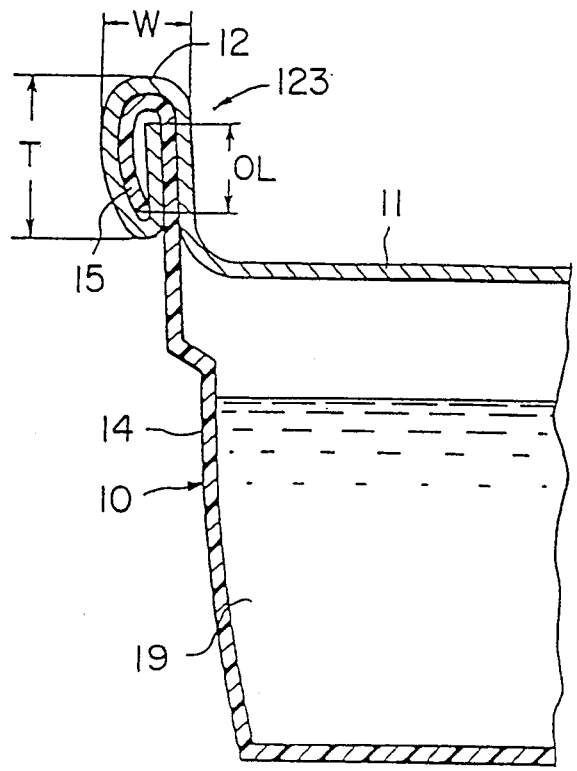

A container provided with a metallic cover will be first described. As shown in FIGS. 37 and 38, the container 10 provided with the metallic cover is composed of a plastic container body 14 filled with a content 19 and a metallic cover 11.

The container body 14 provided with a flanged portion 15 is formed by heat forming, in a known heating method, a laminated material of the structure of polypropylene/bonded layer/ethylene vinyl alcohol copolymer/bonded layer/polypropylene, then heat pressing the flanged portion 15 to reduce the thickness thereof and finally cutting the width thereof. The heat formation of the laminated material may be performed by a pressure formation, a vacuum formation or the combination thereof, or a plug-assist formation.

The metallic cover 11 provided with a peripheral edge portion 12 is formed of an aluminum or tinplate.

A container seaming device 110 comprises a vertically movable supporting cylinder 111, a rotary lifter 112 which is supported by the cylinder 111 through a bearing member 111a and on which a container 10 provided with a metallic cover is mounted, and a rotary chuck 113 disposed above the rotary lifter 112 and adapted to hold under pressure the container 10 between the lifter 112 and the chuck 113. First and second seaming rolls 114 and 115 for carrying out the seaming operation to the container 10 are disposed external to the rotary chuck 113. The first and second seaming rolls 114 and 115 are constructed to be movable in a radial direction of the container 10 provided with the metallic cover and these rollers 114 and 115 press the peripheral portion 12 of the metallic cover 11 from the outer side thereof while freely rotating to thereby roll seam the peripheral portion 12 of the metallic cover 11 to the flanged portion 15 of the container body 14.

Figure 39:
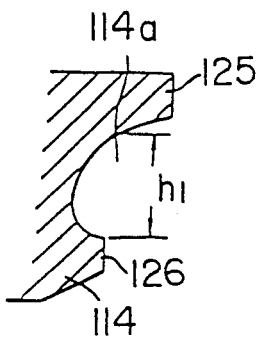
Figure 40:
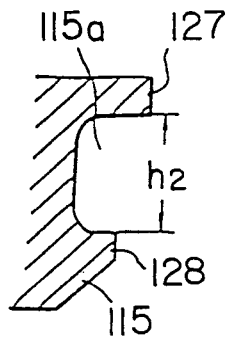

As shown in FIGS. 39 and 40, the first and second seaming rolls 114 and 115 are provided with outer peripheries in which annular grooves 114a and 115a are formed for pressing the peripheral portion 12 of the metallic cover 11 seaming the portion 12 to the flanged portion 15 of the container body 14 in engagement with the peripheral portion 12. One, for example 114a, of these annular grooves 114a and 115a is limited in the vertical width $h_1$ by an upper projection 125 and a lower projection 126 of the seaming roll 114. Similarly, the vertical width $h_2$ of the annular groove 115 is also defined by an upper projection 127 and a lower projection 128 of the second seaming roll 115. These grooves 114 and 115a are of substantially U-shaped cross sections.

4-2-2 Manufacturing Method

A container 10 provided with a metallic cover in which a peripheral portion 12 of a metallic cover 11 is loosely seamed to a flanged portion 15 of a plastic container body 14 filled with a content 19 is mounted on the rotary lifter 112 (FIG. 37).

The supporting cylinder 111 is upwardly moved to upwardly move the rotary lifter 112 together with the container 10 provided with the metallic cover to thereby hold the container 10 between the rotary lifter 112 and the rotary chuck 113 under the pressed condition (dotted line in FIG. 37). The rotary lifter 112 and the rotary chuck 113 are then rotated with the container 10 held therebetween, thus the container 10 itself also being rotated.

The first seaming roll 114 is moved radially inwardly to press the peripheral portion 12 of the metallic cover 11 and freely rotated to carry out the first seaming operation (single seaming) between the flanged portion 15 of the container body 14 and the peripheral portion 12 of the metallic cover 11.

Subsequently, the first seaming roll 114 is moved radially outwardly in a direction apart from the peripheral portion 12 of the metallic cover 11. The second seaming roll 115 is then moved radially inwardly to press the peripheral portion 12 and freely rotated to carry out the second seaming operation (double seaming) between the peripheral portion 12 of the metallic cover 11 and the flanged portion 15 of the container body 14.

The seaming operation of the container 10 provided with the metallic cover is thus completed by these double seaming operations.

As shown in FIG. 38, the seamed portion 123 of the container 10 provided with the metallic cover after the seaming operation between the peripheral portion 12 of the metallic cover 12 and the flanged portion 15 of the container body 14 has a seamed width W and a seamed height T. The overlapped length of the seamed portion 123 is designated by OL.

4-2-3 Concrete Example

Concrete examples according to this invention will be described hereunder.

EXAMPLE 4-1

A plastic container body 14 provided with a flanged portion 15 having a thickness of 0.45 mm and a width of 2.20 mm and a metallic cover 11 having a thickness of 0.3 mm were first prepared and a peripheral edge portion 12 of the metallic cover 11 was seamed to the flanged portion 15 of the plastic container body 14 under seaming conditions of:

Groove width of the first seaming roll $h_1 = 2.4$ mm
Groove width of the second seaming roll $h_2 = 2.6$ mm
Roll seaming load: 50 kgf Under these conditions, the width of the seamed portion 123 was changed variously.

Tests in connection with the seamed outer appearances and the sealing performance were carried out to the containers 10 provided with the metallic covers which have been subjected to the seaming operation under the conditions described above and the results of the tests are shown in the following Table 4-1.

Regarding the appearance tests, the presence or absence of a vee, a false seam, a cutover, and a sharp seam were performed through the visual inspections of the seamed portions 123. Regarding the sealing performance tests, container bodies 14 each filled with a liquid-state suspected material were sterilized under the condition of heating temperature of 120° C. and a pressure of 1.5 kg/cm² for 30 min. Thereafter, the container bodies 14 were reserved for two weeks in the constant temperature room of 37° C. The swelling and leakage of the contents were thereafter inspected. 100 numbers of container bodies were tested for the respective tests.

TABLE 4-1

| Seamed Width (W) | Appearance | Sealing Performance |
| --- | --- | --- |
| 1.50 (m/m) | x | Δ |
| 1.60 | ○ | ○ |
| 1.70 | ○ | ○ |
| 1.80 | ○ | ○ |
| 1.90 | ○ | ○ |
| 2.00 | ○ | ○ |
| 2.10 | x | x |

It was found that when the seamed width is over 2.00 m/m, the overlapped portion between the peripheral portion 12 of the metallic cover 11 and the flanged portion 15 of the container body 14 was not well seamed and the upper portion of the seamed portion 123 was extremely swelled and that when the seamed width is below 1.60 m/m, the compression was too strong to parallelly overlap the flanged portion 15 and the peripheral portion 12 and, in an adverse case, a crack was formed in the flanged portion 15. According to these tests, it was found to be preferred that the seamed width be in a range of 1.60 to 2.00 m/m.

EXAMPLE 4-2

Tests in connection with the seamed outer appearances and the sealing performance were carried out to the containers 10 provided with the metallic covers which have been subjected to the seaming operation under the conditions substantially the same as those of the Example 4-1 by variously changing the width of the groove of the first seaming roll and the results of the tests are shown in the following Table 4-2.

TABLE 4-2

| Groove Width (h₁) | Appearance | Sealing Performance |
| --- | --- | --- |
| 2.00 (m/m) | x | x |
| 2.20 | ○ | ○ |
| 2.40 | ○ | ○ |
| 2.60 | ○ | ○ |
| 2.80 | x | x |

The tests showed that the groove width $h_1$ of the first seaming roll of 2.20 to 2.60 mm is desired.

EXAMPLE 4-3

Tests in connection with the seamed outer appearances and the sealing performance were carried out to the containers 10 provided with the metallic covers which have been subjected to the seaming operation under the conditions substantially the same as those of the Example 4-1 by variously changing the width of the groove of the second seaming roll and the results of the tests are shown in the following Table 4-3.

TABLE 4-3

| Groove Width (h₂) | Appearance | Sealing Performance |
| --- | --- | --- |
| 2.00 (m/m) | x | x |
| 2.40 | ○ | ○ |
| 2.60 | ○ | ○ |
| 2.80 | ○ | ○ |
| 3.00 | △ | x |

According to the tests, it was found that in case of the groove width $h_2$ of the second seaming roll being over 80 m/m, the sealing performance was made worse because of turnaround of bodyhook revolving the first seaming work or excessively lower clearance. It was therefore found that the groove width $h_2$ of the second seaming roll is desired in the range of 2.40 to 2.80 mm.

EXAMPLE 4-4

The comparison tests were carried out under substantially the same seaming conditions as those of the Example 4-1 and the comparison of this invention with the conventional technology was carried out with respect to the shapes of the second seaming roll 115.

Figure 41:

Namely, the seaming working was performed by using the second seaming roll 115 of this invention which is provided with an annular groove 115a having a U-shaped section (FIG. 40) and the second seaming roll 115 of conventional type provided with no lower projection and with an annular groove 115a of not U-shaped section (FIG. 41).

According to this comparison test, it was found that the overlapped length OL of the seamed portion 123 was over 0.70 m/m according to this invention and the content in the container was free from the leakage in the reservation test. On the other hand, according to the conventional example, the overlapped length OL of the seamed portion 123 was merely about 0.20 m/m and the leakage of the content of sixty-two containers was observed with respect to one hundred of containers in the reservation test.

It was found from this result that the seaming operation could be carried out in good conditions when the annular groove 115a of the second seaming roll has a U-shaped section.

In the above tests, the plastic container 14 provided with the flanged portion 15 having the thickness of 0.45 mm and the width of 2.2 mm was utilized, but it has been found that substantially the same results were attained by utilizing the container body provided with the flanged portion having the thickness of 0.25 to 0.55 mm and the width of 1.6 mm to 2.6 mm.

4-2-4 Effects

According to this invention, the seamed portion 123 superior in the sealing performance is formed between the flanged portion 15 of the container body 14 and the peripheral edge portion 12 of the metallic cover 11, whereby the container 10 provided with the metallic cover free from the leakage of the contents can be easily and simply formed.

§5. Fifth Embodiment of Container provided with Metallic Cover

Container in which deoxidizer adheres

5.1 Container provided with a metallic cover in which a deoxidizer adheres

5-1-1 Basic Structure

Figure 42:
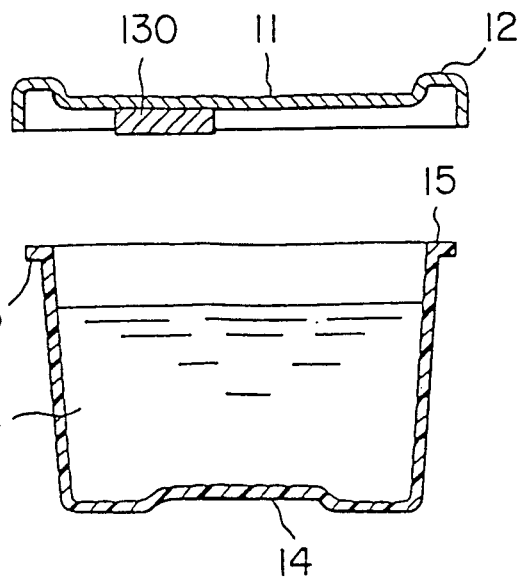
FIGS. 42 and 43 are views showing a container provided with a metallic cover of the fifth embodiment according to this invention in which a deoxidizer is secured thereto.
Figure 43:
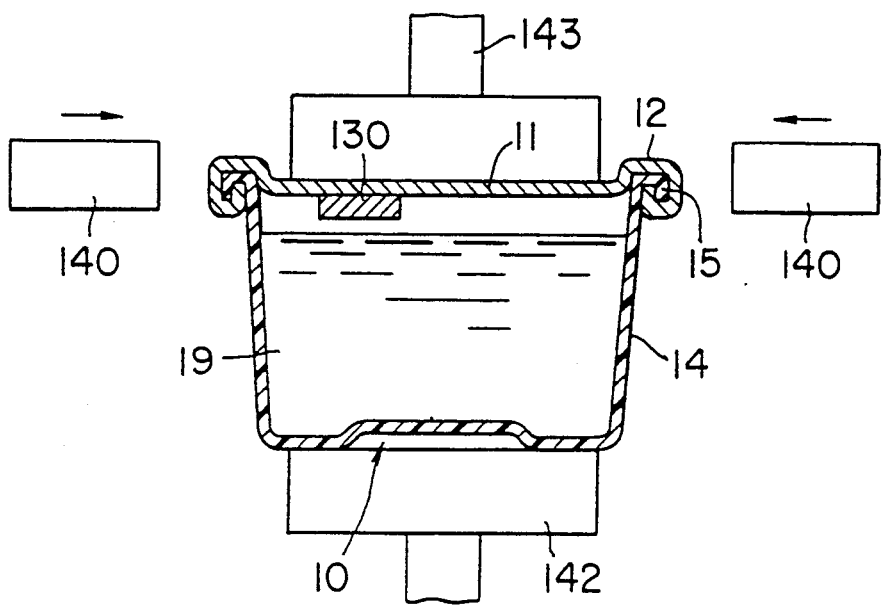

FIGS. 42 and 43 show a container provided with a metallic cover in which a deoxidizer is sticked.

The container 10 provided with the metallic cover is formed by seaming the peripheral edge portion 12 of the metallic cover 11 to the flanged portion 15 of the plastic container body 14.

A deoxidizer 130 is firmly sticked to the inner surface of the metallic cover 11 and iron group deoxidizer may be adopted for the deoxidizer 130.

The plastic container body 14 used for this embodiment is not specifically limited in the material to be utilized and any material may be utilized as far as the material is endowed with the hardness and the strength sufficient for withstanding the seaming force. For example, the container body 14 can be formed by thermally forming a laminated material of the structure of polypropylene/ethylene vinyl alcohol copolymer/-polypropylene or the container body 14 can be formed by inserting the sheet blank forming the shell portion and the bottom portion of the container body 14 into a mold and injecting an injection molding resin along the sheet blank.

A laminated layer structure, not shown, of an epoxy resin layer and a denatured polyolefine layer is preliminarily coated on substantially the entire inner surface of the metallic cover 11.

5-1-2 Manufacturing Method

The seaming working of the container 10 provided with the metallic cover will be described hereunder.

A content 19 first fills in the plastic container body 14.

The metallic cover 11 is thereafter applied to the container body 14 with the peripheral portion 12 overlapped to the flanged portion 15. The container body 14 and the metallic cover 11 are then elevated by a lifter 142 as shown in FIG. 43 and pressed vertically between the lifter 142 and a chuck 143 arranged at the upper portion of the lifter 142.

The peripheral edge portion 12 of the metallic cover 11 is roll seamed to the flanged portion 15 of the container body 14 by a plurality of seaming rolls 140 under the pressed condition between the lifter 142 and the chuck 143. The roll seamed peripheral portion 12 of the metallic cover 11 is thereafter heated to fuse the denatured polyolefine layer coated on the inner surface of the metallic cover 11, whereby the peripheral portion 12 of the metallic cover 11 and the flanged portion 15 of the container body 14 can be completely fused and bonded to thereby obtain the container 10 provided with the metallic cover.

According to this embodiment, since the deoxidizer 130 is adhered on the inner surface of the metallic cover 11, the oxygen in the container provided with the metallic cover is captured by the deoxidizer 130 and, hence, the oxygen concentration in the container 10 is reduced, whereby the oxidation of the content 19 can be prevented and the reserving performance for the content can be improved.

For example, when Agiless (Commercial Name of MITSUBISHI GAS CHEMICAL CO.) is utilized as the deoxidizer 130, the oxygen concentration in the container 10 provided with the metallic cover is reduced to about less than 0.1%.

In the described embodiment, the deoxidizer 130 is secured to the inner surface of the metallic cover 11, but, in an alternation, the deoxidizer 130 may be secured to the inner surface of the container body 14, for example, on the bottom surface or the side surface. In such alternation, it is preferred to pack the contents 19 in the form of a powder.

5-1-3 Effects

According to this invention, the oxygen concentration in the container 10 provided with the metallic cover is reduced by the deoxidizer 130 secured on the inner surface of the metallic cover 11 or the container body 14, whereby the oxidation of the contents 19 in the container 10 can be prevented and the preserving performance for the content can be improved.

§6. First Embodiment of Manufacturing Method of Container Body of Container provided with Metallic Cover Manufacturing method in which a guide is mounted in the container body during a pressing process or a cutting process 6.1 Manufacturing method of a container body in which a guide member is mounted

6-1-1 Basic Structure

FIGS. 44 to 48 are views representing a manufacturing method in a case where a guide member is mounted in a container body.

Figure 46:
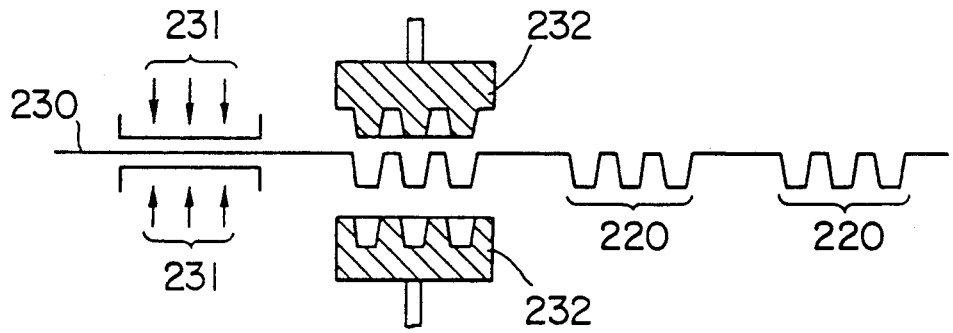

With reference to FIG. 46, processes for manufacturing a mold product of the container body 214 by a thermoforming treatment due to a general sheet forming process will be described hereunder.

A plastic sheet 230 is first heated by a heating device 231 and a product 220 is molded by a usually known molding method by means of a mold 232. A pressure forming or vacuum forming, or a combination thereof may be utilized for this molding method.

Figure 47:
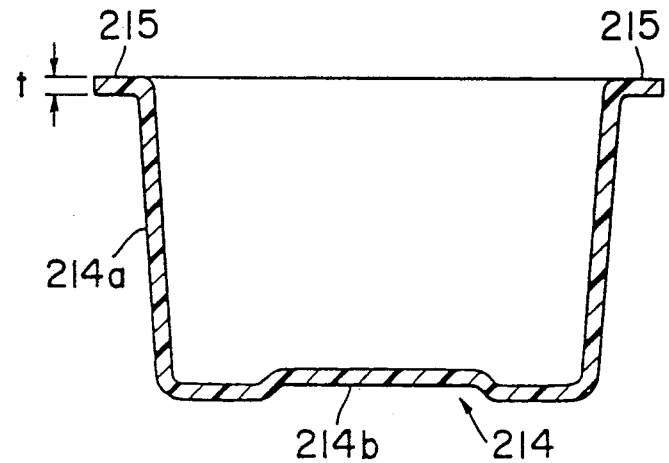

With respect to the cross section of one container body 214 constituting the product 220, as shown in FIG. 47, the shell portion 214a and the bottom portion 214b each has a thickness and strength sufficient for withstanding the pressure applied thereto at the double seaming process. However, a flanged portion 215 thus formed has a large thickness t which is not applicable for the double seaming process.

It is desired, for the plastic sheet 230 for forming the container body 214 to be formed of a plastic laminated material having a less permeability with respect to an oxygen gas and water vapor in order to preserve food in the container, that the oxygen gas barrier property is less than 0.8 cc/100 cc; 24 hrs. atm. (20° C., 90%RH) and the $H_2O$ gas barrier property is less than 0.2 g/100 cc; 24 hrs. atm. (40° C., 90%RH).

In the subsequent steps, a plurality of container bodies 214 constituting the mold product 220 are separated one by one. The thickness of the flanged portion 215 is thereafter reduced (pressing process) and the width of the flanged portion 215 is cut so as to have a predetermined width (cutting process).

Figure 48:
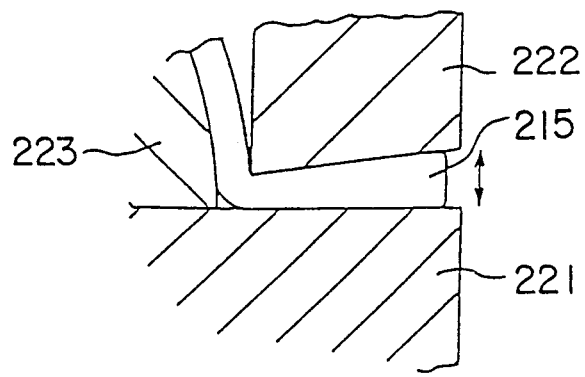

The pressing and cutting processes of the flanged portion 215 will be described hereunder with reference to FIGS. 44, 45 and 48, in which FIG. 48 is an enlarged view of a portion E shown in FIG. 44.

Figure 44:
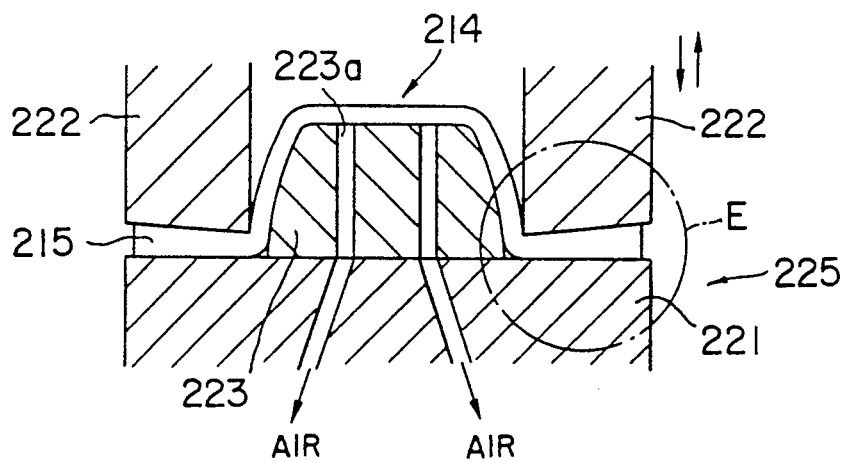
FIGS. 44 to 48 represent the first embodiment of a method of manufacturing a container body of a container provided with a metallic cover, in which a guide is inserted during a pressing process or cutting process.

Referring to FIGS. 44 and 48, a pressing device for carrying out the pressing process comprises a press male mold half 221 and a press female mold half 222 arranged above the press male mold half 221 to be vertically movable.

The press female mold half 222 has a shape, as shown in FIG. 48, having a thickness increasing from the inner side towards the outer side thereof. For this reason, the excessive part of the flanged portion 215 is shifted outward during the pressing process, so that the excessive portion never form an inside massive portion, whereby the pressing process can be performed with high accuracy.

A guide member 223 having an outer shape corresponding to the inner shape of the container body 214 separated from the mold product 220 is inserted into the container body 214 and then mounted on the press male mold half 221 with the flanged portion 215 downward.

In such a case, the container body 214 is secured under a vacuum to the guide member by means of an air communication passage 223a formed in the guide member 223.

In the next step, the press female mold half 222 is lowered to press the flanged portion 215 between the press male mold half 215 and the press female mold half 222 so as to have a predetermined thickness. The press female mold half 222 may be driven by a hydraulic means or a pneumatic means.

When the thickness of the flanged portion 215 reaches to the predetermined value, the press female mold half 222 is lifted and the crushing operation of the flanged portion has been completed. It is desired for the flanged portion to have a thickness t in the range of 0.25 to 0.9 mm.

It is also desired that the thickness t of the flanged portion 215 is within the range of 0.9 $t_0 24 t_1 \geq 0.4 t_0$ and, preferably, 0.9 $t_0 \geq t_1 \geq 0.6 t_0$, where $t_0$ is an original thickness of the flanged portion 215 and $t_1$ is a thickness after the pressing. Namely, in the range of $t_1 \geq 0.9 t_0$, the thickness of the flanged portion is too large to sufficiently compensate for the unevenness of the thickness and to carry out a desired double seaming process.

In the range of $t_1 \leq 0.4 t_0$, the flanged portion 215 is excessively crushed, so that a relatively large volume of plastic material for forming the flanged portion 215 will be extruded. For this reason, a series of lumps may be formed around the pressed portion, or the flanged portion 215 may be thermally deformed and, hence, the flanged portion 215 having a uniform thickness will not be formed.

Since the guide member 223 is inserted into the container body 214 during the pressing process, the stable positioning of the container body 14 will be achieved and the pressing process can thus be performed with high accuracy. The formation of a series of lumps in the container body 214 can be prevented, so that the shape of the flanged portion never be damaged.

Figure 45:
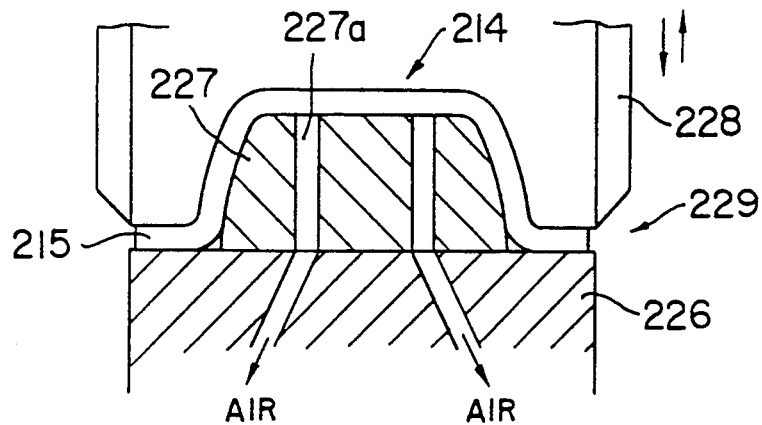

The container body 214 is thereafter cooled for the predetermined time and, thereafter, the flanged portion 215 is cut by means of the cutting device as shown in FIG. 45 so as to have a predetermined width.

The cutting device 229 comprises a cut male half 226 and a cylindrical cut female half 228 disposed above the cut male half 226 to be vertically movable.

A guide member 227 having an outer shape corresponding to an inner shape of the container body 214 is inserted into the container body 214 and the container body 214 is arranged on the cut male half 226 with the flanged portion downward. During this process, the container body 214 is vacuum secured to the guide member 227 by means of a vacuuming passage 227a formed in the guide member 227.

The cut female half 228 is thereafter lowered to punch out the flanged portion 215 in engagement with the peripheral portion of the cut male half 226 to form the flanged portion 215 having a predetermined width. It is desired for the flanged portion 215 to have a width having a thickness of about 1.0 to 2.5 mm. Since the guide member 227 is inserted during the cutting process, the container body 214 is stably positioned on the cut male half 226 and the flanged portion 215 is therefore cut with high accuracy.

With the embodiment described above, it may be possible to arrange a cooling pipe inside the guide member 223 of the pressing device and the guide member 227 of the cutting device to cool the guide members. In such case, the transferring of the heat to the container body 214 during the pressing and cutting processes can be effectively prevented, whereby the deformation of the container body 214 can also be surely prevented.

6-1-2 Effects

According to this invention, since the container body 214 can be stably held during the working processes of the container body 214 by the guide members 223 and 227, the working precision can be improved and, hence, the container provided with the metallic cover can be formed with high performance.

§7. First Embodiment of Manufacturing Method of Container provided with Metallic Cover Manufacturing method by utilizing a retainer

7.1 Manufacturing method of a container provided with a metallic cover by utilizing a retainer

7-1-1 Basic Structure

Figure 49:
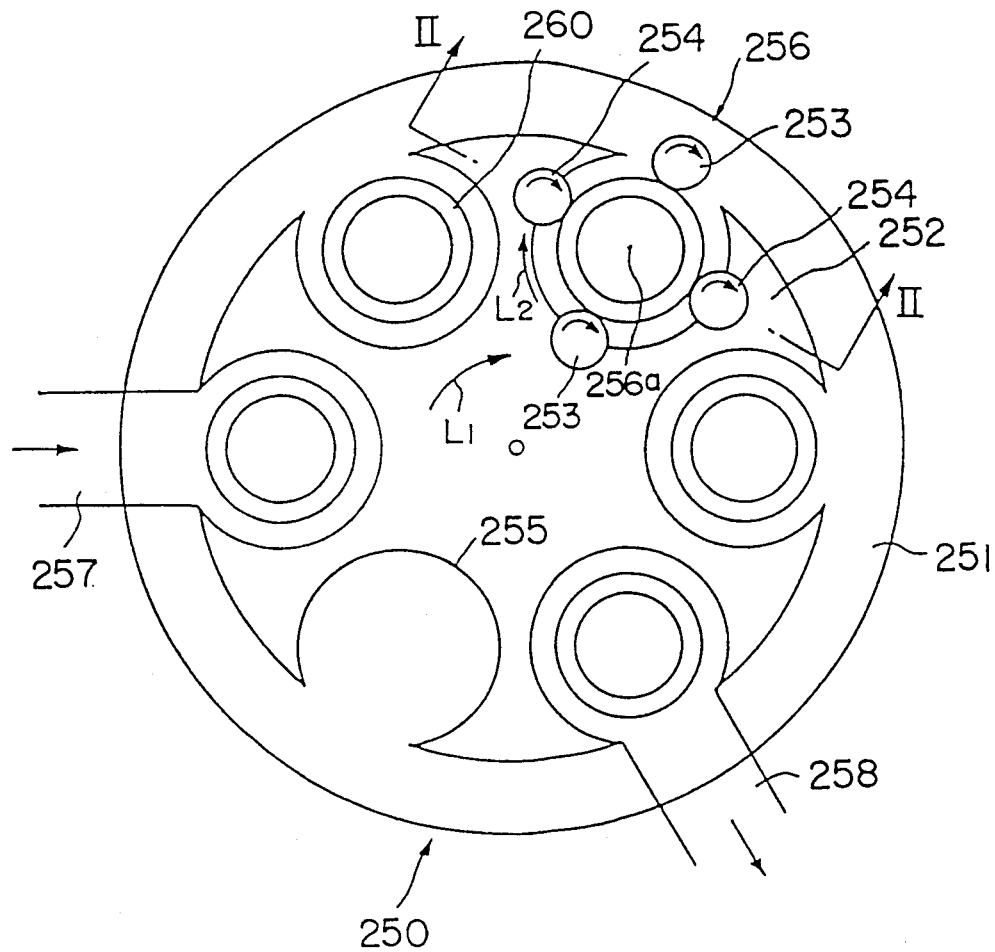
FIGS. 49 to 51 represent the first embodiment of a method of manufacturing a container provided with a metallic cover according to this invention, in which a retainer is utilized.
Figure 50:
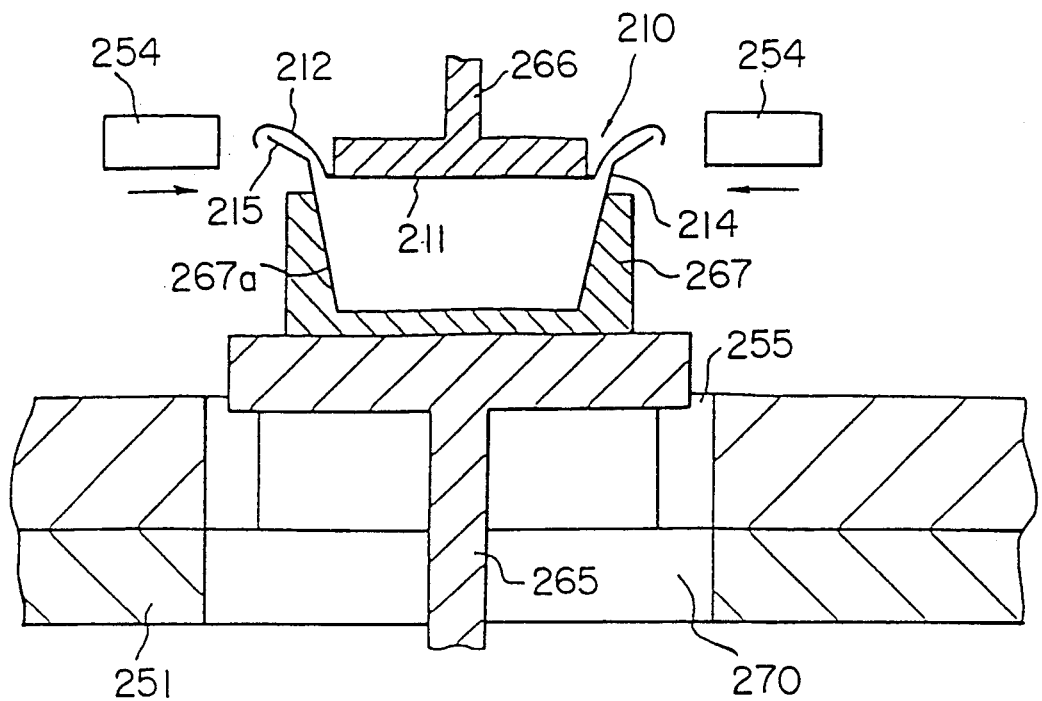
Figure 51:
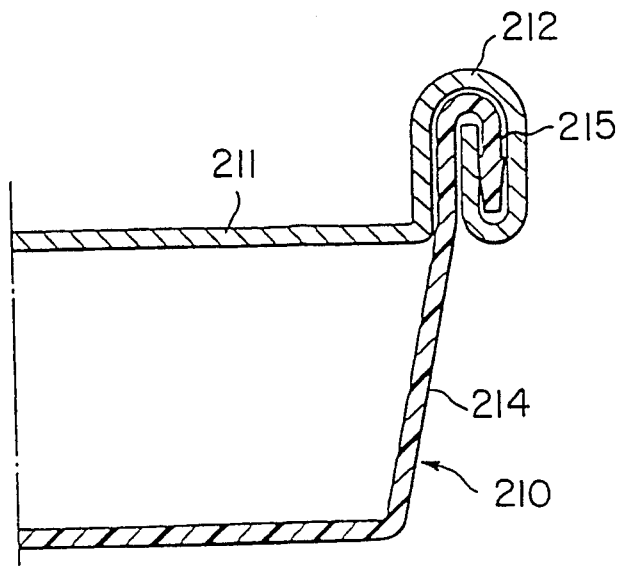

FIGS. 49 to 51 show a device for manufacturing a container provided with a metallic cover by utilizing a retainer.

A container seaming device 250 is provided with a turret 252 which carries out a sliding rotation in an arrowed direction $L_1$ shown in FIG. 49 on a stationary plate 251 and the turret 252 is provided with a plurality of holes 255, six for example, communicating with a supply line 257 and a discharge line 258. The holes 255 serve to receive and convey the container 210 provided with the metallic cover comprising a single or multiple layered container body 214 and the metallic cover 211.

A pair of first rolls 253 and a pair of second rolls 254 are disposed so as to surround the container 210 provided with the metallic cover at a portion above the turret 252, the rolls 253 and 254 constituting the seaming device 256. The first and second paired rolls 253 and 254 revolve around the central portion 256a of the seaming device 256 in an arrowed direction shown in FIG. 49 and rotate themselves.

The paired rolls 253 and 254 are also movable in directions towards the central portion 256a of the seaming device 256, i.e. in the radial direction thereof.

The stationary plate 251 is provided with an opening 270 positioned directly below the seaming device 256. The holes 255 of the turret 252 pass directly below the seaming device 256 and, accordingly, the holes 255 and the opening 270 have substantially the same shape. A lifter 265 is arranged in the opening 270 vertically movably.

7-1-2 Function

The function of this embodiment will be described hereunder.

The container body 214 is first mounted in a recess 267a formed in the retainer 267, which has an outer configuration of substantially rectangular parallelopiped as a whole. The retainer 267 is conveyed together with the container 210 provided with the metallic cover while protecting the container body 214 of the container 210 during a time when the container 210 is conveyed to the seaming device 256, seamed there by the seaming device 256 and discharged therefrom.

The recess 267a of the retainer 267 has an inner shape corresponding to the outer shape of the bottom surface of the container body 214.

In the next step, the container body 214 is filled with a content, not shown, under the heated condition (about more than 60° C.) and the metallic cover 211 is thereafter loosely fitted to the container body 214.

The container 210 composed of the container body 214 and the metallic cover 211 is supplied to the hole 255 of the turret 252 together with the retainer 267 from the supply line 257.

The container 210 provided with the metallic cover and the retainer 267 are conveyed to a position directly below the seaming device 256 by the rotation of the turret 252. During this conveyance, the hole 255 of the turret 252 reaches a position corresponding to the opening 270 of the stationary plate 251 and the retainer 267 mounted with the container 210 provided with the metallic cover is supported by the lifter 256 arranged in the opening 270.

In the next step, as shown in FIG. 50, the rotation of the turret 252 stops and the lifter 265 rises to upwardly move the container 210 provided with the metallic cover and the retainer 267, whereby the container 210 and the retainer 267 are held under the pressed condition between the lifter 265 and the chuck 266 and under these conditions, the seaming operation is carried out by means of the seaming device 256 to the container 210 provided with the metallic cover.

A pair of first rolls 253 is radially inwardly moved and then moved so as to abut against the container 210 provided with the metallic cover, whereby the first single seaming process is carried out for seaming the peripheral portion 212 of the metallic cover 211 to the flanged portion 215 of the container body 214. The first rolls 253 are then moved radially outwardly and a pair of second rolls 254 are then moved radially inwardly, whereby the second double seaming process is carried out for seaming the peripheral portion 212 to the flanged portion 215. The double seaming operation can thus be performed by carrying out these first and second seaming processes to the container 210 provided with the metallic cover as shown in FIG. 51.

During these seaming processes, since the container 210 is supported under the pressed condition between the lifter 265 and the chuck 266, the container 210 never rotates and the seaming process can thus be stably performed.

The lifter 265 is thereafter lowered into the opening 270 and the turret 252 again begins to rotate.

As described above, according to this embodiment, the container body 214 is mounted in the recess 267a of the retainer 267, the container body 214 softened by packing the heated contents therein never swells outwardly even when the container body 214 is pressed in the vertical direction. Furthermore, the container body 214 is conveyed in the state mounted in the recess 267a of the retainer 267 of the rectangular pallalerodize structure, so that the conveyance can be stably achieved and, accordingly, the container 210 provided with the metallic cover can be free from the leakage of the contents.

7-1-3 Effects

According to this invention, since the container provided with the metallic cover can be stably conveyed, the container 210 is free from the leakage of the contents. Moreover, the container body 214 never deforms during the seaming process, so that the yield of the products can be improved.

§8. Second Embodiment of Manufacturing Method of Container provided with Metallic Cover Manufacturing method in which a container provided with a metallic cover is sterilized under the condition that a pressure difference between inner and outer pressures is made constant

8-1-1 Basic Structure

Figure 52:
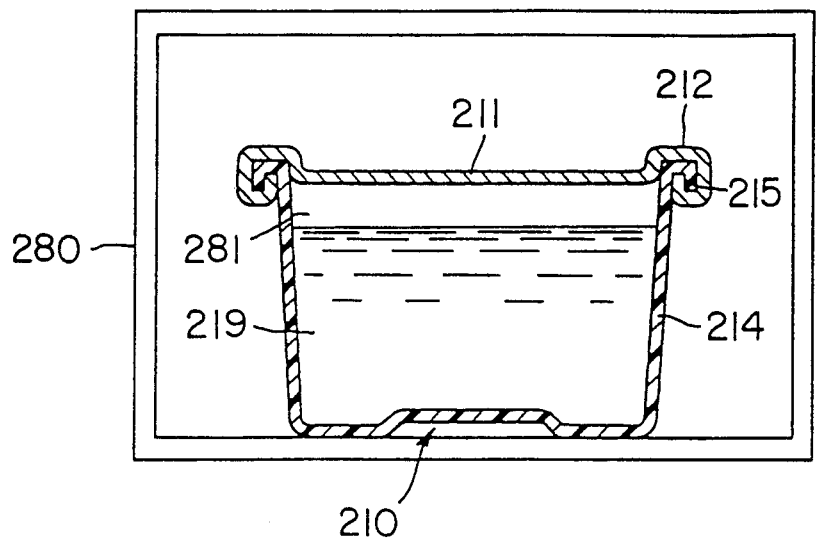
FIGS. 52 and 53 represent the second embodiment of a method of manufacturing a container provided with a metallic cover according to this invention, in which the container is heat sterilized under the condition that the pressure difference between the inner and outer pressures of the container is made constant.
Figure 53:
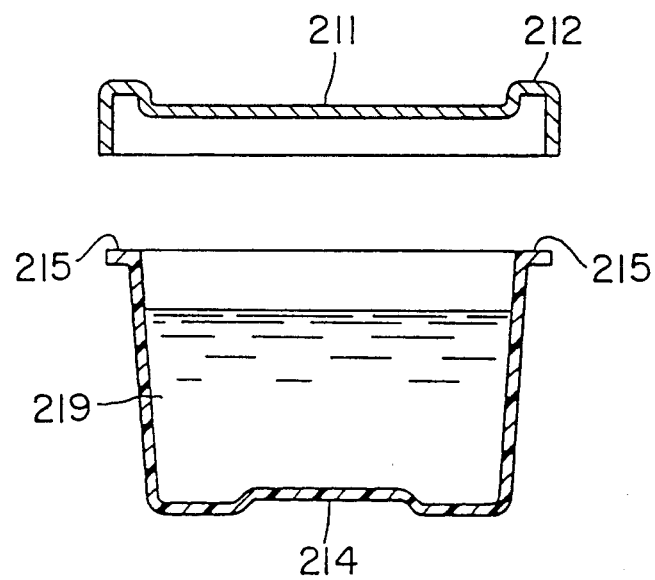

FIGS. 52 and 53 show one embodiment in which the container provided with the metallic cover is manufactured by heat sterilizing the same under the constant pressure difference.

Referring to FIG. 52, a content 219 is packed in the plastic container body 214 with a space remaining at the upper portion of the container body 214.

An aluminum or tinplate metallic cover 211 is then fitted to the container body 214 with the peripheral portion 212 of the metallic cover 211 being overlapped with the flanged portion 215 of the container body 214. The peripheral portion 212 is then seamed to the flanged portion 215 by means of a suitable seaming device.

In this seaming operation, a laminated material composed of an epoxy phenol and a denatured polyolefine is preliminarily coated on the rear surface of the metallic cover 211.

The plastic container body 214 utilized in this embodiment is not limited in the material and a laminated material mainly composed of an olefine resin, polypropylene may be utilized as far as the material has hardness and strength sufficient for withstanding the seaming operation.

The peripheral portion 212 of the metallic cover 211 and the flanged portion 215 of the container body 214 after the seaming operation are heated to fuse the denatured polyolefine preliminarily coated on the inner surface of the metallic cover 211 to thereby bond the flanged portion 215 and the peripheral portion 212.

In the next step, as shown in FIG. 52, the seamed container body 214 and the metallic cover 211 are set in a constant differential pressure type sterilizing oven 280 and heat sterilized at a temperature of about 120° C. for about 30 min., whereby the container 210 provided with the metallic cover can be obtained. The sterilizing oven 280 serves to heat the container 210 provided with the metallic cover and to apply a pressure from the outside thereof to keep constant the pressure difference between the inner and outer pressures of the container 210 during the heat sterilizing process.

According to this embodiment, since the inner and outer pressures of the container 210 provided with the metallic cover can be maintained constant during the heat sterilizing process, the container body 214 is never deformed by the expansion of air even if the air remains of about 20 volume %, for example, in the inner upper portion of the container body 214.

8-1-2 Effects

According to this invention, the container body 214 is never deformed by the air remaining in the container body 214 during the heat sterilizing process, so that the product of the container 210 provided with the metallic cover can be obtained with high accuracy and quality and the yielding of the products can be also improved.

§9. First Embodiment of Manufacturing Apparatus for Container provided with Metallic Cover Press-cut device of a container body

9.1 Press-cut device having an intermediate bed

9-1-1 Basic Structure

Figure 54:
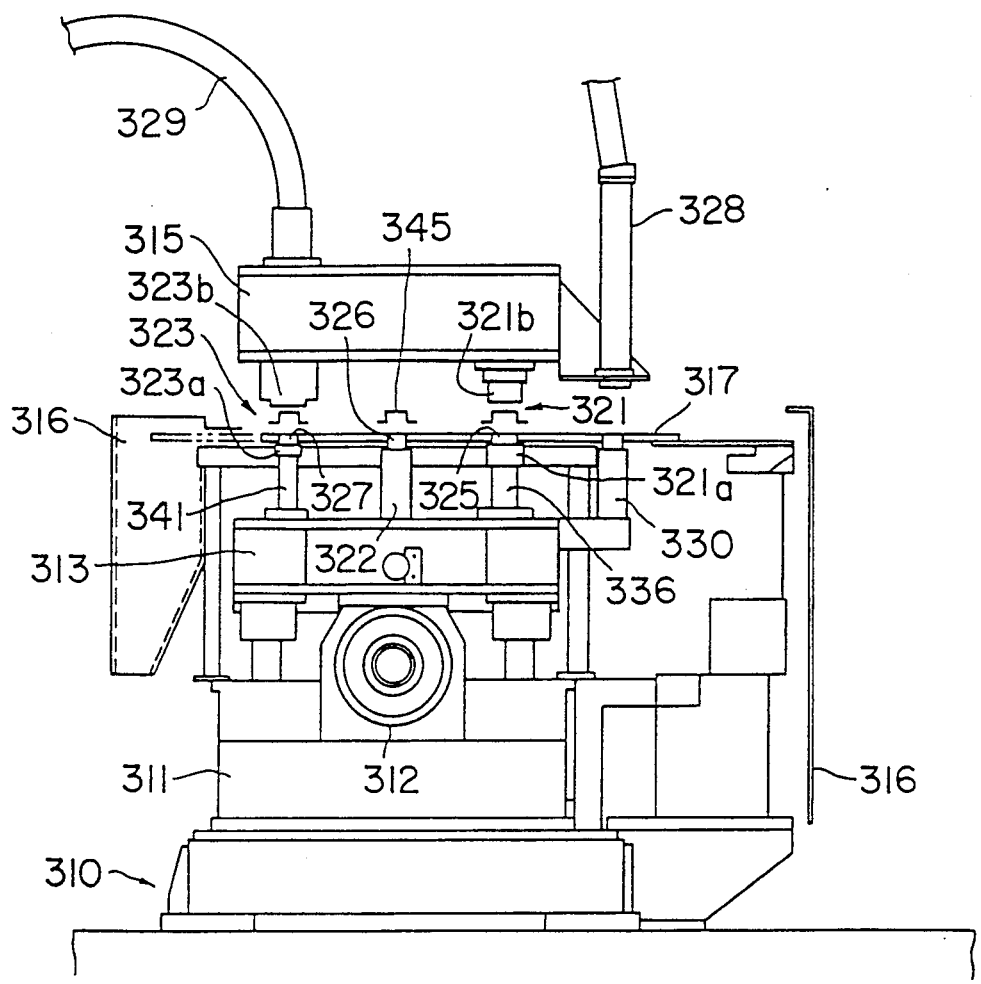
FIGS. 54 to 56 show a press cut device provided with an intermediate bed of the first embodiment of an apparatus for manufacturing a container provided with a metallic cover according to this invention.
Figure 55:
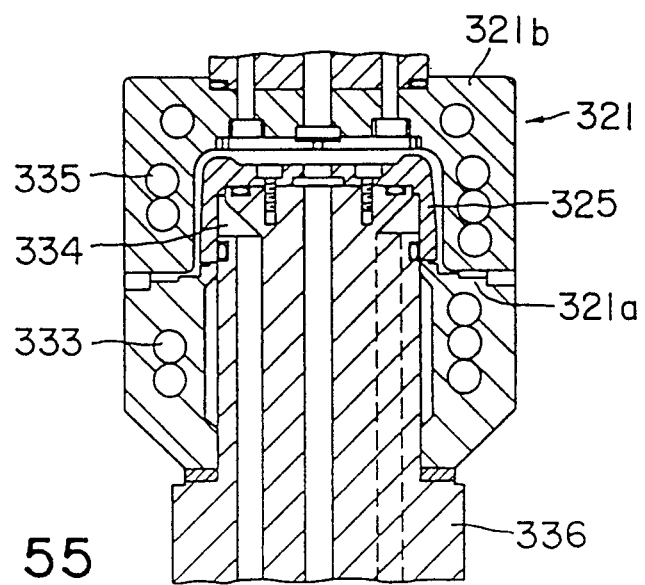
Figure 56:
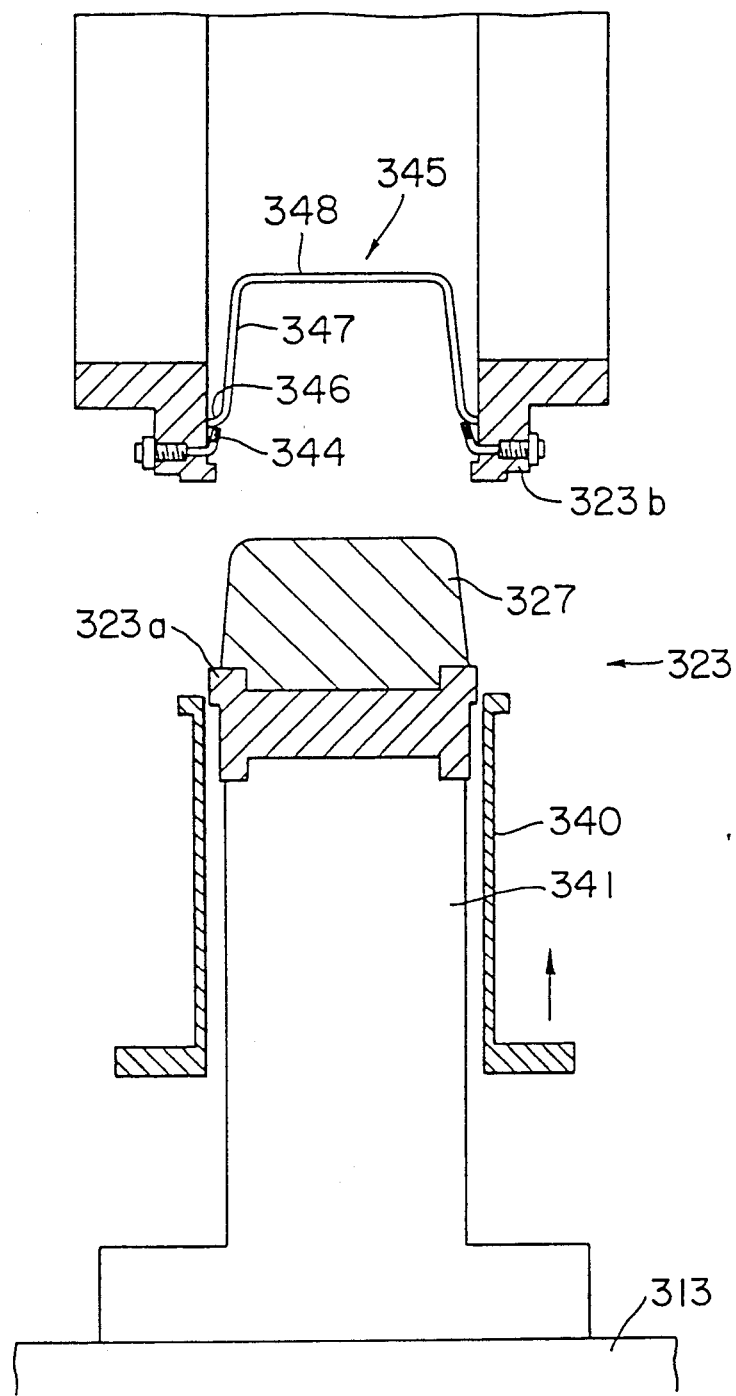

FIGS. 54 to 56 represent a press-cut device provided with an intermediate bed. Referring to FIG. 54, a press-cut device 310 includes an intermediate bed 313 disposed on a base through a crank mechanism 312 to be vertically movable so as to take upper, intermediate and lower positions in the vertical direction. An upper stationary table 315 is arranged at a portion above the intermediate bed 313.

As shown in FIG. 54, a press male half 321a is disposed at a righthand portion, as viewed, above the intermediate bed 313 and a press female half 321b corresponding to the press male half 321a is disposed below the upper stationary table 315, the press male and female halves 321a and 321b constituting a pressing device 321. In the meantime, a cut male half 323a is disposed at a lefthand portion, as viewed, above the intermediate bed 313 and a cut female half 323b corresponding to the cut male half 323a is disposed below the upper stationary table 315, the cut male and female halves constituting a cutting device 323. A cooling table 322 is disposed at a central portion above the intermediate bed 313.

Guide members 325, 326 and 327, which are mounted in a plastic container body 345 (FIG. 56) are arranged above the press male half 321a, the cooling table 322 and the cut male half 323a. These guide members 325, 326 and 327 have outer shapes corresponding to the shell portion 347 and the bottom portion 348 of the container body 345 and serve to secure the container body 345 to the predetermined position.

As further shown in FIG. 54, a supply pipe 328 for supplying the container body 345 is disposed on the righthand side of the upper stationary table 315 and a supply table 330 corresponding to the supply pipe 328 is disposed on the intermediate bed 313. The supply pipe 328 serves to supply the container body 345, which is formed from a plastic sheet by a generally known thermoforming method and is provided with a flanged portion 346, to the supply table 330. A discharge pipe 329, communicating with the cut female half 323b, for discharging the container body 345 is disposed on the lefthand side of the upper stationary table 315.

A conveyer device 317 is arranged between the intermediate bed 313 and the upper stationary table 315 for horizontally conveying the container body 345 subsequently from the supply table 330 to the press male half 321a of the pressing device 321, the cooling table 322 and the cut male half 323a of the cutting device 323.

The base 311, the crank mechanism 312 and the intermediate bed 313 are entirely covered by a cover 316.

The pressing device 321 will be described in detail hereunder with reference to FIG. 55.

The press male half 321a of the pressing device 321 is disposed on the intermediate bed 313 through the pressing table 336 and the guide member 325 is disposed on the press male half 321a. The press male half 321a and the press female half 321b act in combination to press the flanged portion 346 of the container body 345 so as to have a predetermined thickness and heaters 333 and 335 are therefore disposed inside the press male and female halves, respectively. A cooling water passage 334 is formed in the guide member 325 for cooling the shell portion 347 and the bottom portion 348 of the container body 345.

The cutting device 323 will be described hereunder with reference to FIG. 56.

The cut male half 323a of the cutting device 323 is disposed on the intermediate bed 313 through the cutting table 341 and the guide member 327 is disposed on the cut male half 323a. The cut male half 323a and the cut female half 323b act in combination to cut the outer periphery of the flanged portion 346 of the container body 345 so as to have a predetermined width. An ejector 340 for ejecting and removing cut pieces, not shown, of the flanged portion 346 from the cut female half 323b is arranged at a circumferential portion of the cutting table 341. A container body holding member 344 for holding the container body 345 is located in an upwardly directed manner at the lower end portion of the inner surface of the cut female half 323b.

9-1-2 Effects

The function of this embodiment of the construction described above will be described hereunder.

A plastic sheet having a thickness necessary for the formation of a container is preliminarily heated by a usual thermoforming method and the container body 345 provided with the flanged portion 346 is formed by means of a mold.

In the next step, the container body 345 is supplied on the supply table 330 by means of the supply pipe 328 and the intermediate bed 313 is arranged at an intermediate portion. The container body 345 is held by a gripper, not shown, of the conveyer device 317. The intermediate bed 313 is thereafter lowered to the lower position and the container body 345 is conveyed on the press male half 321a.

The intermediate bed 313 is then elevated through the intermediate position to the upper position, at which the guide member 325 is mounted in the container body 345 to secure the same. In this process, the container body 345 may be securely attached to the guide member 325 by forming a vacuuming hole, not shown, in the guide member 325. The press male half 321b is slightly lowered by the operation of a hydraulic means to press the flanged portion 346 of the container body 345 between the press male half 321a and the press female half 321b so as to have a predetermined thickness.

During these processes, since the flanged portion 346 is heated by the heaters 333 and 335 disposed in the press male half 321a and the press female half 321b, the pressing working can be carried out with high accuracy and, moreover, the shell portion 347 and the bottom portion 348 of the container body 345 are cooled by the cooling water passing the cooling passage 334, so that the container body 345 is free from the thermal deformation.

In the next step, the intermediate bed 313 is lowered to the intermediate position and the container body 345 is held by the gripper of the conveyer device 317. The intermediate bed 313 is then further lowered to the lower position and the container body 345 is conveyed on the cooling table 322 by the conveyer device 317. The intermediate bed 313 is again lifted upwardly to the upper position through the intermediate position and, thereafter, lowered to the intermediate position. During this elevation of the intermediate bed, the container body 345 is mounted in the guide member 326 disposed on the cooling table 322 and cooled. It is desirable to form a cooling water flow passage in the guide member 326 for cooling the container body 345.

The container body 345 is conveyed on the cut male half 323a by the conveyer device 317 after the intermediate bed 313 has been lowered to the intermediate position with the container body 345 being held by the gripper of the conveyer device 317.

Subsequently, the intermediate bed 313 is lifted upwardly to the upper position and, during this time, the container body 345 is secured to the guide member 327 and, simultaneously, the peripheral portion of the flanged portion 346 of the container body 345 is cut between the cut male half 323a and the cut female half 323b to thereby arrange the width of the flanged portion to a predetermined value. In this process, accurate cutting may be performed by providing a vacuum hole in the guide member 327 to firmly suck the container body 345 to the predetermined position.

The container body having the flanged portion 346 the thickness and the width of which are thus be adjusted is moved inside the cut female half 323b and held by the holding member 344. The container body 345 in the holding member 344 is conveyed upwardly by the next container body 345 which will be moved inside the cut female half 323b and the container body 345 is then discharged through the discharge pipe 329. In the cutting process, the cut pieces will be removed from the cut male half 323a by the ejector 340 outwardly of the conveyer device 317.

As described above, according to this embodiment, the container body 345 is continuously moved to the pressing device 323, the cooling table 322 and the cutting device 323 by the conveyer device 317, whereby the flanged portion 346 of the container body 345 can be pressed and cut by the single device easily and precisely.

In the described embodiment, the press male half 321a is mounted to the intermediate bed 313 and the press female half 321b is mounted to the stationary table 315, but the press male half 321a may be mounted to the stationary table 315 and the press female half 321b may be mounted to the intermediate bed 313. Likely, the cut female half 323b may be mounted to the intermediate bed 313 and the cut male half 323a may be mounted to the stationary table 315.

9-1-3 Effects

According to this invention, the container body 345 is continuously conveyed from the pressing device 321 to the cutting device 322 and, during this conveyance, the intermediate bed 313 is moved vertically, whereby the flanged portion 346 of the container body 345 can be easily and precisely pressed and cut so as to have a predetermined thickness and width and, therefore, the flanged portion can be securely seamed by the peripheral portion of the metallic cover, resulting in the production of the container provided with the metallic cover with high quality.

9.2 Heat-press device provided with a liner for limiting a gap between a press male half and a press female half

9-2-1 Basic Structure

Figure 57:
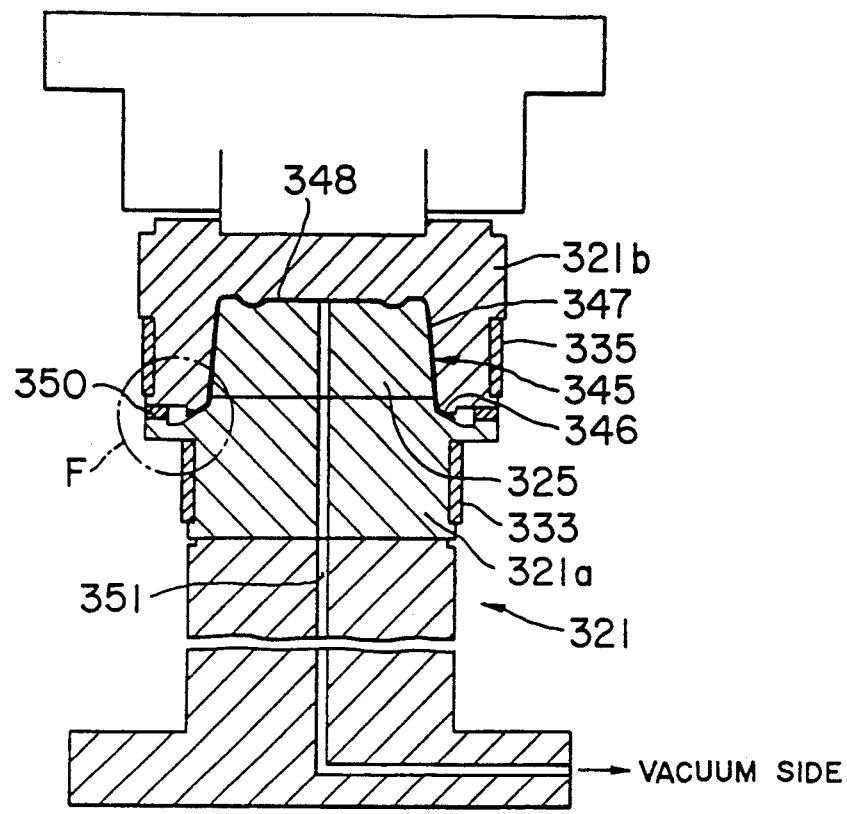
FIGS. 57 and 58 show a heat press device provided with a liner of the first embodiment of the apparatus for manufacturing a container provided with a metallic cover according to this invention.
Figure 58:
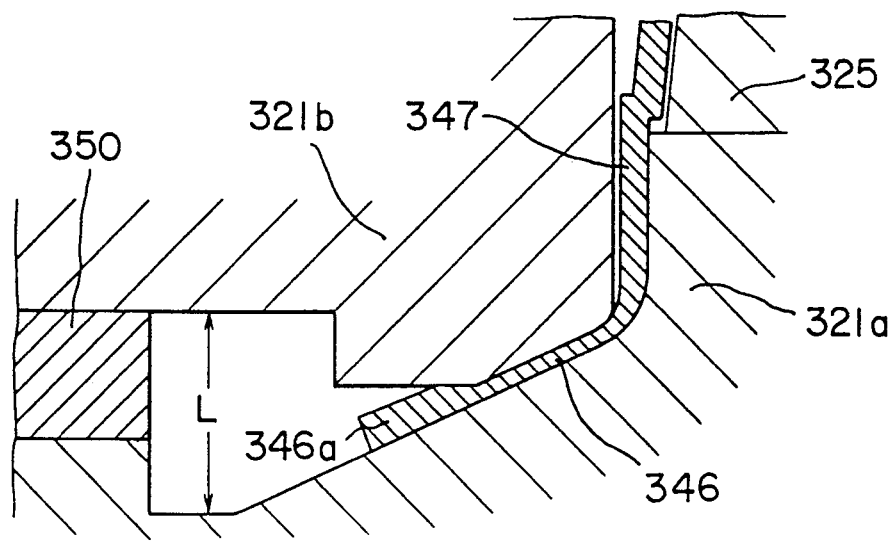

FIGS. 57 and 58 are views showing a heat-press device provided with a liner, in which FIG. 58 is an enlarged view of the portion F shown in FIG. 57.

A container body to be pressed is first described hereunder. As shown in FIG. 57, a container body 345 is formed by heating a plastic sheet having a thickness necessary for the formation of the container body due to a general thermoforming method and forming the sheet by means of a mold. The container body thus formed is composed of a shell portion 347, a bottom portion 348 and a flanged portion 346 formed at the opening end of the shell portion 347. The container body 345 is utilized for manufacturing a container provided with a metallic cover. Namely, the container body is filled with contents and a peripheral portion of a metallic cover is seamed to the flanged portion 346 to thereby form the container provided with the metallic cover.

The heat pressing device will be next described hereunder. Referring to FIG. 57, the heat pressing device 321 is composed of a press male half 321a and a press female half 321b disposed above the press male half 321a to be separable therefrom. A guide member 325 having an inner shape corresponding to the shell portion 347 and the bottom portion 348 of the container body 345 is disposed above the press male half 321a. The guide member 325 serves to incorporate the container body 345 therein to a predetermined position and facilitate the pressing operation without deforming the container body 345.

The press male and female halves 321a and 321b serve to press the flanged portion 346 of the container body 345 so as to have a predetermined thickness and heaters 333 and 335 are arranged to the outer peripheral portions of the press male and female halves 321a and 321b, respectively.

A liner 350 is arranged in an annular fashion to the upper peripheral edge of the press male half 321a to secure the thickness of the flanged portion 346. The liner 350 is arranged outside the area corresponding to the flanged portion 346 of the container body 345 and abuts against the press female half 321b located above the area to determine the thickness of the flanged portion to a predetermined value. A vacuuming hole 351 communicating with the vacuuming side is formed in a penetrating manner in the press male half 321a and the guide member 325 and the vacuuming hole 351 is opened to the upper end of the guide member 325.

9-2-2 Function

The function of this embodiment of the structure described above will be described hereunder.

A plastic sheet having the thickness necessary for the formation of a container body due to a general thermoforming method is first heated and the heated sheet is preliminarily formed into a container body 345 provided with a flanged portion 346 by means of mold.

In the next step, the press female half 321b is separated from the press male half 321a and the container body 345 is mounted in the guide member 325 disposed on the press male half 321a in an inverted manner. The container body 345 is vacuum sucked through the vacuuming hole 351 to secure the container body 345 to the predetermined position. The press female half 321b approaches the press male half 321a to press the container body 345 so that the flanged portion 346 of the container body 345 is pressed to have a predetermined thickness.

During the pressing operation, the flanged portion 346 is heated by the heaters 333 and 335 arranged to the outer peripheral portions of the press male half 321a and the press female half 321b, so that the pressing operation can be securely performed. A predetermined gap, as shown by an arrow L in FIG. 58, for example, is limited between the press male half 321a and the press female half 321b by the abutment of the liner 350 attached to the upper edge of the press male half 321a against the press female half 321b, so that the thickness of the flanged portion 346 can be precisely determined to a predetermined value. Moreover, since the container body 345 is secured to the predetermined position by the sucking function of the vacuuming hole 351 formed in the guide member 325, the pressing working can be effectively performed without thermally deforming the container body 345.

The press female half 321b is then separated from the press male half 321a and the container body 345 is removed from the guide member 325. In this process, the container body 345 may be easily removed from the press male and female halves 321a and 321b by blowing air through air supply pipes, not shown, provided for the press male and female halves 321a and 321b.

The container body 345 is thereafter conveyed to a cutting device, not shown, by which the outer portion 346a (FIG. 58) of the flanged portion 346 not pressed is cut by the cutting device to thereby make the width of the flanged portion 346 to the predetermined value.

In the next step, the container body 345 is filled with a content and the peripheral portion of the metallic cover is seamed to the flanged portion 346 of the container body 345 to thereby form a container provided with a metallic cover.

As described hereinbefore, according to this embodiment, the space between the press male half 321a and the press female half 321b is set to a predetermined value by the liner 350 located to the upper peripheral edge of the press male half 321a, whereby the flanged portion 346 of the container body 345 can be pressed so as to have a predetermined thickness with high accuracy and the pressing working can be effectively performed without deforming the container body by mounting the same in the guide member 325.

9-2-3 Specific Example

The relationship between the thickness of the flanged portion and the liner 350 in a case where the thickness of the liner 350 was variously changed is shown in the following table.

| Linear Thickness | 4.89 mm | 4.85 mm | 4.82 mm |
| --- | --- | --- | --- |
| Flange Thickness | 0.47 mm | 0.43 mm | 0.40 mm |

As is clear from the above table, the flanged portion can be precisely pressed by utilizing a liner having a predetermined thickness.

9-2-4 Effects

According to this invention, the flanged portion of the container body can be pressed so as to have a predetermined thickness with high accuracy and, accordingly, the peripheral portion of the metallic cover can be suitably seamed to the flanged portion of the container body, whereby a container provided with a metallic cover with high quality can be manufactured.

§10. Second Embodiment of Manufacturing Apparatus for Container provided with Metallic Cover

10.1 Container seaming device provided with a rotary lifter and a rotary chuck

10-1-1 Basic Structure

FIGS. 59 to 63 represent a device for seaming a container body provided with a rotary lifter and a rotary chuck.

Figure 59:
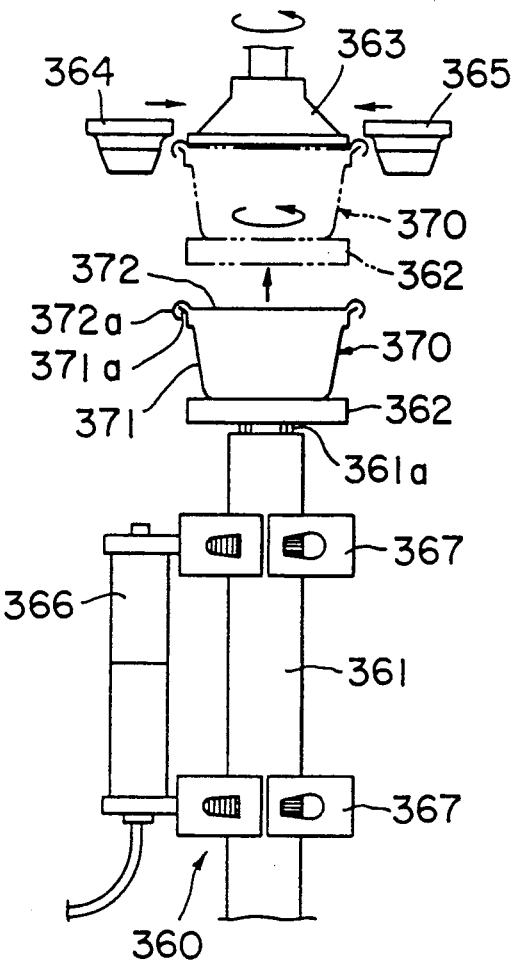

A container provided with a metallic cover to be seamed by a seaming device according to this invention will be first described hereunder. Referring to FIG. 59, a container 370 provided with a metallic cover filled with a content is composed of a plastic container body 371 and a metallic cover 372.

The container body 371 provided with a flanged portion 371a is formed by thermoforming a laminated material such as polypropylene/ethylene vinyl alcohol copolymer/polypropylene, but the container body 371 may be formed of a sheet blank of a laminated structure and a thermally fusible resin injected on the surface of the sheet blank. The metallic cover 372 is formed of an aluminum metal or tinplate metal and provided with a peripheral edge portion 372a.

The container seaming device will be then described hereunder. The container seaming device 360 comprises a vertically movable supporting cylinder 361, a rotary lifter 362 on which is supported the container 370 provided with the metallic cover supported on the supporting cylinder 361 through a bearing member 361a and a rotatry chuck 363 disposed above the rotary lifter 362 and adapted to hold the container 370 arranged above the rotatry lifter 362 between the rotary lifter 362 and the rotary chuck 363 under the pressed condition. First and second seaming rolls 364 and 365 for seaming the container 370 provided with the metallic cover are disposed external to the rotary chuck 363 to be movable radially of the container 370. The seaming rolls 364 and 365 freely rotate while pressing the peripheral portion 372a of the metallic cover 372 so as to roll seam the peripheral portion 372a to the flanged portion 371a of the container body 371.

Figure 60:
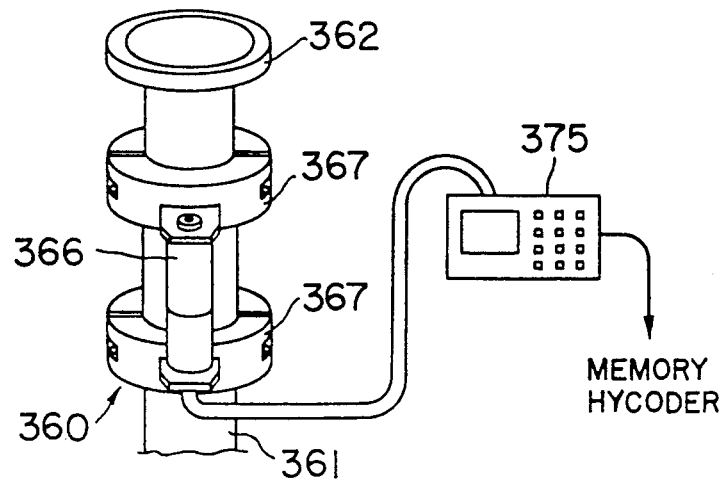

A strain gauge 366 is secured to the outer surface of the supporting cylinder 361 by means of a jig 367 and the strain gauge 366 serves to measure the strain of the supporting cylinder 361 during the seaming operation and detect the seaming force of the seaming rolls 364 and 365. As shown in FIG. 60, the strain gauge 366 is connected to a strain indicator 375 to which a memory hycoder, not shown, is connected.

FIG. 61 shows the attachment position of the strain gauge 366. The distortion gauge 366 is attached to the outer surface of the supporting cylinder 361, but it may be attached to a portion A between the first and second seaming rolls 364 and 365, a portion B near the first seaming roll 364, or a portion C near the second seaming roll 365.

10-1-2 Function

The function of this embodiment of the structure described above will be described hereunder.

The container 370 provided with the metallic cover having the container body 371 in which the content, not shown, is packaged and the metallic cover is rested on the rotary lifter 362 as shown by solid line in FIG. 59 under the condition that the peripheral portion 372a of the metallic cover 372 is loosely fitted to the flanged portion 371a of the container body 371.

The supporting cylinder 361 is raised to raise the rotary lifter 362 together with the container 370 provided with the metallic cover to hold the container 370 between the rotary lifter 362 and the rotary chuck 363 as shown by two-dotted line in FIG. 59. The rotary lifter 362 and the rotary chuck 363 are then rotated together with the container 370 with the container 370 held therebetween.

In the next step, the first seaming roll 364 moves radially inwardly and freely rotates while pressing the peripheral portion 372a of the metallic cover 372 to carry out the first seaming operation (single seaming operation) between the peripheral portion 372a of the metallic cover 372 and the flanged portion 371a of the container body 371.

Subsequently, the first seaming roll 364 moves radially outwardly so as to be separated from the peripheral portion 372a of the metallic cover 372. The second seaming roll 365 is then moved radially inwardly and rotates freely while pressing the peripheral portion 372a to carry out the second seaming operation (double seaming operation) between the peripheral portion 372a and the flanged portion 371a.

The seaming working for the container 370 provided with the metallic cover has been completed by the cooperation of the first and second seaming rolls 364 and 365. The second seaming roll 365 is then moved radially outwardly and the rotations of the rotary lifter 362 and the rotary chuck 363 stop. The rotary lifter 362 is thereafter lowered and the container 370 provided with the metallic cover, is taken out from the container seaming device.

The strain of the supporting cylinder 361 caused by the seaming rolls 364 and 365 during the seaming processes is measured by the strain gauge 366 and the detected strain is converted into an electtric signal which is transmitted to the strain indicator 375 to display the same in accordance with the time elapsing. The value measured by the strain gauge 366 is fed from the strain indicator 375 to the memory hycoder and recorded there.

10-1-3 Concrete Example

A concrete example according to this invention will be described hereunder.

The strain gauge 366 was first set to the position A in FIG. 61 to perform the calibration. Namely, an electric signal from the strain gauge 366 under the non-loaded condition was read by the strain indicator 375 and recorded in the memory hycoder (FIG. 63(b)). As shown in FIG. 62, a supporting rod for supporting a weight 378 of a constant weight was mounted on the rotary lifter 362 to apply a load of 20 g to the rotary lifter 362 and the signal from the strain gauge 366 was read by the strain indicator 375 and recorded in the memory hycoder (FIG. 63(c)).

In the next step, the container 370 provided with the metallic cover was held between the rotary lifter 362 and the rotary chuck 363 as described before and the container 370 was rotated in such held state to carry out the first and second seaming operations by means of the first and second rolls 364 and 365. The seaming forces of the peripheral portion 362a of the metallic cover 362 applied to the flanged portion 371a of the container body 361 in these seaming operations were measured by the strain indicator 375 connected to the strain gauge 366 and then recorded (FIG. 63(a)). As shown in FIG. 63(a), the seaming force of the first seaming roll 364 is represented by the F area of FIG. 63(a) and the seaming force of the second seaming roll 365 is represented by the S area shown in FIG. 63(a).

10-1-4 Effects

According to this invention, since the seaming force of the seaming rolls 364 and 365 to the peripheral portion 372a of the metallic cover 372 can be easily and exactly detected by the strain gauge 366, suitable and stable seaming working can be achieved in accordance with the value detected by the strain gauge 366.

10.2 Container seaming device provided with revolving seaming roll

10-2-1 Basic Structure

Figure 64:
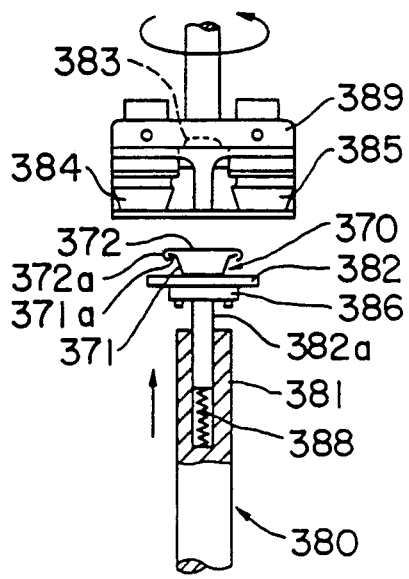
FIGS. 64 to 66 show a container seaming device provided with revolving seaming rolls of the second embodiment of the apparatus for manufacturing the container provided with the metallic cover according to this invention.
Figure 65:
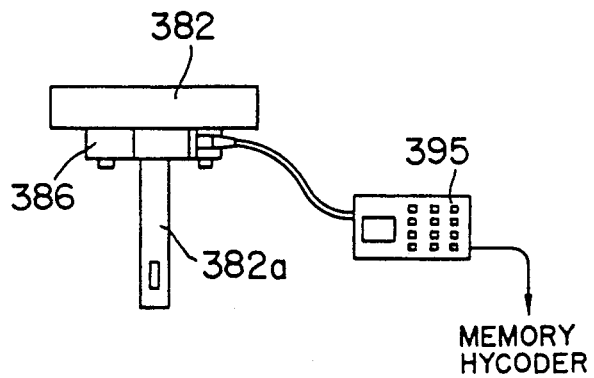
Figure 66:
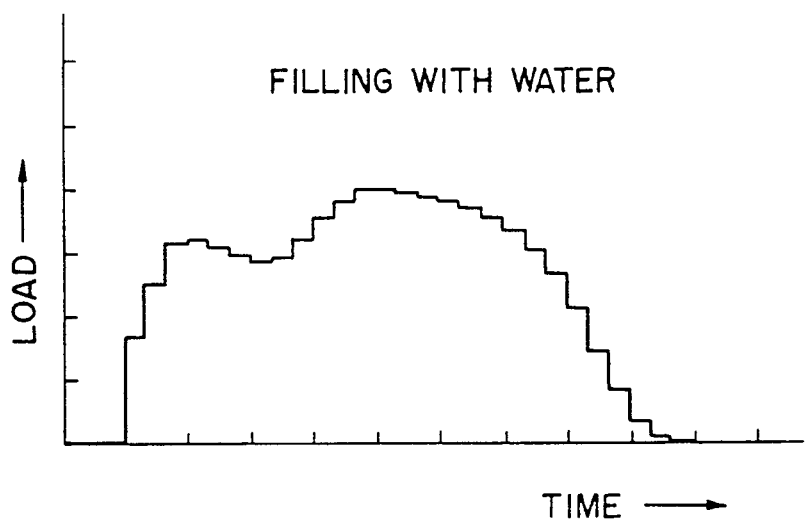

FIGS. 64 to 66 show a container seaming device provided with a revolving seaming roll.

A container 370 provided with a metallic cover which is subjected to the seaming operation by the container seaming device according to this invention is composed of a plastic container body 371 in which a content is packaged and a metallic cover 372.

The container body 371 is provided with a flanged portion 371a and is formed by thermoforming a laminated material of the structure of polypropylene/ethylene vinyl alcohol copolymer/polypropylene, but may be formed by a sheet blank of a laminated structure and a thermally fusible resin injected on the surface of the sheet blank. The metallic cover 372 is formed of aluminum or tinplate and provided with a peripheral portion 372a.

The container seaming device will be described hereunder. The container seaming device 380 comprises a lifter 382 which is supported by a vertically movable supporting rod 382a and on which the container 370 provided with the metallic cover is rested and a rotary member 389 disposed above the lifter 382. The rotary member 389 rotatably supports a chuck 383 for holding the container 370 in association with the lifter 382 and the rotary member 389 also supports the first and second seaming rolls 384 and 385 for seaming the container 370 provided with the metallic cover at portions external to the chuck 383. These seaming rolls 384 and 385 are revolved around the container 370 in accordance with the rotation of the rotary member 389 and the movable in the radial direction. These seaming rolls 384 and 385 freely rotate while pressing the peripheral portion 372a of the metallic cover 372 during the revolutions about the container 370 provided with the metallic cover, whereby the peripheral portion 372a of the metallic cover 372 is seamed to the flanged portion 371a of the container body 371.

The lifter supporting rod 382a is elastically supported in the cylindrical member 381 through a spring means 388. The lifter supporting rod 382a is thus supported in the cylindrical member 381 through the spring means 388, so that the pressing force applied to the container 370 provided with the metallic cover between the rotary lifter 382 and the chuck 383 can be easily adjusted by changing the vertical position of the cylindrical member 381.

An annular load meter 386 is attached to the outer surface of the supporting rod 382a of the lifter 382 and the load meter 386 measures the strain of the supporting rod 382a during the seaming operation and detects the pressing force to the container 370 applied between the rotary lifter 382 and the chuck 383. The load meter 386 is connected to a load indicator 395, as shown in FIG. 65, to which a memory hycoder, not shown, is connected.

10-2-2 Function

The function of this embodiment of the structure described above will be described hereunder.

The container 370 provided with the metallic cover is first rested on the lifter 382 under the condition that the peripheral portion 372a of the metallic cover 372 is loosely fitted to the flanged portion 371a of the container body 371 in which the content, not shown, is packaged.

In the next step, the container 370 is raised by the cylindrical member 381 together with the supporting rod 382a to a position at which the container 370 is held under the pressed condition between the lifter 382 and the chuck 383. The rotary member 389 rotates with the container 370 provided with the metallic cover held between the lifter 382 and the chuck 383.

In accordance with the rotation of the rotary member 389, the first seaming roll 384 and the second seaming roll 385 revolve around the container 370 provided with the metallic cover, but the chuck 383 stops regardless of the rotation of the rotary member 389 while pressing the container 370 provided with the metallic cover. At the same time, the first seaming roll 384 and the second seaming roll 385 are moved in this order radially inwardly and rotate freely while pressing the peripheral portion 372a of the metallic cover 372, whereby the seaming operation is performed between the peripheral portion 372a of the metallic cover 372 and the flanged portion 371a of the container body 371. Namely, during the revolutions of the first seaming roll 384 and the second seaming roll 385, the first seaming roll 384 is first gradually moved radially inwardly to press the peripheral portion 372a of the metallic cover 372 to thereby carry out the first seaming operation (single seaming operation) to the flanged portion 371a of the container body 371. After the first seaming operation has been completed, the first seaming roll 384 moves radially outwardly and, in place thereof, the second seaming roll 385 is moved radially inwardly to press the peripheral portion 372a of the metallic cover 372 to thereby carry out the second seaming operation (double seaming operation) to the flanged portion 371a of the container body 371.

The seaming operation of the container 370 provided with the metallic cover has been completed by these double seaming operations of the first and second seaming rolls 384 and 385. Subsequently, the second seaming roll moves radially outwardly and the rotation of the rotary member 389 then stops. In the next step, the cylindrical member 381, the supporting rod 382a and the lifter 382 are lowered, whereby the container 370 provided with the metallic cover is taken out externally to the container seaming device.

During the seaming operation, the load to the supporting rod 382a applied by the lifter 382 and the chuck 383 is measured as a pressing force for the container 370 by the load meter 386 and the measured value is converted into an electric signal which is then transmitted to the load indicator 395 and displayed as time elapses. The value measured by the load meter 386 is recorded by the memory hycoder through the load indicator 395. Since the load meter 386 is attached in an annular fashion, the axial load to the supporting rod 382a caused by the lifter 382 and the chuck 383 can be exactly measured by the load meter 386.

10-2-3 Concrete Example

A concrete example of this invention will be described hereunder.

The plastic container body 371 was first filled with water. The container 370 in which the peripheral portion 372a of the metallic cover 372 was fitted to the flanged portion 371a of the container body 371 was rested on the lifter 382. The cylindrical member 381, the supporting rod 382a and the lifter 382 were raised so that the container 370 is held between the lifter 382 and the chuck 383. Under this condition, the rotary member 389 was rotated to thereby revolve the first seaming roll 384 and the second roll 385 around the container 370 provided with the metallic cover to carry out the first seaming operation by means of the first seaming roll 384 and the subsequent second seaming operation by means of the second seaming roll 385. During these seaming operations, the pressing force of the lifter 382 and the chuck 383 to the container 370 was read by the load indicator 395 connected to the load meter 386 and then recorded by the memory hycoder (FIG. 66).

As shown in FIG. 66, the pressing force of the lifter 382 and the chuck 383 to the container 370 provided with the metallic cover can be easily and exactly detected by the load meter 386 and the pressing force can be suitably controlled in accordance with the detected value, whereby the seaming operations can be suitably performed.

10-2-4 Effects

According to this invention, since the pressing force of the lifter 382 and the chuck 383 can be easily and exactly detected by the load meter, the suitable seaming operation can be performed in accordance with the detected value, whereby the container 370 provided with the metallic cover free from the leakage of the content can be manufactured with high precision.

INDUSTRIAL USAGE

The container provided with the metallic cover according to this invention can be utilized as a food packaging container for packaging various kinds of foods, such as juice, fresh soft drink, jam, or dried food.

What is claimed is:

1. A container provided with a metallic cover comprising (1) a plastic container body provided with a flanged portion having a base end and a front end at an upper end opening portion of said container and (2) a metallic cover provided with a peripheral portion that is seamed to said flanged portion, wherein said container body is formed by sheet forming a laminated sheet having a gas-barrier property and said flanged portion has substantially the same thickness from its base end to its front end.

2. A container provided with a metallic cover according to claim 1, wherein the thickness of the flanged portion of the container body is in a range of 0.25 to 0.90 mm.

3. A container provided with a metallic cover comprising a plastic container body provided with a flanged portion at an upper end opening portion and a metallic cover provided with a peripheral portion which is seamed to said flanged portion, characterized in that said container body includes an ethylene vinyl alcohol copolymer material layer and a drying agent contained in the ethylene vinyl alcohol copolymer material layer.

4. A container provided with a metallic cover comprising a plastic container body provided with a flanged portion at an upper end opening portion, a metallic cover provided with a cover closing said end opening portion and a peripheral portion which is connected to said cover through a shoulder portion and which is seamed to said flanged portion, and a sealing member coated in an annular shape on a seamed portion between the flanged portion and the peripheral portion, characterized in that said sealing member is coated at a portion at least near said shoulder portion.

5. A container provided with a metallic cover according to claim 4, wherein said sealing member is a heat sealing member capable of fusing and bonding said flanged portion and said peripheral portion.

6. A container provided with a metallic cover according to claim 4, wherein said sealing member is a rubber type sealing member.

7. A container provided with a metallic cover comprising a plastic container body provided with a flanged portion at an upper end opening portion and a metallic cover provided with a peripheral portion capable of forming a double seamed portion between said flanged portion and the peripheral portion, characterized in that a seamed width of said seamed portion is more than 0.5 (3M+2P) and less than 3M+2P, where letter P designates a thickness of the flanged portion before the seaming and letter M designates a thickness of the flanged portion after the seaming.

8. A container provided with a metallic cover according to claim 7, wherein an overlapped length OL of the seamed portion of said flanged portion and said peripheral portion is more than 5% of an inner height L of said seamed portion.

9. A container provided with a metallic cover comprising a plastic container body provided with a flanged portion at an upper end opening portion and a metallic cover provided with a peripheral portion which is seamed to said flanged portion, characterized in that a seamed width of said seamed portion is in a range of 1.6 to 2.0 mm and a seamed height is in a range of 2.4 to 2.8 mm.

10. A container provided with a metallic cover according to claim 9, wherein the seamed width of the flanged portion is in a range of 1.60 to 2.60 mm and a thickness thereof is in a range of 0.25 to 0.55 mm.

11. A container provided with a metallic cover comprising a plastic container body provided with a flanged portion at an upper end opening portion and a metallic cover provided with a peripheral portion that is seamed to said flanged portion, said plastic container body formed of a laminated sheet having a gas-barrier property and an injected thermally fusible resin, said container body having a shell portion and a bottom portion, each portion formed from a blank having a container shape and formed by integrally thermoforming a laminated sheet having a gas-barrier property and a thermally flexible resin injected on a surface of said blank, said flanged portion formed by injecting said thermally fusible resin.

12. A container provided with a metallic cover comprising a plastic container body having a shell portion and provided with a flanged portion at an upper end opening portion and a metallic cover provided with a peripheral portion that is seamed to said flanged portion, said plastic container body formed of a laminated sheet having a gas-barrier property and an injected thermally fusible resin, at least four thickened pillars of thermally fusible resin present in the shell portion of the container body.

13. A container provided with a metallic cover comprising a plastic container body provided with a flanged portion at an upper end opening portion and a metallic cover provided with a peripheral portion that is seamed to said flanged portion, said plastic container body formed of a laminated sheet having a gas-barrier property and an injected thermally fusible resin, said container body having a shell portion and a bottom portion, said bottom portion having an edge portion, said shell portion and said bottom portion formed from a laminated sheet having a gas-barrier property and a thermally fusible resin injected on the surface of the laminated sheet, said flanged portion and said edge portion formed of said thermally fusible resin, said resin having a MFR of less than 12 g/10 min., a bending elasticity greater than 12,000 kg/cm$^2$, and an Izod impact value greater than 4.5 kg-cm/cm.

14. A container provided with a metallic cover comprising (1) a plastic container body having a shell portion and a flanged portion located at an upper end opening portion of said container body and (2) a metallic cover provided with a peripheral portion that is secured to said flanged portion, said container body having an annular recess (a) extending in a circumferential direction and (b) being located at the intersection of the base end of the lower surface of said flanged portion and said shell portion.

15. A container provided with a metallic cover comprising (1) a plastic container body having an inner surface and a flanged portion at an upper end opening portion and (2) a metallic cover having an inner surface and a peripheral portion that is secured to said flanged portion, wherein (a) said inner surface of the container body is a polyolefin, (b) said inner surface of the cover is coated with a denatured polyolefin layer, and (c) a deoxidizer is secured to said inner surface of the container body or to said inner surface of the cover.

* * * * *